United States Patent
Ikeda et al.

(10) Patent No.: US 10,552,706 B2
(45) Date of Patent: Feb. 4, 2020

(54) ATTACHABLE MATTER DETECTION APPARATUS AND ATTACHABLE MATTER DETECTION METHOD

(71) Applicant: FUJITSU TEN LIMITED, Kobe-shi, Hyogo (JP)

(72) Inventors: Nobuhisa Ikeda, Kobe (JP); Takashi Kono, Kobe (JP); Nobunori Asayama, Kobe (JP); Daisuke Yamamoto, Kobe (JP); Yasushi Tani, Kobe (JP); Junji Hashimoto, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 32 days.

(21) Appl. No.: 15/723,588

(22) Filed: Oct. 3, 2017

(65) Prior Publication Data
US 2018/0114089 A1    Apr. 26, 2018

(30) Foreign Application Priority Data

Oct. 24, 2016 (JP) .................................. 2016-208071
Oct. 24, 2016 (JP) .................................. 2016-208072
Feb. 22, 2017 (JP) .................................. 2017-031488

(51) Int. Cl.
*G06K 9/46*  (2006.01)
*G06K 9/62*  (2006.01)
(Continued)

(52) U.S. Cl.
CPC .............. *G06K 9/4647* (2013.01); *B60R 1/00* (2013.01); *G06K 9/2054* (2013.01); *G06K 9/6202* (2013.01); *B60R 2300/30* (2013.01); *B60R 2300/303* (2013.01); *B60R 2300/305* (2013.01); *G06K 9/6212* (2013.01)

(58) Field of Classification Search
CPC .. G06K 9/4647; G06K 9/6202; G06K 9/2054; G06K 9/6212; B60R 1/00; B60R 2300/305; B60R 2300/303; B60R 2300/30
See application file for complete search history.

(56) References Cited

U.S. PATENT DOCUMENTS

2005/0082462 A1* 4/2005 Yanai .................. H04N 5/2259 250/208.1
2005/0152613 A1* 7/2005 Okutsu ..................... G06T 5/00 382/254
(Continued)

FOREIGN PATENT DOCUMENTS

JP   H08-068765 A    3/1996
JP   H10-104076 A    4/1998
(Continued)

*Primary Examiner* — John W Lee
(74) *Attorney, Agent, or Firm* — Oliff PLC

(57) ABSTRACT

An attachable matter detection apparatus according to an embodiment includes an acquirement unit, a creation unit, and a determination unit. The acquirement unit acquires a determination target area of an attachable matter from a photographic image. The creation unit creates histograms of at least an edge intensity, luminance, and saturation for the determination target area acquired by the acquirement unit. The determination unit determines whether or not the attachable matter exists in the determination target area on the basis of a ratio of frequency of each grade in each of the histograms created by the creation unit.

8 Claims, 42 Drawing Sheets

(51) Int. Cl.
  *B60R 1/00*   (2006.01)
  *G06K 9/20*   (2006.01)

(56) References Cited

U.S. PATENT DOCUMENTS

| | | | | |
|---|---|---|---|---|
| 2006/0038895 | A1* | 2/2006 | Suzuki | B60R 1/00 348/222.1 |
| 2006/0192693 | A1* | 8/2006 | Yamauchi | H04N 19/172 341/50 |
| 2008/0170755 | A1* | 7/2008 | Nasser | G06K 9/2081 382/106 |
| 2009/0304239 | A1* | 12/2009 | Itou | G06K 9/00255 382/118 |
| 2011/0013039 | A1* | 1/2011 | Aisaka | H04N 5/142 348/222.1 |
| 2012/0163728 | A1* | 6/2012 | Sun | G06K 9/32 382/260 |
| 2013/0094781 | A1* | 4/2013 | Koga | G06T 3/4053 382/300 |
| 2013/0335439 | A1* | 12/2013 | Jeong | G09G 5/02 345/590 |
| 2016/0052452 | A1* | 2/2016 | Oh | B60R 11/04 348/148 |
| 2016/0364604 | A1* | 12/2016 | Tsuji | G06T 7/248 |

FOREIGN PATENT DOCUMENTS

| | | |
|---|---|---|
| JP | H10-261064 A | 9/1998 |
| JP | 2000-137788 A | 5/2000 |
| JP | 2001-103496 A | 4/2001 |
| JP | 2001-141838 A | 5/2001 |
| JP | 2002-056394 A | 2/2002 |
| JP | 2002-094978 A | 3/2002 |
| JP | 2006-262242 A | 9/2006 |
| JP | 2007-329762 A | 12/2007 |
| JP | 2009-255722 A | 11/2009 |
| JP | 2010-014494 A | 1/2010 |
| JP | 2010-087882 A | 4/2010 |
| JP | 2010-112796 A | 5/2010 |
| JP | 2010-112811 A | 5/2010 |
| JP | 2014-056572 A | 3/2014 |
| JP | 2015-095886 A | 5/2015 |
| JP | 2016-208071 A | 12/2016 |
| WO | WO2015/008566 A1 | 3/2017 |

* cited by examiner

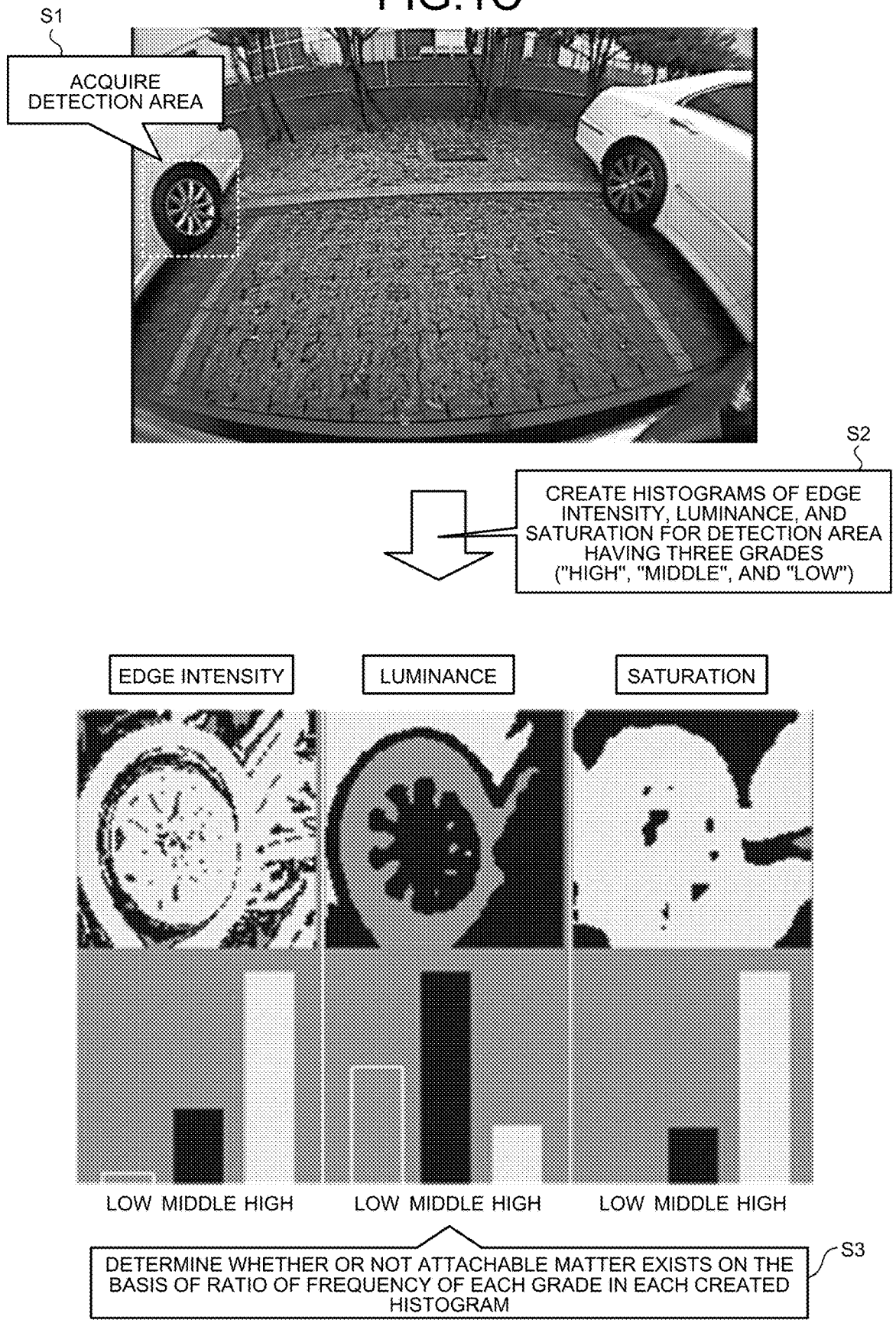

FIG.4A

EXCLUSION CONDITION-1

| EDGE INTENSITY | HIGH: 50% OR HIGHER |
| LUMINANCE | LOW: 30% OR HIGHER |
| SATURATION | HIGH: 50% OR HIGHER |

FIG.4B

EXCLUSION CONDITION-2

| EDGE INTENSITY | HIGH: 50% OR HIGHER |
| LUMINANCE | MIDDLE: 50% OR HIGHER |
| SATURATION | LOW: 50% OR HIGHER |

FIG.4C

EXCLUSION CONDITION-3

| EDGE INTENSITY | — |
| LUMINANCE | MIDDLE: 80% OR HIGHER |
| SATURATION | HIGH: 80% OR HIGHER |

FIG.6

| EXCLUSION CONDITION ADJUSTMENT TRIGGER | EXAMPLES OF ADJUSTMENT CONTENT |
|---|---|
| FOR SCENE CHANGE | URBAN AREA AT NIGHT: RATIO OF "HIGH" IN EDGE INTENSITY ↓ (* IN CONSIDERATION OF REFLECTION OR THE LIKE) |
| DETECTION AREA POSITION | EXCLUDE POSITION CORRESPONDING TO SKY |
| CONTINUITY BETWEEN MULTIPLE FRAMES | EXCLUDE DETECTION AREA HAVING ONLY SINGLE FRAME |
| ⋮ | ⋮ |

FIG.9

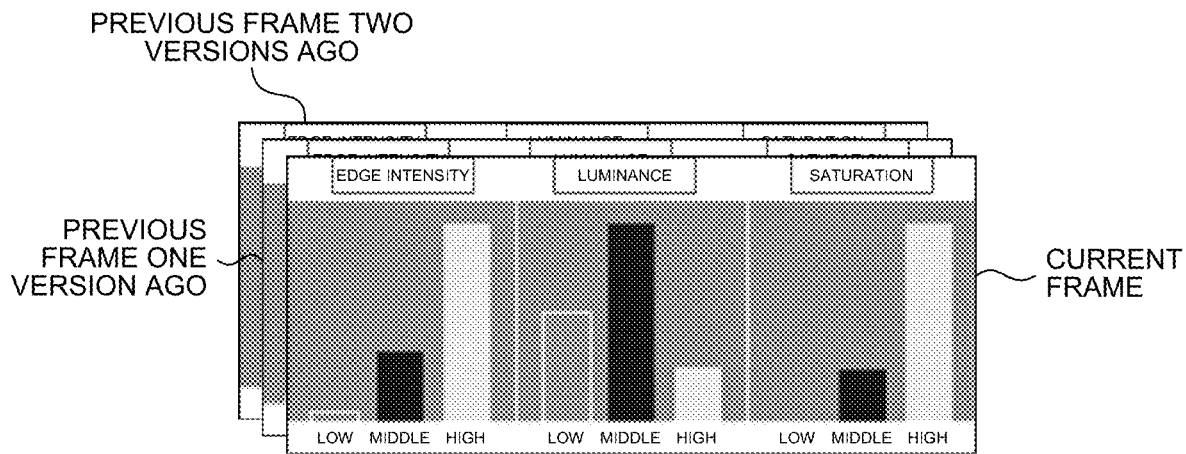

STORED INFORMATION

·NUMBER OF DATA OF CURRENT FRAME (EACH FREQUENCY)
·NUMBERS OF DATA OF PREVIOUS FRAMES ONE VERSION AGO AND TWO VERSIONS AGO
·SIMPLE MOVING AVERAGE (SMA)
·CHANGE AMOUNT BETWEEN CURRENT FRAME AND SIMPLE MOVING AVERAGE
·CHANGE AMOUNTS BETWEEN PREVIOUS FRAMES ONE VERSION AGO AND TWO VERSIONS AGO AND SIMPLE MOVING AVERAGE

∗ SMA = SMA − (NUMBER OF DATA PREVIOUS FRAME TWO VERSIONS AGO/2) + (NUMBER OF DATA OF CURRENT FRAME/2)
∗ ∗
 CURRENT CHANGE AMOUNT = NUMBER OF DATA − SMA

FIG.10

| DETECTION CONDITION | |
|---|---|
| EDGE INTENSITY | HIGH: DECREASE PREDETERMINED AMOUNT<br>LOW: INCREASE PREDETERMINED AMOUNT |
| LUMINANCE | MIDDLE: INCREASE PREDETERMINED AMOUNT |
| SATURATION | LOW: INCREASE PREDETERMINED AMOUNT |

FIG.11

PARAMETER SETTING SCREEN    [CLEAR] [UPDATE]

| | EDGE INTENSITY | | | LUMINANCE | | | SATURATION | | |
|---|---|---|---|---|---|---|---|---|---|
| UPPER | 4000 | 0 | -6000 | 0 | 3000 | 0 | 3000 | 0 | 0 |
| MIDDLE | 4000 | 0 | -6000 | 0 | 3000 | 0 | 3000 | 0 | 0 |
| LOWER | 5000 | 0 | -7000 | 0 | 4000 | 0 | 4000 | 0 | 0 |
| | ☑LOW ☐MIDDLE ☑HIGH | | | ☐LOW ☑MIDDLE ☐HIGH | | | ☑LOW ☐MIDDLE ☐HIGH | | |

FIG.12A <CASE OF ATTACHABLE MATTER>
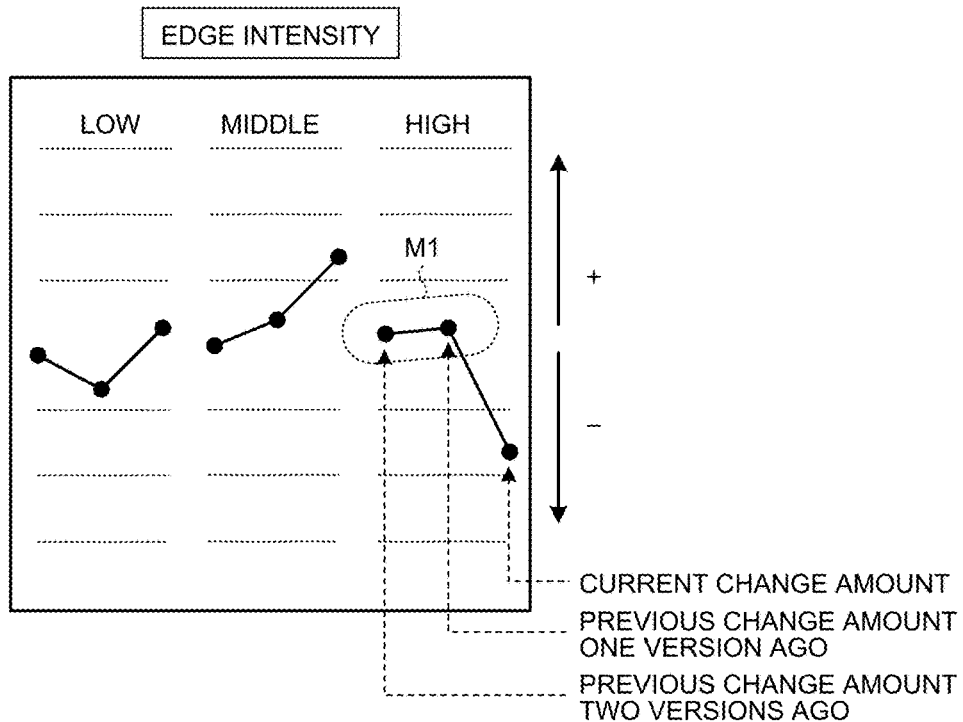
FIG.12B <CASE OF WHITE LINE>
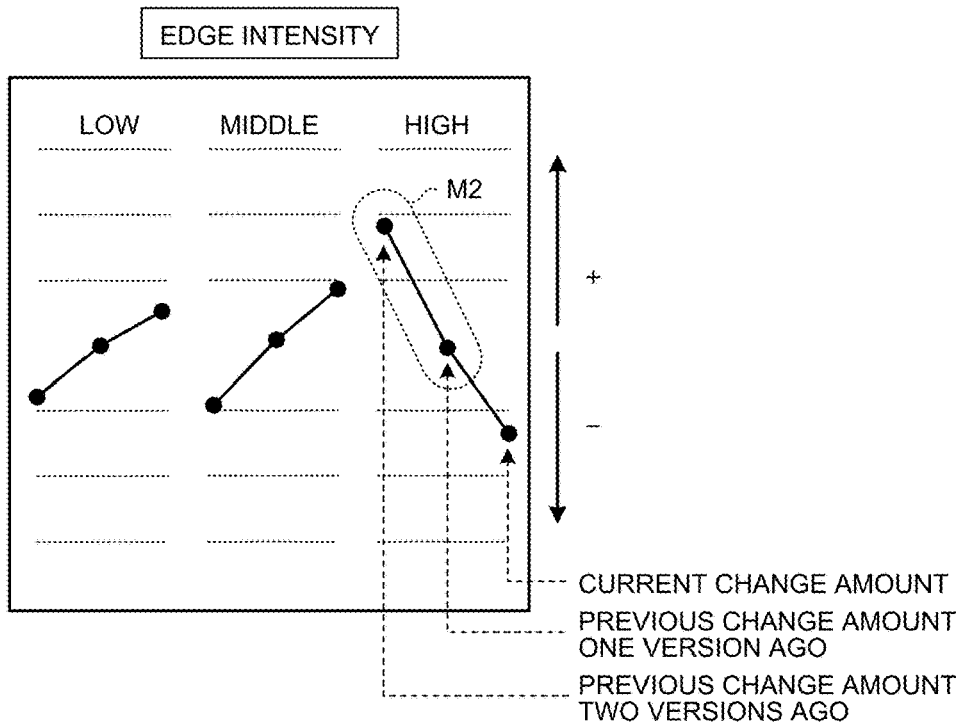

FIG.13

| DETECTION CONDITION ADJUSTMENT TRIGGER | EXAMPLE OF ADJUSTMENT CONTENT |
|---|---|
| PARTITIONED AREA POSITION | CHANGE AMOUNT TENDS TO BE STEEP IN LOWER SIDE OF SCREEN → REINFORCE CONDITION |
| TRAVEL STATE | ATTACHABLE MATTER IS EASILY ATTACHED WHILE VEHICLE STOPS → LOOSEN CONDITION TO INCREASE DETECTION SENSITIVITY |
| WIPER OPERATION | ATTACHABLE MATTER IS EASILY ATTACHED → LOOSEN CONDITION TO INCREASE DETECTION SENSITIVITY |
| RAIN SENSOR | THE SAME |
| RAINFALL INFORMATION RECEPTION | THE SAME |
| COLOR OF SKY | CLOUDY or RAINY SKY IS DETECTED THROUGH IMAGE ANALYSIS → THE SAME |
| GYRO SENSOR | TRAVELING DOWNHILL → THE SAME |
| ⋮ | ⋮ |

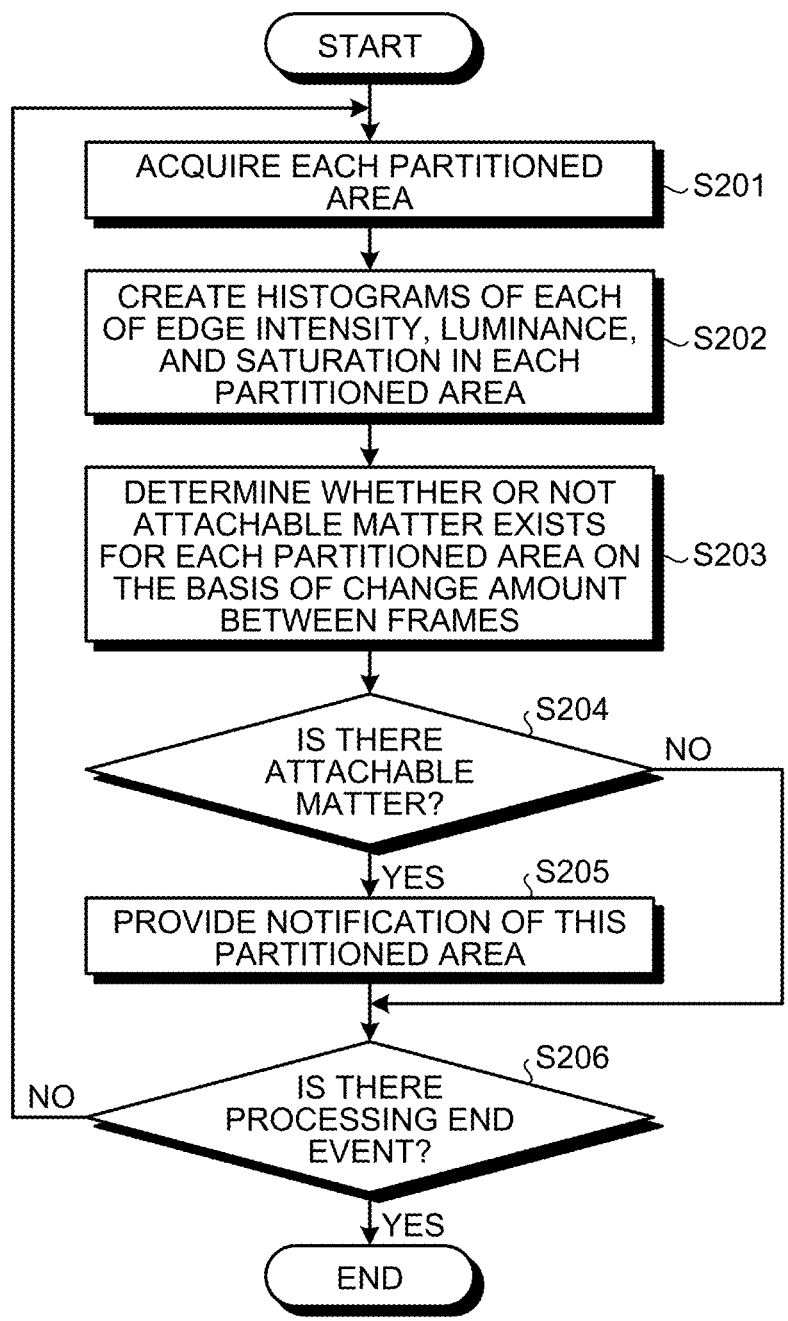

| DETECTION AREA ID | AREA INFORMATION | SCORE | STATE | ... |
|---|---|---|---|---|
| XX1 | (x1, y1), w1, h1··· | s1 | IDLE | ... |
| XX2 | (x2, y2), w2, h2··· | s2 | HIDING | ... |
| XX3 | (x3, y3), w3, h3··· | s3 | OBSERVATION | ... |
| XX4 | (x4, y4), w4, h4··· | s4 | PENALTY | ... |
| ⋮ | ⋮ | ⋮ | ⋮ | ⋮ |

| IDLE | NON-DETECTION STATE |
|---|---|
| HIDING | THERE IS POSSIBILITY THAT ATTACHABLE MATTER IS ATTACHED |
| OBSERVATION | OBSERVATION STATE AFTER REMOVAL PROCESS |
| PENALTY | STATE THAT ATTACHABLE MATTER IS CONTINUOUSLY DETECTED EVEN AFTER REMOVAL PROCESS |

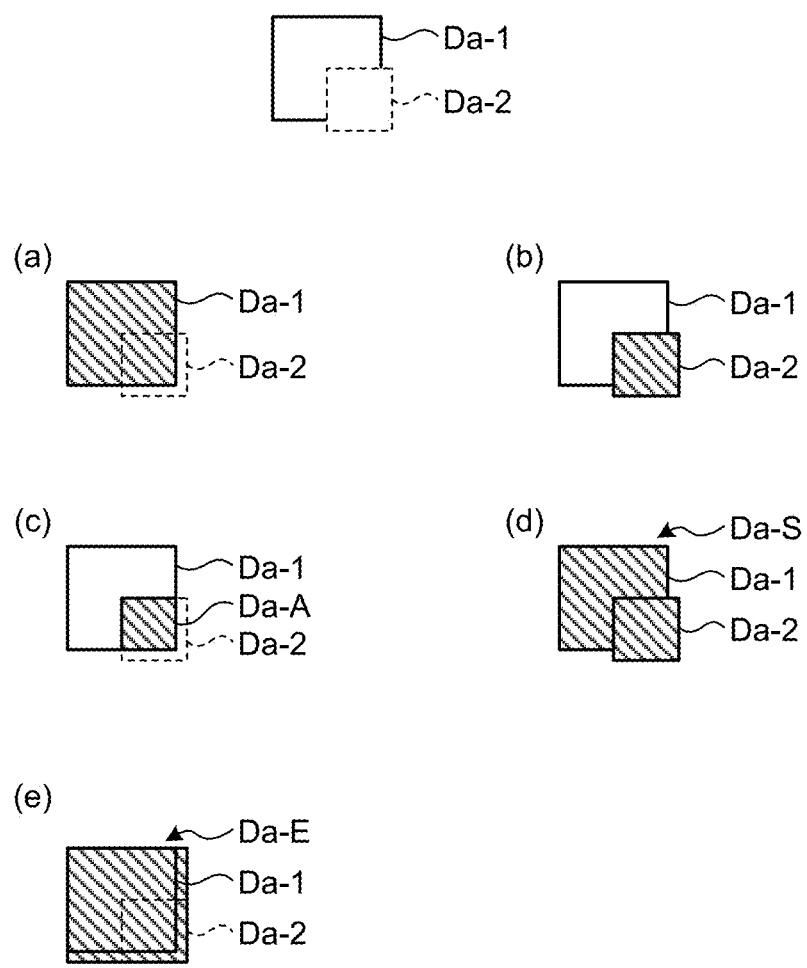

DETECTION THRESHOLD VALUE LOW

DETECTION THRESHOLD VALUE HIGH

DETECTION THRESHOLD VALUE HIGH

DETECTION THRESHOLD VALUE LOW

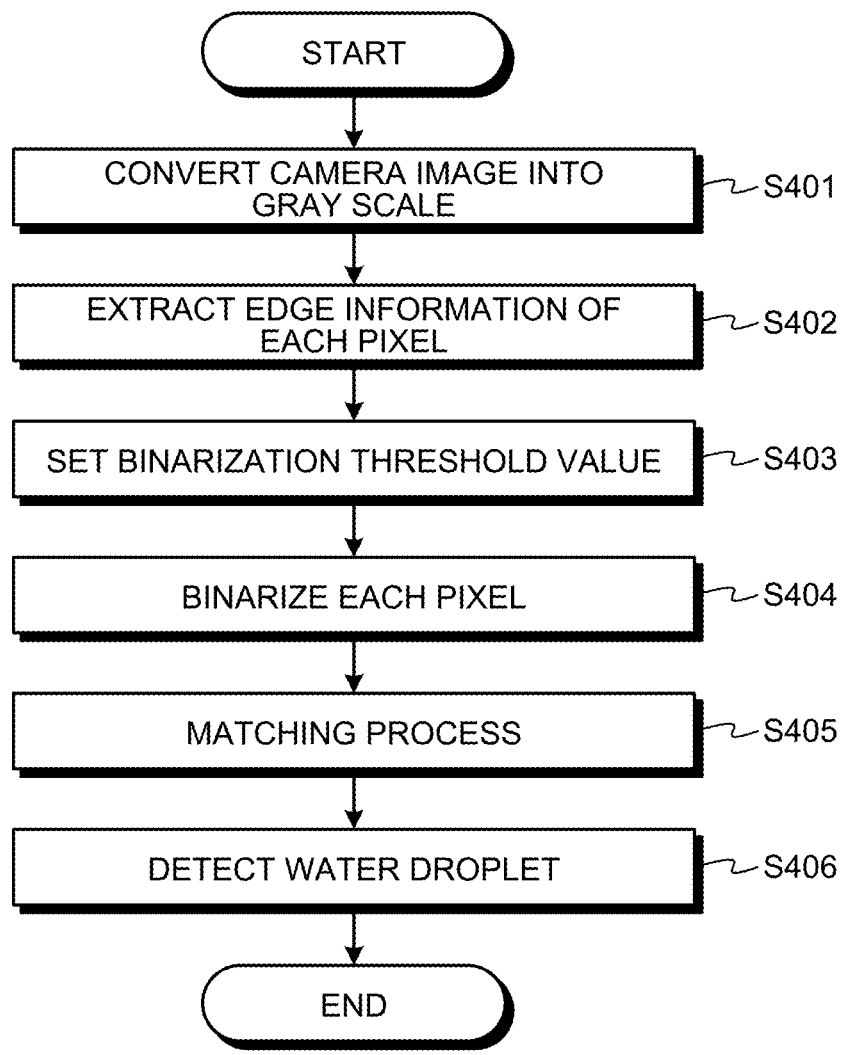

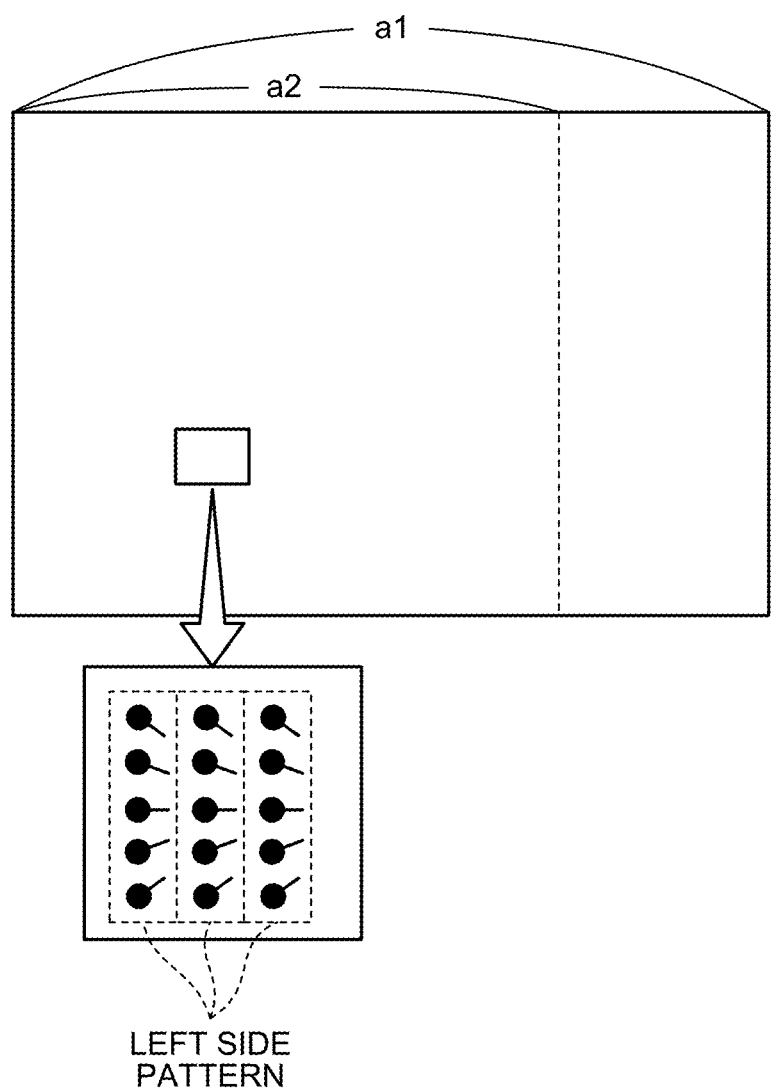

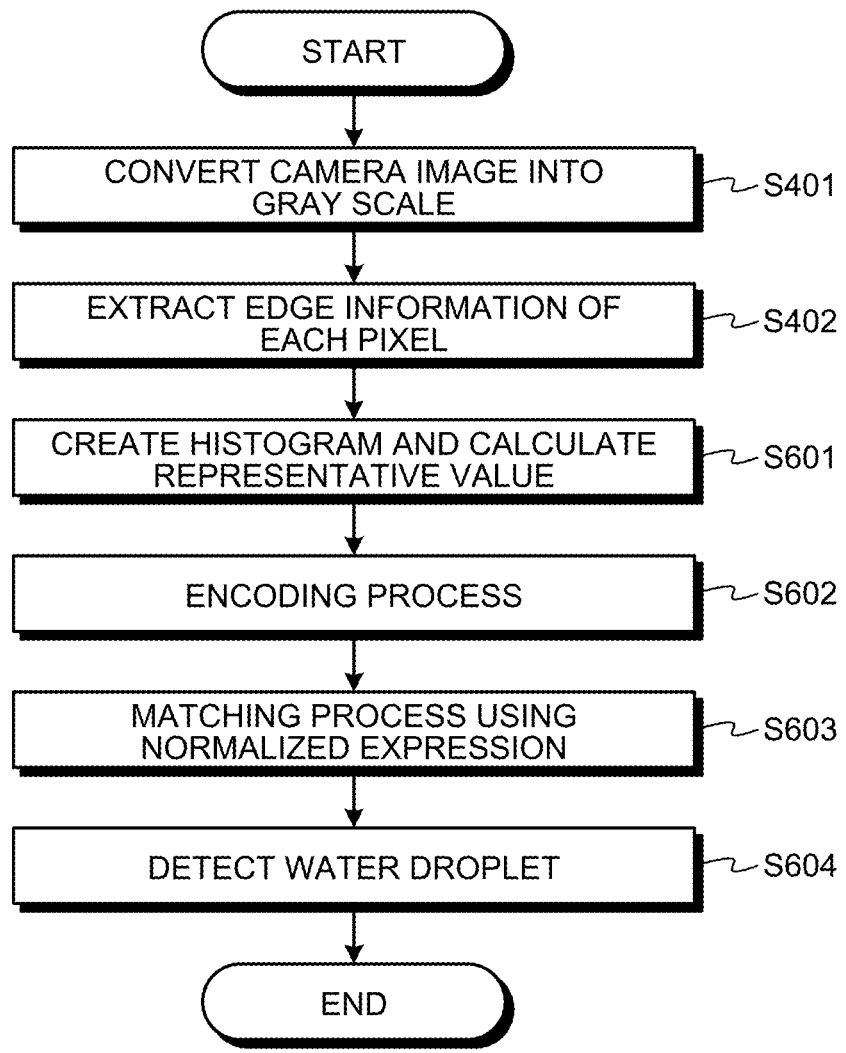

ATTACHABLE MATTER DETECTION APPARATUS AND ATTACHABLE MATTER DETECTION METHOD

CROSS-REFERENCE TO RELATED APPLICATIONS

This application is based upon and claims the benefit of priority of the prior Japanese Patent Application No. 2016-208071, filed on Oct. 24, 2016; Japanese Patent Application No. 2016-208072, filed on Oct. 24, 2016; and Japanese Patent Application No. 2017-031488, filed on Feb. 22, 2017, the entire contents of all of which are incorporated herein by reference.

FIELD

Embodiments described herein relate to an attachable matter detection apparatus and an attachable matter detection method.

BACKGROUND

In the related art, there is known an in-vehicle camera mounted on a vehicle to photograph surroundings of the vehicle. An image photographed by the in-vehicle camera is monitored and displayed, for example, to assist driver's visibility and is used in sensing to detect a white line on the road or an approaching object to the vehicle.

Incidentally, an attachable matter such as raindrops, snowflakes, dust, and mud is attached to a lens of the in-vehicle camera and may hinder the visibility assistance or the sensing described above. In this regard, a technique of removing an attachable matter by spraying washing water or compressed air to the lens of the in-vehicle camera has been proposed. In this technique, for example, a detection algorithm for detecting an attachable matter on a lens by analyzing a photographed image of the in-vehicle camera may be employed (for example, see Japanese Laid-open Patent Publication No. 2001-141838).

However, in the related art described above, there is a need for improvement in terms of improving accuracy of detecting an attachable matter.

The aforementioned detection algorithm includes, for example, detecting an edge from a photographed image and extracting a contour of the attachable matter on the basis of such edges. However, an image of the attachable matter such as a raindrop may blur, and the contour may blur in some cases. Therefore, it was difficult to perform detection with high accuracy in some cases.

Even when the contour of the raindrop is clear, for example, a structure having a shape similar to the raindrop may be erroneously detected as a raindrop.

SUMMARY

An attachable matter detection apparatus according to an aspect of an embodiment includes an acquirement unit, a creation unit, and a determination unit. The acquirement unit configured to acquire a determination target area of an attachable matter from a photographic image. The creation unit configured to create histograms of at least an edge intensity, luminance, and saturation for the determination target area acquired by the acquirement unit. The determination unit configured to determine whether or not the attachable matter exists in the determination target area on the basis of a ratio of frequency of each grade in each of the histograms created by the creation unit.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIGS. 1A to 1D are (first to fourth) explanatory diagrams schematically illustrating an attachable matter detection method according to an embodiment;

FIGS. 4A to 4C are (first to third) diagrams illustrating a specific example of an exclusion condition;

FIG. 6 is a diagram illustrating a specific example of adjustment of the exclusion condition;

FIG. 9 is a diagram illustrating a specific example of stored information according to the second embodiment;

FIG. 10 is a diagram illustrating a specific example of a detection condition;

FIG. 11 is a diagram illustrating an exemplary parameter setting screen;

FIGS. 12A and 12B are (first and second) diagrams illustrating a specific example of a determination method in a case where the previous change amounts one and two versions ago are included;

FIG. 13 is a diagram illustrating a specific example of adjustment of the detection condition;

FIG. 14 is a flowchart illustrating a processing sequence executed by an attachable matter detection apparatus according to the second embodiment;

FIGS. 17A to 17D are (first to fourth) processing explanatory diagrams of an inter-algorithm overlap determination unit;

FIG. 27 is a flowchart illustrating a processing sequence executed by an attachable matter detection apparatus according to the fourth embodiment;

FIG. 38 is a diagram illustrating an exclusion example of the detection process using the detection unit according to the sixth embodiment; and FIG. 39 is a flowchart illustrating a processing sequence executed by the attachable matter detection apparatus according to the sixth embodiment.

DESCRIPTION OF EMBODIMENTS

An attachable matter detection apparatus and an attachable matter detection method according to an embodiment of the present application will now be described in details with reference to the accompanying drawings. The present disclosure is not limited to the embodiment described in the following.

In the following description, an overview of the attachable matter detection method according to this embodiment will be described with reference to FIGS. 1A to 1D. Then, an attachable matter detection apparatus 10 obtained by applying the attachable matter detection method according to the embodiment will be described with reference to FIG. 2A and subsequent figures.

First, an overview of the attachable matter detection method according to this embodiment will be described with reference to FIGS. 1A to 1D. FIGS. 1A to 1D are (first to fourth) explanatory diagrams illustrating an overview of the attachable matter detection method according to an embodiment.

Figure 1A:
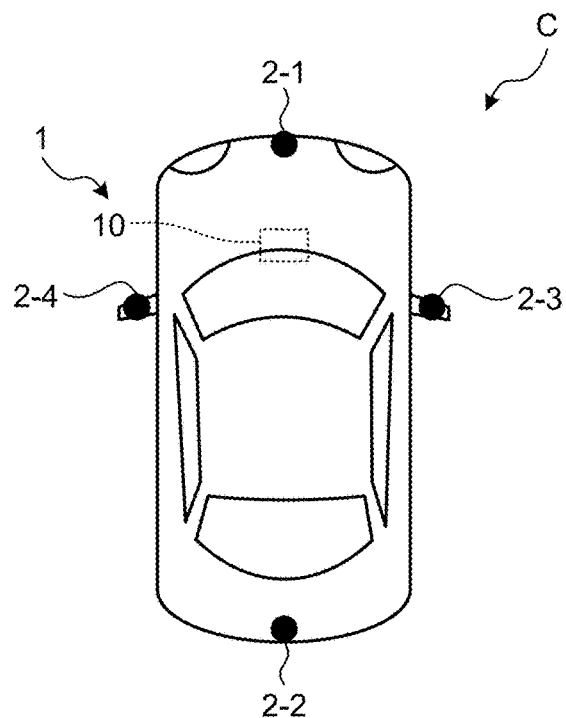

As illustrated in FIG. 1A, for example, in-vehicle cameras such as a front camera 2-1, a rear camera 2-2, a right-side camera 2-3, and a left-side camera 2-4 are mounted on a vehicle C to photograph surroundings of the vehicle C. Note that, in the following description, such in-vehicle cameras will be collectively referred to as a "camera 2."

The camera 2 has an image sensor such as a charge coupled device (CCD) or a complementary metal oxide semiconductor (CMOS) to photograph surroundings of the vehicle C using such an image sensor. In addition, the camera 2 outputs the photographed image, for example, to an attachable matter removal system 1 including the attachable matter detection apparatus 10 according to this embodiment.

Note that a wide-angle lens such as a fisheye lens is employed in a lens 2a of the camera 2 (refer to FIG. 1B), and each camera 2 has an angle view of 180° or larger. By using them, it is possible to photograph the entire circumference of the vehicle C.

Figure 1B:
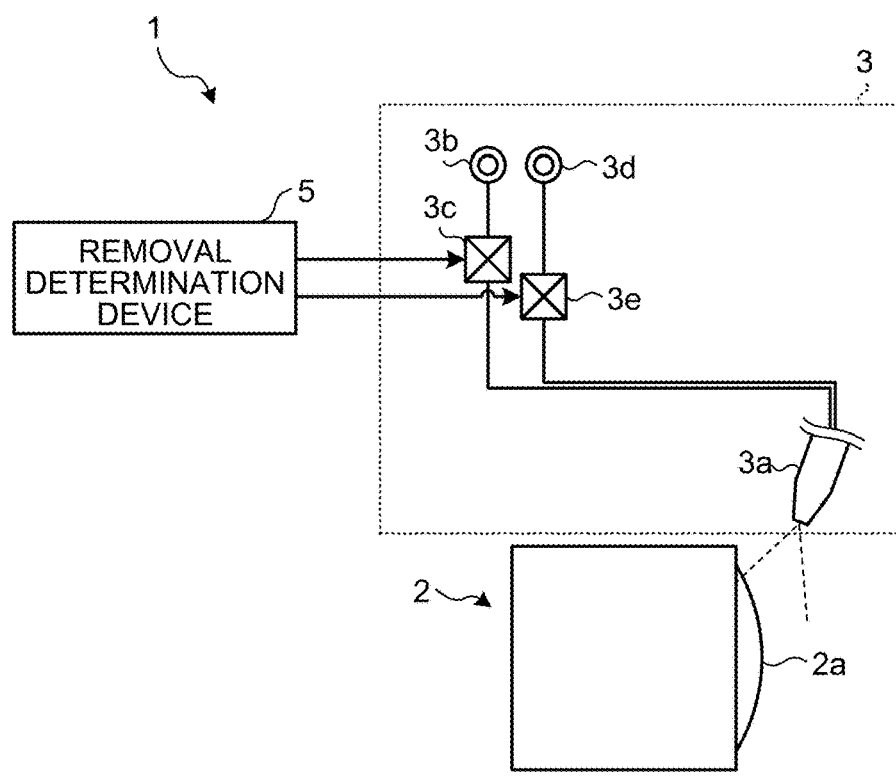

As illustrated in FIG. 1B, the attachable matter removal system 1 according to this embodiment has an attachable matter remover 3 that removes an attachable matter such as raindrops, snowflakes, dust, and mud attached on the lens 2a of the camera 2.

The attachable matter remover 3 has a nozzle 3a. The nozzle 3a has an injection port provided toward the lens 2a to remove attachable matter, for example, by injecting compressed air supplied through a compressed air supply source 3b and a valve 3c and a washing liquid supplied through a washing liquid supply source 3d and a valve 3e toward the lens 2a.

Note that an operation control of the attachable matter remover 3 is performed by a removal determination device 5 provided in the attachable matter removal system 1. The removal determination device 5 automatically determines whether or not attachable matter is attached on the lens 2a, and whether or not it is necessary to remove the attachable matter on the basis of a detection result of the attachable matter detection apparatus 10. If it is necessary to remove the attachable matter, the removal determination device 5 allows the attachable matter remover 3 to perform a removal operation.

In the attachable matter detection apparatus 10 according to this embodiment, in order to improve attachable matter detection accuracy contributing to such automatic determination, at least an edge intensity histogram, a luminance histogram, and a saturation histogram of each pixel are created for a determination target area for determining whether or not there is an attachable matter, and the attachable matter is determined on the basis of frequencies of each grade of the histograms.

Specifically, as illustrated in FIG. 1C, the attachable matter detection apparatus 10 acquires a detection area which is an area where existence of the attachable matter is estimated and is detected from the camera image of the camera 2, for example, using a plurality of detection algorithms (Step S1).

The attachable matter detection apparatus 10 creates histograms of the edge intensity, the luminance, and the saturation of the acquired detection area, for example, by classifying them into three grades including "low," "middle," and "high" grades (Step S2). Note that a specific example of the method of obtaining the edge intensity, the luminance, and the saturation will be described in conjunction with a histogram creation unit 11b (described below)

The attachable matter detection apparatus 10 determines whether or not the attachable matter estimated to exist in the detection area is truly an attachable matter on the basis of a "ratio" between frequencies of each grade of each created histogram (Step S3). Specifically, if such a ratio of the frequencies satisfies a predetermined exclusion condition for excluding the attachable matter, it is determined that the attachable matter estimated from the detection area is not an attachable matter.

For example, FIG. 1C illustrates a case where a tire portion of another vehicle is detected as the detection area. However, the attachable matter detection apparatus 10 creates the histogram for such a detection area and compares the "ratio" of each frequency of each histogram with a predetermined exclusion condition.

As a result, since the detection area as the tire portion satisfies the predetermined exclusion condition, the attachable matter detection apparatus 10 determines that the attachable matter estimated from such a detection area is not an attachable matter. Note that a specific example of the exclusion condition will be described below with reference to FIGS. 4A to 4C and the like.

The attachable matter detection apparatus 10 considers the detection area determined as not the attachable matter as an erroneous detection part and excludes the detection area from a processing target of the removal determination device 5 of the subsequent stage. That is, the attachable matter detection apparatus 10 does not notify the removal determination device 5 of such a detection area.

As a result, it is possible to reduce a processing load of the removal determination process in the removal determination device 5. In addition, by performing an error detection determination process of the attachable matter detection apparatus 10 for the detection area detected using a plurality of detection algorithms, it is possible to assist error detection of each detection algorithm and contribute to improving the attachable matter detection accuracy.

Note that, here, for example, the edge intensity, the luminance, and the saturation are selected from elements of the detection area. However, other elements such as a color or a standard deviation may also be employed, and the element serving as a histogram creation target is not limited. In addition, the grade is not limited to three grades including "low," "middle," and "high."

However, although a case where the attachable matter detection apparatus 10 is in an assistant position of each detection algorithm has been described by way of example in FIG. 1C, the attachable matter detection apparatus 10 may be configured to execute one of the detection algorithms.

Figure 1D:
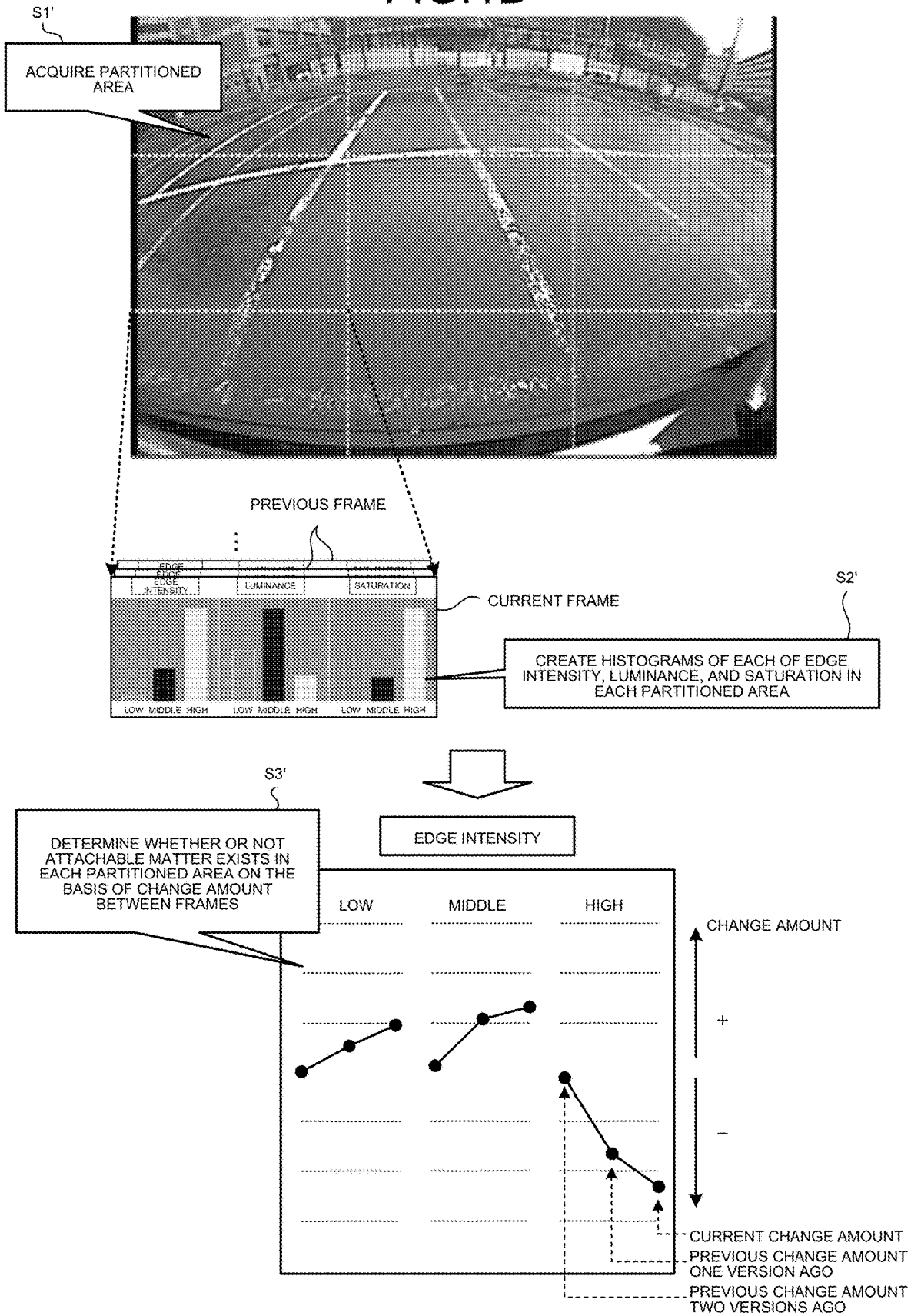

In this case, specifically, as illustrated in FIG. 1D, the attachable matter detection apparatus 10 sets a plurality of partitioned areas for a single frame of the camera image of the camera 2 and acquires each of the partitioned areas (Step S1').

The attachable matter detection apparatus 10 creates each histogram of the edge intensity, the luminance, and the saturation of each acquired partitioned area (Step S2').

Information including such histograms is stored for the previous frame one or more versions ago as well as the current frame.

The attachable matter detection apparatus 10 determines whether or not the attachable matter exists in each partitioned area on the basis of a "change amount" between the current frame and the previous frame (Step S3'). Note that FIG. 1D illustrates an example of the edge intensity. The attachable matter detection apparatus 10 determines whether or not the attachable matter exists, for example, on the basis of tendency indicated by a history of the current change amount of the edge intensity, the previous change amount one version ago, and the previous change amount two versions ago.

By performing determination on the basis of the "change amount" between frames in this manner, for example, even in a case of the raindrop having a blur contour by which it is difficult to detect an edge, it is possible to easily detect the raindrop as the attachable matter on the basis of the characteristic of the raindrop indicated by the "change amount." That is, it is possible to contribute to improving the attachable matter detection accuracy. In addition, by performing determination for each partitioned area, it is possible to detect the attachable matter with a higher resolution, compared to a case where determination is performed for all of the frames. Therefore, it is possible to contribute to improving the attachable matter detection accuracy.

Such a detection condition based on the "change amount" may be set for each partitioned area. As a result, it is possible to perform suitable determination depending on the characteristic of each partitioned area, for example, easiness of appearance of the change.

The detection condition, the processing, or the like when the "change amount" is employed in this manner will be described below in more details with reference to FIGS. 9 to 13 and the like.

An attachable matter detection apparatus 10 according to an embodiment obtained by applying the attachable matter detection method described above will now be described in more details.

Note that, in the following description, it is assumed that the example of FIG. 1C is the first embodiment, and the example of FIG. 1D is the second embodiment. However, for easy description purposes, the first and second embodiments will be described in summary with reference to FIGS. 2A and 2B.

Figure 2A:
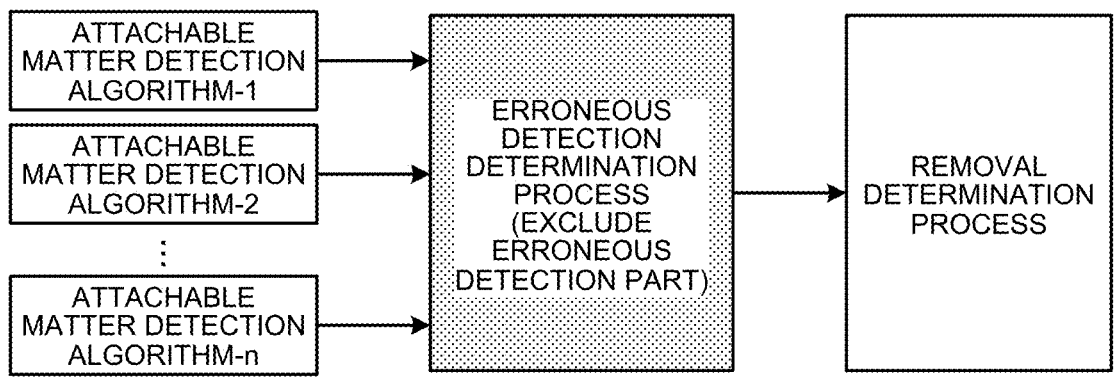
FIG. 2A is a schematic diagram for describing a first embodiment.

As illustrated in FIG. 2A, in the description of the first embodiment, it is assumed that the attachable matter detection apparatus 10 has a configuration for performing an error detection determination process (for excluding erroneous detection parts) by using an external attachable matter detection apparatus 4 that executes the attachable matter detection algorithms-1, -2, . . . , and -n as a front stage (refer to FIG. 3) and using a removal determination device 5 that executes the removal determination process as a rear stage (refer to FIG. 1C).

Figure 2B:
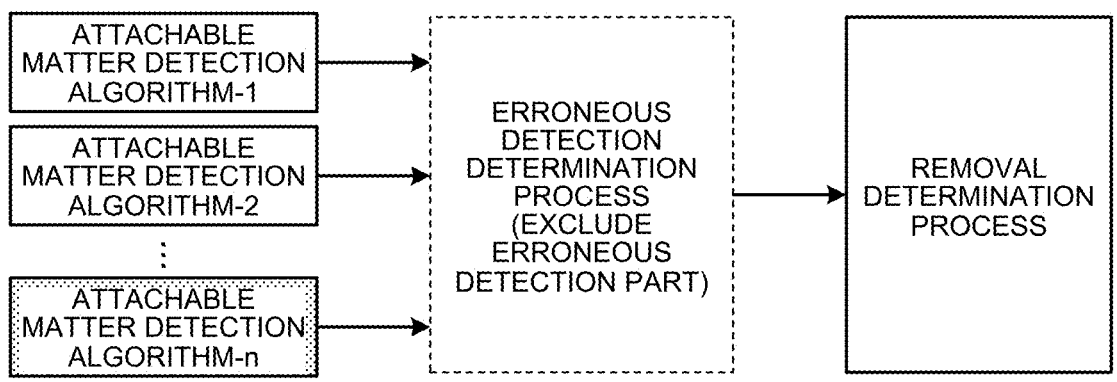
FIG. 2B is a schematic diagram for describing a second embodiment.

As illustrated in FIG. 2B, in the description of the second embodiment, it is assumed that the attachable matter detection apparatus 10 has a configuration for executing one of the attachable matter detection algorithms-1, -2, . . . , and -n (refer to FIG. 1D). Note that the error detection determination process indicated by the dotted line may be performed by the configuration of the first embodiment or may be omitted.

First Embodiment

Figure 3:
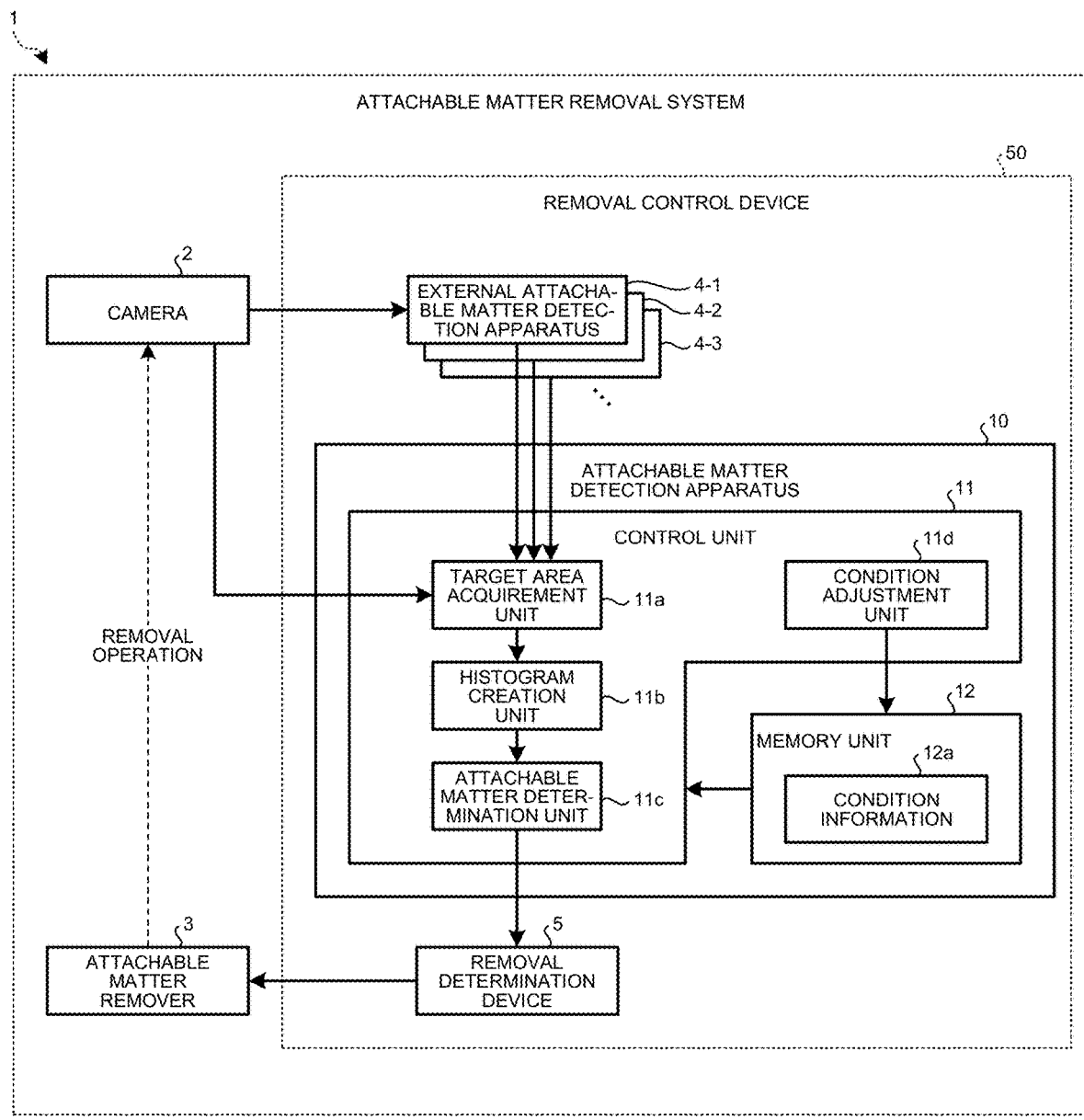
FIG. 3 is a block diagram illustrating an attachable matter removal system according to the first embodiment.

FIG. 3 is a block diagram illustrating the attachable matter removal system 1 according to the first embodiment. Note that, in FIG. 3, only elements necessary to describe the characteristics of this embodiment are illustrated as functional blocks, and general elements are not illustrated for simplicity purposes.

In other words, each element illustrated in FIG. 3 is just functional and conceptual, and is not necessarily configured as illustrated in a physical sense. For example, a distributed and/or integrated version of each functional block is not limited to those illustrated, and its entirety or a part thereof may be functionally or physically distributed or integrated in an arbitrary unit depending on various loads, use situations, and the like.

As illustrated in FIG. 3, the attachable matter removal system 1 includes a camera 2, an attachable matter remover 3, one or more external attachable matter detection apparatuses 4 (for example, external attachable matter detection apparatuses 4-1, 4-2, 4-3, . . . ), a removal determination device 5, and an attachable matter detection apparatus 10.

Note that, as illustrated in FIG. 3, the external attachable matter detection apparatus 4, the attachable matter detection apparatus 10, and the removal determination device 5 may be used as elements of a removal control device 50 that controls the entire process from detection of an attachable matter to removal of the attachable matter. A specific configuration of the removal control device 50 will be described below in conjunction with the third embodiment following this embodiment and the second embodiment.

Since the camera 2 and the attachable matter remover 3 have been described above, they will not be described here. The external attachable matter detection apparatus 4 acquires a camera image from the camera 2 in a frame-by-frame manner, extracts a detection area estimated as having an attachable matter from the camera image using a detection algorithm associated with each camera image, and notifies the attachable matter detection apparatus 10 of the extracted detection area.

As described above, the removal determination device 5 allows the attachable matter remover 3 to perform a removal operation on the basis of the detection result of the attachable matter detection apparatus 10 when it is necessary to remove the attachable matter.

The attachable matter detection apparatus 10 has a control unit 11 and a memory unit 12. The control unit 11 includes a target area acquirement unit 11a, a histogram creation unit 11b, an attachable matter determination unit 11c, and a condition adjustment unit 11d.

The memory unit 12 is a storage device such as a hard disk drive, a nonvolatile memory, or a register and stores condition information 12a.

The control unit 11 controls the entire attachable matter detection apparatus 10. The target area acquirement unit 11a acquires the detection area notification of which is provided from the external attachable matter detection apparatus 4 as a determination target area. Note that, in the second embodiment described below, the target area acquirement unit 11a acquires the partitioned area from the camera image of the camera 2 as the determination target area.

The histogram creation unit 11b creates at least the edge intensity histogram, the luminance histogram, and the saturation histogram of each pixel for each detection area acquired by the target area acquirement unit 11a as many as a predetermined number of grades classified in advance. The predetermined number of grades is set to three grades including, for example, "low," "middle," and "high" as described above.

Specifically, for the edge intensity, the histogram creation unit 11b converts the image of the detection area into a grayscale image by performing grayscale conversion. Note that the grayscale conversion refers to a conversion process of expressing each pixel of the camera image in gray scales from white to black depending on the luminance.

The histogram creation unit 11b extracts edge information of each pixel in the grayscale image by applying a Sobel filter to the grayscale image. Here, the edge information refers to the edge intensity in the X-axis direction and the Y-axis direction of each pixel. Note that, instead of the Sobel filter, another edge extraction method such as a Laplacian filter may also be employed.

The histogram creation unit 11b calculates the edge intensity as a representative value of each pixel of the grayscale image on the basis of the extracted edge information of each pixel. Specifically, a value obtained by squaring each of the edge intensities of the X-axis and Y-axis directions as the edge information and adding them is calculated as a representative value of the edge intensity of each pixel.

The histogram creation unit 11b creates the edge intensity histogram on the basis of the calculated representative value of the edge intensity of each pixel. Specifically, the histogram creation unit 11b normalizes each calculated representative value of the edge intensity to a value, for example, between 0 and 1. If three grades including "low," "middle," and "high" are set as described above, the histogram is created, for example, by setting a value equal to or greater than 0 and smaller than 0.3 to the "low" grade, setting a value equal to or greater than 0.3 and smaller than 0.7 to the "middle" grade, and setting a value equal to or greater than 0.7 and equal to or smaller than 1 to the "high" grade.

For the luminance, the histogram creation unit 11b uses the luminance of each pixel calculated on the basis of RGB values of each pixel (R: 0 to 255, G: 0 to 255, and B: 0 to 255) in the grayscale conversion described above. For example, the histogram creation unit 11b may extract only one element value out of R, G, and B of each pixel as a representative value and use this value as the luminance of each pixel.

For example, the histogram creation unit 11b may calculate a simple average value of each element value of R, G, and B as the luminance. In addition, for example, the histogram creation unit 11b may calculate the average value weighted using a so-called national television system committee (NTSC) weighted average method or the like based on a formula "luminance=$0.298912 \times R + 0.586611 \times G + 0.114478 \times B$" as the luminance.

The histogram creation unit 11b creates the luminance histogram on the basis of the calculated luminance of each pixel. Normalization of the luminance or a classification method for a predetermined number of grades is similar to that of the edge intensity.

For the saturation, for example, in the case of the HSV color space, the histogram creation unit 11b may calculate the saturation on the basis of formulas "brightness (V)=Imax, and saturation (S)=(Imax−Imin)/Imax" where "Imax" refers to a maximum value of R, G, and B, and "Imin" refers to a minimum value.

For example, in the case of the HSL color space, the histogram creation unit 11b may calculate the saturation on the basis of formulas "brightness (L)=(Imax+Imin)/2," "saturation (S)=(Imax−Imin)/(Imax+Imin) when L≤0.5," and "saturation (S)=(Imax−Imin)/(2−Imax−Imin) when L>0.5." Note that the brightness (V) or the brightness (L) may also be used as the aforementioned luminance.

The histogram creation unit 11b creates the saturation histogram on the basis of the calculated saturation of each pixel. Normalization of the saturation or a classification method for a predetermined number of grades is similar to those of the edge intensity and the luminance.

Note that the histogram creation unit 11b preferably enlarges or reduces the size of the detection area to match a standard size when the histogram is created. As a result, it is possible to suppress a variation in detection accuracy caused by a difference in size by comparing a ratio of the frequency of each element in the detection area in which the size is considered to be different with the predetermined exclusion condition. That is, it is possible to contribute to improving the attachable matter detection accuracy.

The attachable matter determination unit 11c determines whether or not the attachable matter estimated to exist in the detection area is truly an attachable matter on the basis of the ratio of the frequency of each grade of each histogram created by the histogram creation unit 11b in comparison with a predetermined exclusion condition. The predetermined exclusion condition is a combination of the ratios for each of three grades ("low," "middle," and "high") for each of the edge intensity, the luminance, and the saturation so as not to match the characteristics of the attachable matter and is contained in the condition information 12a in advance.

Here, FIGS. 4A to 4C illustrate a specific example of the predetermined exclusion condition. FIGS. 4A to 4C are (first to third) diagrams illustrating a specific example of the exclusion condition.

As illustrated in FIG. 4A, for example, the "exclusion condition-1" may be set such that the "high" of the "edge intensity" is 50% or higher, the "low" of the "luminance" is 30% or higher, and "high" of the "saturation" is 50% or higher.

As illustrated in FIG. 4B, for example, the "exclusion condition-2" may be set such that the "high" of the "edge intensity" is 50% or higher, the "middle" of the "luminance" is 50% or higher, and "low" of the "saturation" is 50% or higher.

As illustrated in FIG. 4C, for example, the "exclusion condition-3" may be set such that the "middle" of the "luminance" is 80% or higher, and the "high" of the "saturation" is 80% or higher.

All of the exclusion conditions of FIGS. 4A to 4C are conditions not suitable for the characteristics of raindrops obtained through a verification test or the like. Using the exclusion conditions of FIGS. 4A to 4C, it is possible to contribute to improving the detection accuracy, particularly, of raindrops out of attachable matters.

Returning to FIG. 3, the attachable matter determination unit 11c excludes a detection area that satisfies such a predetermined exclusion condition and is determined as not being an attachable matter from a process target of the rear stage. In addition, the attachable matter determination unit 11c notifies the removal determination device 5 of a detection area that does not satisfy the predetermined exclusion condition and is determined as an attachable matter in order to set it as a processing target of the rear stage.

Meanwhile, although the requirements of the exclusion condition include "edge intensity," "luminance," and "saturation" in the aforementioned example, other requirements may also be added as described above.

Figure 5A:
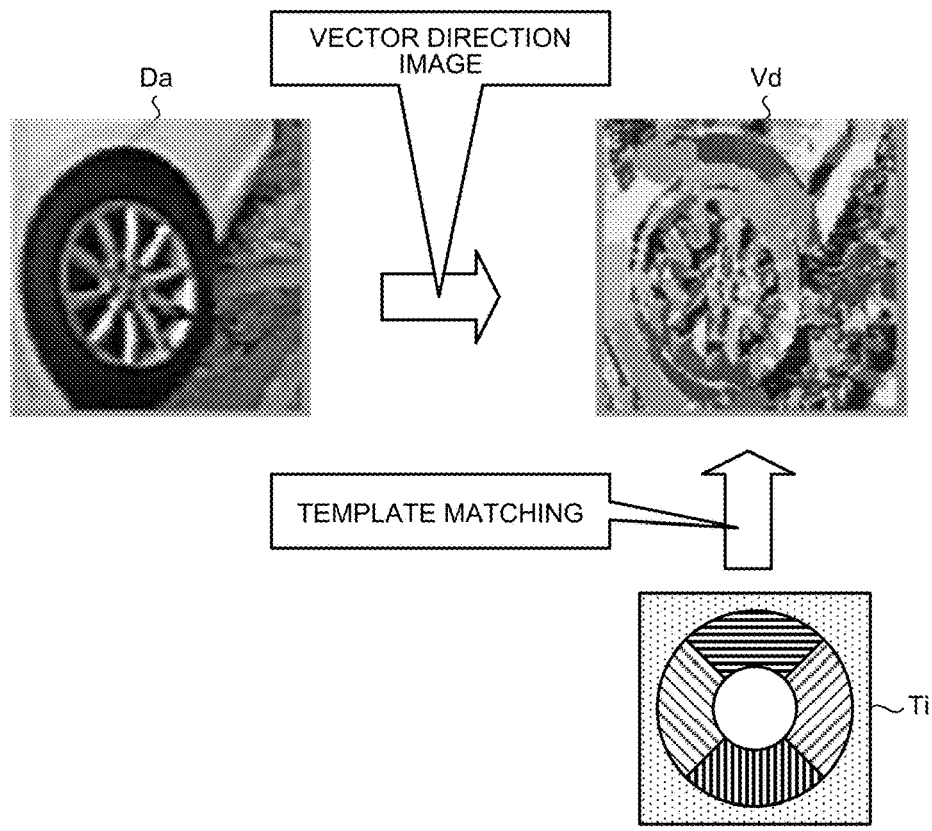
FIGS. 5A to 5C are (first to third) explanatory diagrams illustrating a modification of the exclusion condition.
Figure 5B:
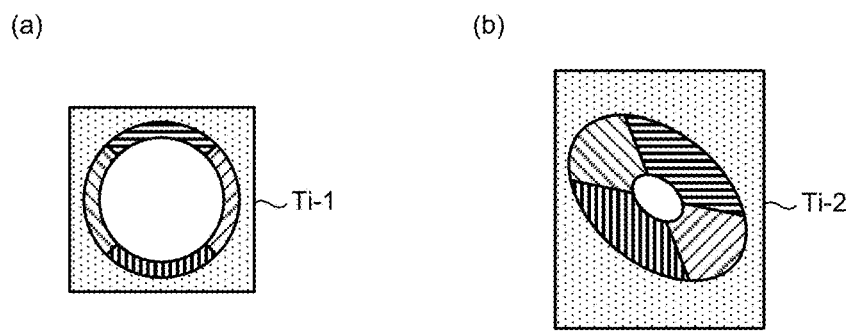
Figure 5C:
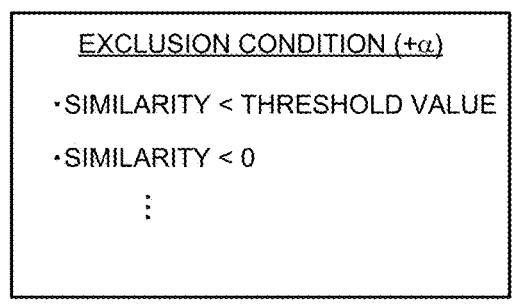

Such a modification of the exclusion condition will be described with reference to FIGS. 5A to 5C. FIGS. 5A to 5C are (first to third) explanatory diagrams illustrating a modification of the exclusion condition.

For example, the exclusion condition may include similarity or the like obtained by matching a detection area and a predetermined template.

In such a modification, a vector direction of each pixel of the detection area is focused. Specifically, as illustrated in FIG. 5A, in such a modification, for example, the histogram creation unit 11b creates a vector direction image Vd by expressing the detection area Da in a vector direction image format.

More specifically, the histogram creation unit 11b calculates vector directions of each pixel from the detection area Da, creates a vector direction image Vd in which the vector direction is colored, for example, on the basis of a color wheel, and notifies the attachable matter determination unit 11c of the created vector direction image Vd.

The attachable matter determination unit 11c calculates, for example, cross-correlation coefficients for all target pixels by performing template matching using the vector direction image Vd notification of which is provided and a template Ti provided in advance on the basis of the color wheel and performs condition determination including similarity indicated by such a cross-correlation coefficient.

Note that the template Ti illustrated in FIG. 5A shows, for example, a characteristic of an inwardly bright raindrop. As illustrated in FIG. 5B, for the template Ti, various variations such as a template Ti-1 in (a) of FIG. 5B or a template Ti-2 in (b) of FIG. 5B may be prepared depending on a size or shape of the detection area Da, a characteristic on how the raindrop shines, and the like. In this case, it is possible to deal with various shapes of the attachable matter.

In a case where the cross-correlation coefficient described above is employed, the similarity is expressed within a range between −1 and 1. Therefore, for example, an exclusion condition of such a modification includes a condition "similarity<threshold value" or a condition "similarity<0" as a requirement of "+α" as illustrated in FIG. 5C.

In this manner, if the exclusion condition includes similarity of the template matching result as well as the frequency ratio of the histogram, it is possible to contribute to improving the attachable matter detection accuracy.

Returning to FIG. 3, in a case where a predetermined trigger suitable for adjusting the exclusion condition is generated, the condition adjustment unit 11d adjusts the exclusion condition and performs a process of appropriately updating the condition information 12a.

A specific example of this case will be described with reference to FIG. 6. FIG. 6 is a diagram illustrating a specific example of adjustment of the exclusion condition. As illustrated in FIG. 6, as a trigger for adjusting the exclusion condition, for example, "scene change timing" may be employed.

The scene change timing corresponds to, for example, a case where a change of day and night or landscape that can be determined by analyzing a camera image from the camera 2 is detected.

In such a case, as an example of the adjustment content, for example, it is conceived that, when a scene change to an urban area at night is detected, raindrops as an attachable matter are strongly reflected by many light sources existing in streets, and their contours become clear (the ratio of "high" in the edge intensity increases). Therefore, as an exclusion condition for excluding raindrops in such a case, for example, adjustment may be performed by decreasing the ratio of the "high" in the edge intensity (refer to "1" in the drawings).

As another trigger for adjusting the exclusion condition, for example, the "detection area position" may be used. For example, if the detection area is a position corresponding to the sky, it is considered that there is little influence on the visibility during driving of a driver. Therefore, in this case, for example, the condition adjustment unit 11d performs adjustment such that the detection area of this position is unconditionally excluded as an example of the adjustment content.

As further another trigger for adjusting the exclusion condition, for example, "continuity between a plurality of frames" may be used. For example, if the detection area is detected in only a single frame, a possibility of the attachable matter is considered to be low. In this case, for example, the condition adjustment unit 11d performs adjustment such that the detection area having a single frame is unconditionally excluded as an example of the adjustment content.

In this manner, if the exclusion condition is adjusted in a case where a predetermined trigger suitable for adjustment of the exclusion condition is generated, it is possible to detect an attachable matter suitably depending on a situation during driving of the vehicle C. That is, it is possible to contribute to improving the attachable matter detection accuracy.

Figure 7:
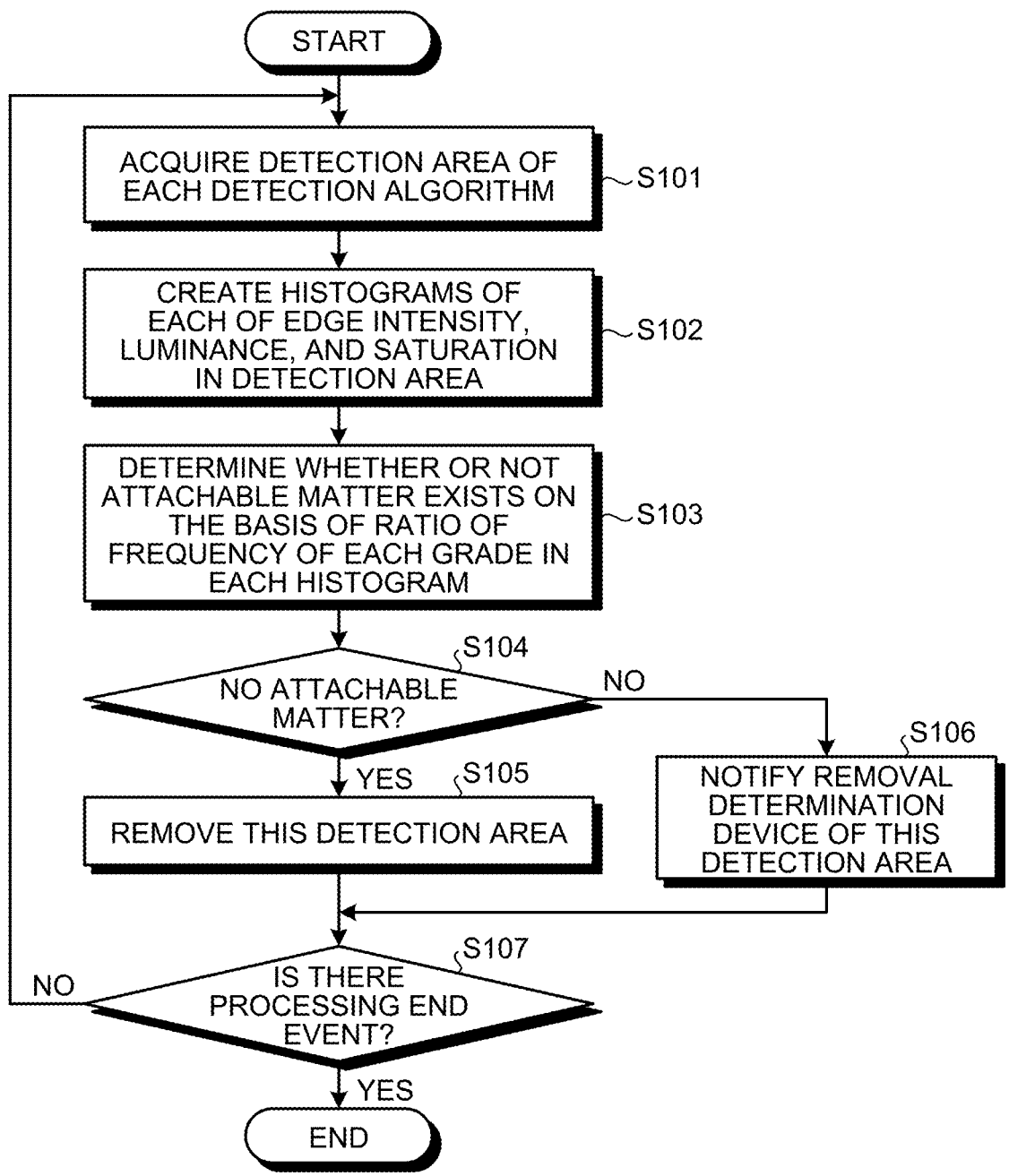
FIG. 7 is a flowchart illustrating a processing sequence executed by the attachable matter detection apparatus according to the first embodiment.

Next, a processing sequence executed by the attachable matter detection apparatus 10 according to this embodiment will be described with reference to FIG. 7. FIG. 7 is a flowchart illustrating a processing sequence executed by the attachable matter detection apparatus 10 according to the first embodiment.

First, the target area acquirement unit 11a acquires a detection area Da of each detection algorithm of the external attachable matter detection apparatus 4 (Step S101). In addition, the histogram creation unit 11b creates histograms for each of the edge intensity, the luminance, and the saturation of the detection area Da acquired by the target area acquirement unit 11a (Step S102).

The attachable matter determination unit 11c determines whether or not an attachable matter exists on the basis of the ratio of frequency of each grade of each histogram created by the histogram creation unit 11b (Step S103).

Here, if it is determined that the detected object is not an attachable matter (Step S104, Yes), the attachable matter determination unit 11c excludes the corresponding detection area Da (Step S105). Otherwise, if it is determined that the detected object is an attachable matter (Step S104, No), the attachable matter determination unit 11c notifies the removal determination device 5 of this detection area (Step S106).

The control unit 11 determines whether or not there is a processing end event (Step S107). The processing end event corresponds to, for example, IG OFF, ACC OFF, and the like. Here, if it is determined that there is no processing end event (Step S107, No), the processing from Step S101 is repeated. In addition, if it is determined that there is a processing end event (Step S107, Yes), the attachable matter detection apparatus 10 terminates the processing.

As described above, the attachable matter detection apparatus 10 according to the first embodiment includes the target area acquirement unit 11a (corresponding to an example of "acquirement unit"), the histogram creation unit 11b (corresponding to an example of "creation unit"), and the attachable matter determination unit 11c (corresponding to an example of "determination unit").

The target area acquirement unit 11a acquires a detection area Da of an attachable matter (corresponding to an example of "determination target area") in a camera image (corresponding to an example of "photographic image"). The histogram creation unit 11b creates at least histograms of the edge intensity, the luminance, and the saturation for the detection area Da acquired by the target area acquirement unit 11a. The attachable matter determination unit 11c determines whether or not there is an attachable matter in the detection area Da on the basis of the ratio of the frequency of each grade of each of the histograms created by the histogram creation unit 11b.

Using the attachable matter detection apparatus 10 according to the first embodiment, it is possible to improve the attachable matter detection accuracy. In addition, since the unnecessary detection area Da can be excluded from the processing target of the rear stage, it is possible to achieve an effect of suppressing a processing load of the entire system.

Second Embodiment

Next, a second embodiment will be described with reference to FIGS. 3 and 8A to 14. As described above, according to the second embodiment, the attachable matter detection apparatus 10 executes one of the attachable matter detection algorithms-1, -2, . . . , and -n (refer to FIG. 2B). In this case, it is determined whether or not there is an attachable matter on the basis of the "change amount" between frames in each of the edge intensity histogram, the luminance histogram, and the saturation histogram of each partitioned area for each partitioned area (refer to FIG. 1D).

Note that a block structure of the attachable matter detection apparatus 10 according to the second embodiment can be described on the basis of the block diagram of the first embodiment. Therefore, for convenient description purposes, the description will be focused on the parts different from those of the first embodiment using the block diagram of FIG. 3 described above.

Referring to FIG. 3, in the attachable matter detection apparatus 10 according to the second embodiment, the target area acquirement unit 11a sets a plurality of partitioned areas for a single frame of a camera image of the camera 2 and acquires each of these partitioned areas as a determination target area.

Figure 8A:
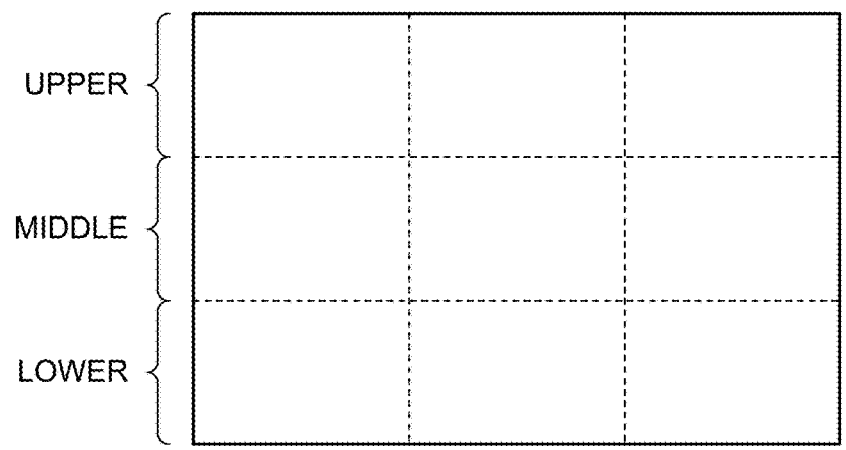
FIGS. 8A to 8D are (first to fourth) diagrams illustrating an example of setting partitioned areas.

Here, an exemplary setting of the partitioned area will be described with reference to FIGS. 8A to 8D. FIGS. 8A to 8D are (first to fourth) diagrams illustrating an exemplary setting of the partitioned area. As illustrated in FIG. 8A, the partitioned area may be set by partitioning the entire camera image of a single frame, for example, into nine partitioned areas (3 by 3).

Note that, in the following description, it is assumed that the case of FIG. 8A will be used as a predominant example, and upper, middle, and lower parts of a screen refer to upper, middle, and lower stages corresponding to upper, middle, and lower areas, respectively, of the drawing.

Although nine areas (3 by 3) are set in this case, the partitioning number is not limited, but may be set to sixteen areas (4 by 4). If the partitioned areas are more reduced, it is possible to contribute to improving detection accuracy of a small raindrop or the like.

Figure 8B:
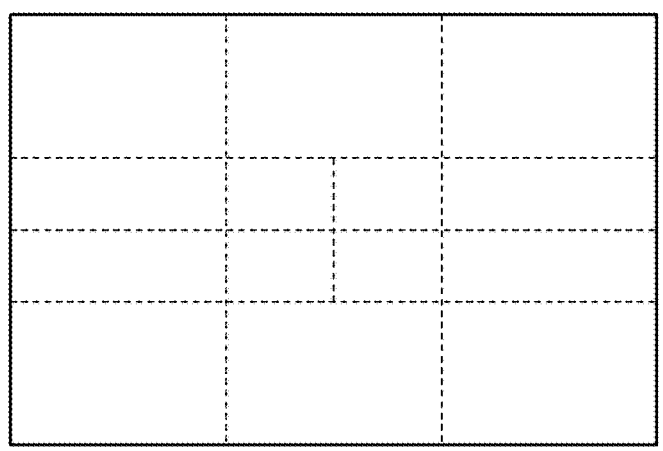

As illustrated in FIG. 8B, the size of the partitioned area may be not equal to each other. For example, as illustrated in FIG. 8B, for an area such as the vicinity of the center, considered to significantly influence on visibility of a driver when an attachable matter is attached, the partitioned area may be further reduced. As a result, it is possible to increase sensitivity for detecting the change amount for an area requiring high visibility for safety purposes or the like.

Figure 8C:
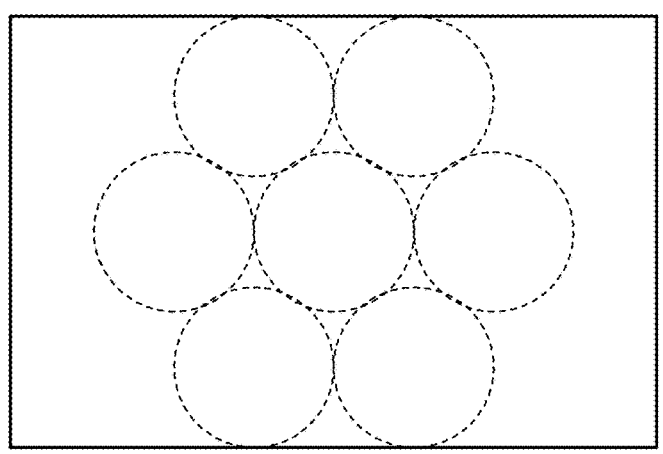

As illustrated in FIG. 8C, the partitioned area is not limited to a rectangular shape, but may be set to, for example, a circular shape matching the shape of the raindrop depending on the shape of the attachable matter. As a result, it is possible to easily recognize the change amount depending on the shape.

Figure 8D:
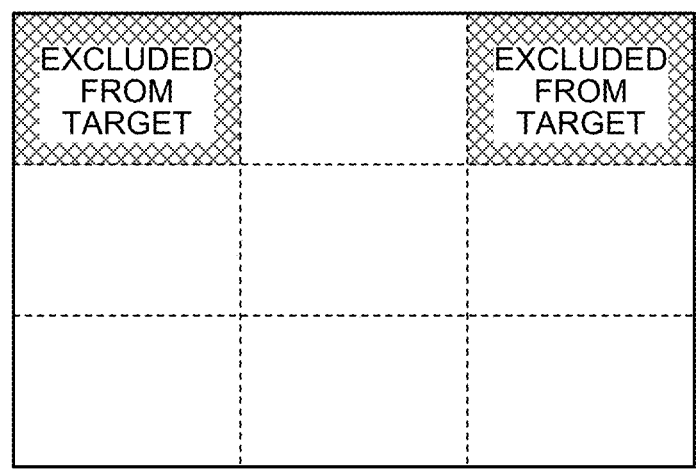

As illustrated in FIG. 8D, for example, a partitioned area determined as not significantly influencing on driver's visibility may be excluded from the target area in advance. In addition, such an area excluded from the target may be set variably depending on a change of a driving situation, and the like.

The partitioning number or the like may be changed depending on a change of the driving situation as well. For example, in day and night, it is considered that the change amount of the edge intensity, the luminance, or the like is smaller in the night. Therefore, when it is detected that night has come through image analysis or the like, sensitivity for detecting the change amount may be improved by dynamically increasing the partitioning number.

Returning to FIG. 3, in the attachable matter detection apparatus 10 according to the second embodiment, the histogram creation unit 11b creates each of the edge intensity histogram, the luminance histogram, and the saturation histogram of each acquired partitioned area. Information containing such histograms is stored for a previous frame one or more versions ago as well as the current frame.

The stored information will be described with reference to FIG. 9 in details. FIG. 9 is a diagram illustrating a specific example of the stored information according to the second embodiment. As illustrated in FIG. 9, according to the second embodiment, the created histograms are stored, for example, for the current frame, the previous frame one version ago, and the previous frame two versions ago. In addition, the change amount calculated from such a histogram, or the like is also stored.

More specifically, as illustrated in the stored information of FIG. 9, the stored information includes, at least, the number of data of the current frame (each frequency), the numbers of data of the previous frames one and two versions ago, a simple moving average (SMA), a change amount between the current frame and the simple moving average, and a change amount between the previous frames one and two versions ago and the simple moving average.

Note that, in the drawings, the mark "*" indicates a solution of the SMA according to this embodiment, and the mark "**" indicates a solution of the change amount according to this embodiment.

Returning to FIG. 3, in the attachable matter detection apparatus 10 according to the second embodiment, the attachable matter determination unit 11c at least compares the current change amount of each grade of the histogram and a progress of the previous change amount one version ago with a predetermined detection condition on the basis of the stored information described above, and determines that there is an attachable matter if such a detection condition is satisfied. The predetermined detection condition is included in the condition information 12a in advance.

Here, a specific example of the predetermined detection condition is illustrated in FIG. 10. FIG. 10 is a diagram illustrating a specific example of the detection condition.

As illustrated in FIG. 10, for example, the "detection condition" according to the second embodiment may include a case where the "high" of the "edge intensity" decreases by a predetermined amount, the "low" of the "edge intensity" increases by a predetermined amount, the "middle" of the "luminance" increases by a predetermined amount, and the "low" of the "saturation" increases by a predetermined amount.

A threshold value or the like for determining increase/decrease included in such a detection condition may be set as a parameter in each partitioned area. For example, FIG. 11 is a diagram illustrating an example of the parameter setting screen. Note that such a parameter setting screen is illustrated for convenient description purposes in order to describe that parameters can be set for each partitioned area, and is not indispensable in the system.

As illustrated in FIG. 11, on the parameter setting screen, a widget such as a checkbox or a slider is used for each element ("edge intensity," "luminance," and "saturation") of the histogram and each grade of these elements to allow setting of the threshold value corresponding to the "predetermined amount."

For example, in the "edge intensity" column, the "high" and "low" boxes are checked, and the slider is controlled. In the case of "high," a condition of "decrease" can be set by setting the threshold value to a negative value. In addition, in the case of "low," a condition of "increase" can be set by setting the threshold value to a positive value.

In such a parameter setting screen, threshold values can be set individually for areas corresponding to each of the "upper," "middle," and "lower" rows of the screen (refer to FIG. 8A). For example, in FIG. 11, an example is illustrated in which an area corresponding to "lower" of a screen surrounded by a closed curve of a dotted line is set differently from that of the "upper" or "middle."

As for the camera image from the camera 2 mounted on the vehicle C, since the change amount tends to be greater in the "lower" of the screen, parameters are set individually depending on such a characteristic. In this manner, by making it possible to set the parameter of the change amount depending on each characteristic of the partitioned area, it is possible to contribute to improving the attachable matter detection accuracy.

In the attachable matter determination unit 11c according to the second embodiment, it is possible to improve the attachable matter detection accuracy by determining a progress including the previous change amount two versions ago in addition to the current change amount and the previous change amount one version ago for each grade of the histogram.

A specific example of such a case will be described with reference to FIGS. 12A and 12B. FIGS. 12A and 12B are (first and second) diagrams illustrating a specific example of a determination method in a case where the previous change amount one and two versions ago is included. Note that FIG. 12A illustrates a progress of the change amount of the edge intensity in the case of the attachable matter, and FIG. 12B illustrates a progress of the change amount of the edge intensity in the case of the white line.

In any of FIGS. 12A and 12B, it is difficult to see a significant difference in the progress between the current change amount and the previous change amount one version ago. In this case, it is possible to improve the attachable matter detection accuracy by determining the progress additionally including the previous change amount two versions ago.

Specifically, referring to FIG. 12A, in the case of an attachable matter, it is recognized that a progress between the previous change amount two versions ago and the previous change amount one version ago indicated in a portion surrounded by a closed curve M1 of a dotted line has no significant change. In addition, in FIG. 12A, it is recognized that the change amount abruptly decreases in the progress between the previous change amount one version ago and the current change amount after the aforementioned progress.

This indicates a characteristic of the raindrop that unexpectedly adheres to blur the camera image and reduces the edge intensity of the "high." Therefore, in a case where the progress of the change amount of FIG. 12A is exhibited, it is possible to determine that this is an attachable matter.

Meanwhile, referring to FIG. 12B, in the case of a white line, it is recognized that the progress of the change amount between the previous change amount two versions ago and the previous change amount one version ago indicated by a closed curve M2 of a dotted line gradually decreases from the "+" side. This progress is different from the characteristic of the raindrop illustrated in FIG. 12A. Therefore, in a case where the progress of the change amount of FIG. 12B is exhibited, it is possible to determine that this is not an attachable matter.

In this manner, by determining the progress of the change amount including previous change amounts, it is possible to improve the attachable matter detection accuracy. In addition, since it is determined whether or not an attachable matter is adhered on the basis of the temporal progress of the change amount of the histogram including the edge intensity, it is possible to detect an attachable matter with high accuracy, for example, even when a water repellent coating of the lens 2a is degraded, and a blur raindrop having an unclear contour is attached.

Returning to FIG. 3, in the attachable matter detection apparatus 10 according to the second embodiment, the condition adjustment unit 11d adjusts the detection condition and performs a process of appropriately updating the condition information 12a when a predetermined trigger suitable for adjustment of the detection condition is generated.

A specific example of this case will be described with reference to FIG. 13. FIG. 13 is a diagram illustrating a specific example of adjustment of the detection condition. As illustrated in FIG. 13, as a trigger for adjusting the detection condition, for example, a "partitioned area position" may be employed.

In this case, as an example of the adjustment content, the change amount tends to be steep in the "lower" side of the screen as described above. Therefore, for example, if the "partitioned area position" is placed in the "lower" side of the screen, the condition adjustment unit 11d performs adjustment for reinforcing the condition to prevent the detection sensitivity from being excessively high accordingly.

As another trigger for adjusting the detection condition, for example, a "travel state," may be employed. In this case, for example, while the vehicle C stops, an attachable matter such as raindrops is easily attached compared to a traveling state. Therefore, in this case, for example, the condition adjustment unit 11d performs adjustment for loosening the condition to increase the detection sensitivity as an example of the adjustment content.

As further another trigger for adjusting the detection condition, for example, "wiper operation," "rain sensor," "rainfall information reception," or the like may be employed. All of them indicate a situation in which an attachable matter is easily attached due to a rainfall or the like. Therefore, in this case, for example, the condition adjustment unit 11d performs adjustment for loosening the condition to increase the detection sensitivity as an example of adjustment content.

As still another trigger for adjusting the detection condition, for example, a "color of the sky" may be employed. If it is detected that the sky is cloudy or rainy from the color of the sky through the image analysis of the camera image, similarly to the "wiper operation" described above, for example, the condition adjustment unit 11d performs adjustment for loosening the condition as an example of the adjustment content.

As still further another trigger for adjusting the exclusion condition, for example, a "gyro sensor" may be employed. For example, if it is detected that the vehicle C is traveling downhill using the gyro sensor, similarly to the "wiper operation" described above, the condition adjustment unit 11d performs adjustment for loosening the condition to increase the detection sensitivity.

Note that this is because, if the vehicle is traveling downhill, for example, the lens 2a of the rear camera 2-2 faces upward compared to a normal operation, so it can be said that raindrops are easily attached in the case of rainfall or the like.

Next, a processing sequence executed by the attachable matter detection apparatus 10 according to this embodiment will be described with reference to FIG. 14. FIG. 14 is a flowchart illustrating a processing sequence executed by the attachable matter detection apparatus 10 according to the second embodiment.

First, the target area acquirement unit 11a acquires each partitioned area from a single frame of the camera image of the camera 2 (Step S201). In addition, the histogram creation unit 11b creates each of the edge intensity histogram, the luminance histogram, and the saturation histogram of each partitioned area acquired by the target area acquirement unit 11a (Step S202).

In addition, the attachable matter determination unit 11c determines whether or not there is an attachable matter for each partitioned area on the basis of the change amount between frames of each histogram created by the histogram creation unit 11b (Step S203).

Here, if it is determined that there is an attachable matter (Step S204, Yes), the attachable matter determination unit 11c notifies the removal determination device 5, for example, of this partitioned area (Step S205). In addition, if it is determined that there is no attachable matter (Step S204, No), the attachable matter determination unit 11c advances the control to Step S206.

Then, the control unit 11 determines whether or not there is a processing end event (Step S206). The processing end event corresponds to, for example, IG OFF, ACC OFF, and the like. Here, if it is determined that there is no processing end event (Step S206, No), the process is repeated from Step S201. Otherwise, if it is determined that there is a processing end event (Step S206, Yes), the attachable matter detection apparatus 10 terminates the process.

As described above, in the attachable matter detection apparatus 10 according to the second embodiment, the attachable matter determination unit 11c determines whether or not there is an attachable matter on the basis of the change amount between the current frame and the previous frame in the histogram created by the histogram creation unit 11b.

Therefore, using the attachable matter detection apparatus 10 according to the second embodiment, it is possible to easily detect an attachable matter on the basis of the characteristic of raindrops exhibited in the change amount between frames even in the case of, for example, raindrops having a blur contour so that it is difficult to detect an edge. That is, it is possible to improve the attachable matter detection accuracy.

Third Embodiment

Next, a configuration of the removal control device 50 that has a function of the attachable matter detection apparatus 10 described above and controls the whole processes including detection of an attachable matter to removal of the attachable matter according to a third embodiment will be described with reference to FIGS. 15 to 19.

Figure 15:
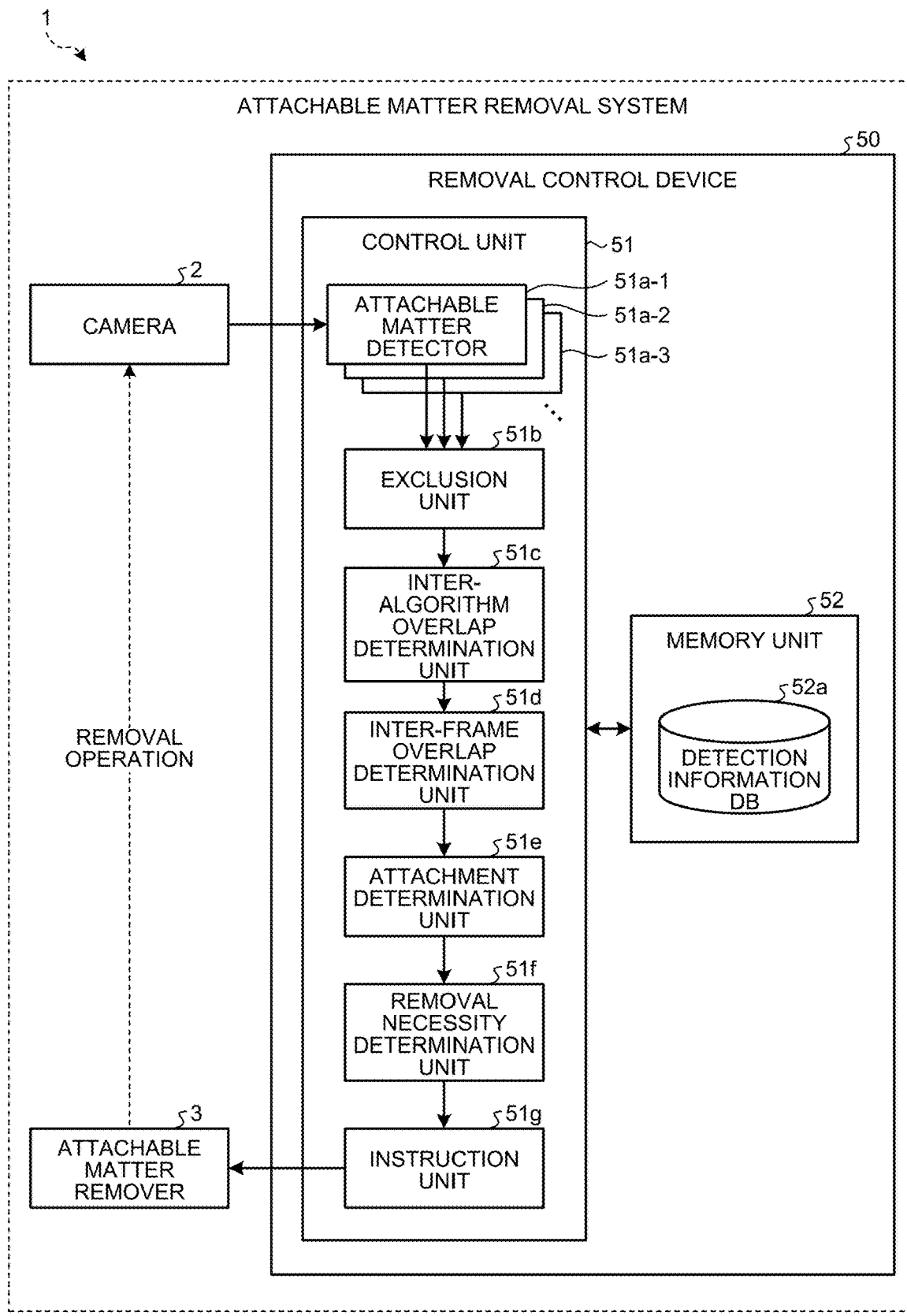
FIG. 15 is a block diagram illustrating an attachable matter removal system according to a third embodiment.

FIG. 15 is a block diagram illustrating an attachable matter removal system 1 according to a third embodiment. Note that, in FIG. 15, only elements necessary to describe features of this embodiment are illustrated as functional blocks, and general elements are not illustrated intentionally.

In other words, each element illustrated in FIG. 15 is functional and conceptual, and is not necessarily configured as illustrated in a physical sense. For example, a distributed and/or integrated version of each functional block is not limited to those illustrated, and its entirety or a part thereof may be functionally or physically distributed or integrated in an arbitrary unit depending on various loads, use situations, and the like.

Figures 16A, 16B:
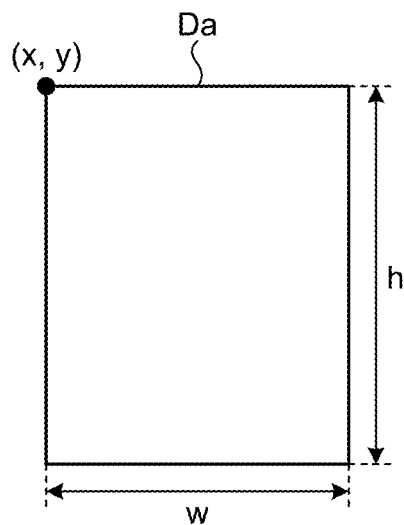
FIG. 16A is a diagram illustrating an exemplary content of notification from an attachable matter detector.
FIG. 16B is a diagram illustrating an exemplary content of data regarding a detection area included in a detection information DB.
Figure 16C:
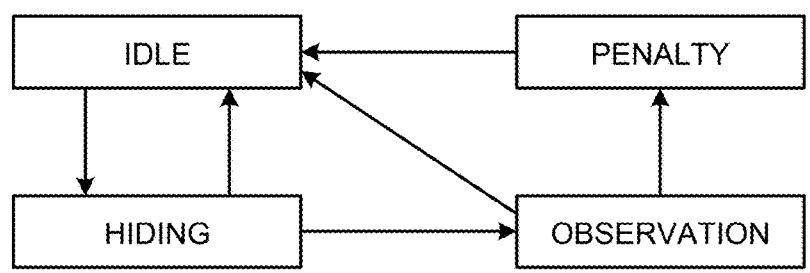
FIG. 16C is an explanatory diagram illustrating a detection area state.

FIG. 16A is a diagram illustrating an exemplary content of notification from an attachable matter detector 51a. In addition, FIG. 16B is a diagram illustrating an exemplary content of data regarding the detection area Da contained in a detection information database (DB) 52a. Furthermore, FIG. 16C is an explanatory diagram illustrating a state of the detection area Da.

As illustrated in FIG. 15, the attachable matter removal system 1 includes a camera 2, an attachable matter remover 3, and a removal control device 50. Since the camera 2 and the attachable matter remover 3 have been described above, they will not be described here.

The removal control device 50 includes a control unit 51 and a memory unit 52. The control unit 51 includes a plurality of attachable matter detectors 51a (for example, attachable matter detectors 51a-1, 51a-2, 51a-3, . . . ), an exclusion unit 51b, an inter-algorithm overlap determination unit 51c, an inter-frame overlap determination unit 51d, an attachment determination unit 51e, a removal necessity determination unit 51f, and an instruction unit 51g.

The memory unit 52 is a memory device such as a hard disk drive, a nonvolatile memory, and a register and stores the detection information DB 52a.

The control unit 51 controls the entire removal control device 50. Each of a plurality of attachable matter detectors 51a acquires a camera image of a single frame from the camera 2 and extracts a detection area Da estimated to have an attachable matter out of the camera image using a corresponding detection algorithm. In addition, the attachable matter detector 51a notifies the exclusion unit 51b of the extracted detection area Da.

Note that the attachable matter detection apparatus 10 according to the second embodiment described above corresponds to any one of the plurality of attachable matter detectors 51a according to this embodiment described above.

Here, as illustrated in FIG. 16A, the content of the notification from the attachable matter detector 51a includes, for example, an upper left coordinate (x,y), a width w, and a height h of the detection area Da extracted as a rectangular shape.

The exclusion unit 51b performs an image analysis for each detection area Da notification of which is provided from the attachable matter detector 51a and determines whether or not such an attachable matter estimated to exist in the detection area Da is truly an attachable matter.

The exclusion unit 51b notifies the inter-algorithm overlap determination unit 51c of the detection area Da determined as having an attachable matter as a result of the determination. Otherwise, the exclusion unit 51b does not notify the inter-algorithm overlap determination unit 51c of a detection area Da determined as having no attachable matter as a result of the determination, but excludes it from the processing target of the rear stage. In this manner, by excluding an unnecessary image area, it is possible to improve the attachable matter detection accuracy and reduce a processing load of the rear stage.

Note that the attachable matter detection apparatus 10 of the first embodiment described above corresponds to the exclusion unit 51b according to this embodiment.

The inter-algorithm overlap determination unit 51c determines an overlap of the detection area Da between a plurality of algorithms in the current frame, that is, whether or not there is an overlapping portion between the detection areas Da extracted from each of the attachable matter detectors 51a. In addition, the inter-algorithm overlap determination unit 51c reflects the determination result as "score" of each detection area Da. The reflection result is managed on the detection information DB 52a. The determination process executed by the inter-algorithm overlap determination unit 51c will be described below in more details with reference to FIGS. 17A to 17D.

The inter-frame overlap determination unit 51d determines whether or not there is any overlap with the detection area Da already extracted in the previous frame for all processing results of the inter-algorithm overlap determination unit 51c of the current frame. In addition, the inter-frame overlap determination unit 51d reflects the determination result in "score" and "state" of each detection area Da. The reflection result is managed on the detection information DB 52a.

Here, as illustrated in FIG. 16B, the detection information DB 52a includes, for example, a "detection area ID" column, an "area information" column, a "score" column, and a "state" column. The "detection area ID" column stores an identifier of the detection area Da, and the detection information DB 52a is managed for each detection area ID described above.

The "area information" column stores the upper left coordinate (x,y), the width w, the height h, and the like of the detection area Da illustrated in FIG. 16A. The "score" column stores the current score of each detection areas Da. The "state" column stores the current state of each detection area Da.

As illustrated in the state machine diagram of FIG. 16C, each detection area Da can transfer to four states including "IDLE," "HIDING," "OBSERVATION," AND "PENALTY." The state "IDLE" refers to a "non-detection state," that is, a state in which no attachable matter is attached. The state "HIDING" refers to a state in which "an attachable matter is likely to be attached."

The state "OBSERVATION" refers to an "observation state after the removal process" in which an attachable matter is removed by the attachable matter remover 3. The state "PENALTY" refers to a "state in which an attachable matter is continuously detected from the corresponding area even after the removal process," that is, a removal failure or error detection state.

The inter-frame overlap determination unit 51d updates the "score" of each detection area Da and transfers the "state" on the detection information DB 52a depending on the determination result.

Returning to FIG. 15, the attachment determination unit 51e determines "attachment confirmation" of the attachable matter depending on the "STATE" and "SCORE" of the detection area Da of the detection information DB 52a.

The removal necessity determination unit 51*f* determines whether or not an attachable matter removal operation is actually performed by the attachable matter remover 3 if the "attachment confirmation" is determined by the attachment determination unit 51*e*. The processing performed by the inter-frame overlap determination unit 51*d*, the attachment determination unit 51*e*, and the removal necessity determination unit 51*f* will be described below in more details with reference to FIGS. 18A to 18E.

The instruction unit 51*g* generates an instruction signal for allowing the attachable matter remover 3 to perform a removal operation and transmits this instruction signal to the attachable matter remover 3 in a case where the removal necessity determination unit 51*f* determines that it is necessary to remove an attachable matter.

Note that the removal determination device 5 of the first and second embodiments described above corresponds to the inter-algorithm overlap determination unit 51*c*, the inter-frame overlap determination unit 51*d*, the attachment determination unit 51*e*, the removal necessity determination unit 51*f*, and the instruction unit 51*g* according to this embodiment.

Next, the determination process executed by the inter-algorithm overlap determination unit 51*c* will be described in more details with reference to FIGS. 17A to 17D. FIGS. 17A to 17D are (first to fourth) explanatory diagrams illustrating the processing of the inter-algorithm overlap determination unit 51*c*.

Figure 17A:
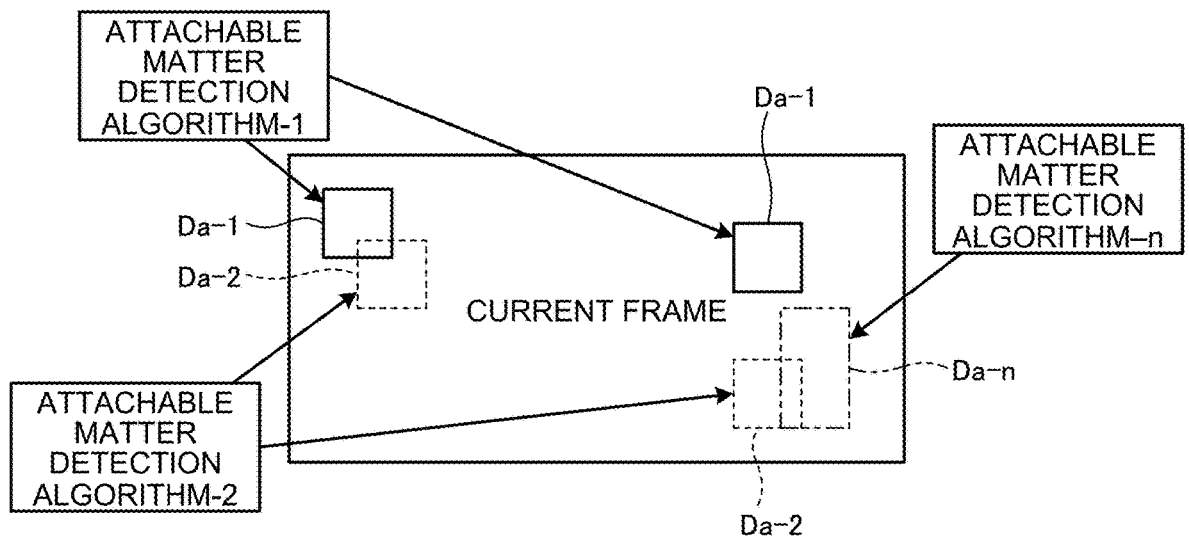

As described above, the inter-algorithm overlap determination unit 51*c* determines whether or not there is an overlap of the detection area Da between a plurality of algorithms in the current frame as illustrated in FIG. 17A. Specifically, as illustrated in FIG. 17A, for example, it is determined whether or not there is an overlap between all of the detection areas Da-1 of the attachable matter detection algorithm-1 and all of the detection areas Da-2 of the attachable matter detection algorithm-2. This determination is similarly performed between the attachable matter detection algorithm-1 and the attachable matter detection algorithm-n or between the attachable matter detection algorithm-2 and the attachable matter detection algorithm-n.

Figure 17B:
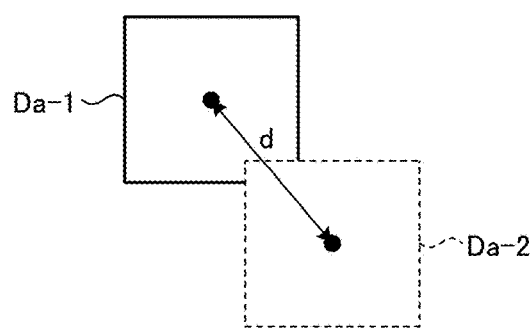

Note that, as illustrated in FIG. 17B, for example, an overlap between the detection area Da-1 and the detection area Da-2 is determined on the basis of a distance d from the center.

Figure 17C:
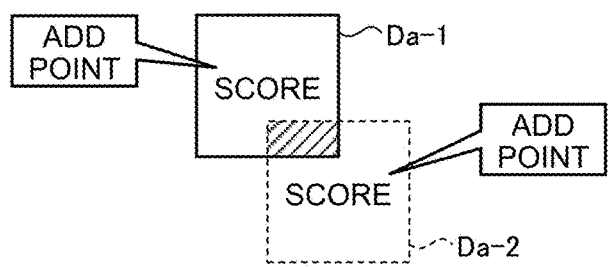

For example, in a case where it is determined that there is an overlap between the detection area Da-1 and the detection area Da-2, the inter-algorithm overlap determination unit 51*c* adds a point to the scores of the detection areas Da-1 and Da-2 as illustrated in FIG. 17C.

As a result, it is possible to express a fact that a possibility of existence of an attachable matter is higher in the detection areas Da-1 and Da-2 having an overlap compared to the detection area Da having no overlap.

For example, in a case where there is an overlap in the detection areas Da-1 and Da-2 as illustrated in FIG. 17D, the inter-algorithm overlap determination unit 51*c* updates the area information of the detection areas Da-1 and Da-2.

For example, as illustrated in (a) of FIG. 17D, the area information is integrated in the detection area Da-1 by prioritizing the detection area Da-1. In addition, as illustrated in (b) of FIG. 17D, the area information is integrated in the detection area Da-2 by prioritizing the detection area Da-2 on the contrary.

As illustrated in (c) of FIG. 17D, a logical product is taken, and the area information is integrated into the detection area Da-A for only the overlapping portion. In addition, as illustrated in (d) of FIG. 17D, the area information may be integrated into the detection area Da-S corresponding to a logical sum of the detection areas Da-1 and Da-2.

As illustrated in (e) of FIG. 17D, the area information may be integrated into the detection area Da-E expanded to include both the detection area Da-1 and the Da-2.

Figure 18A:
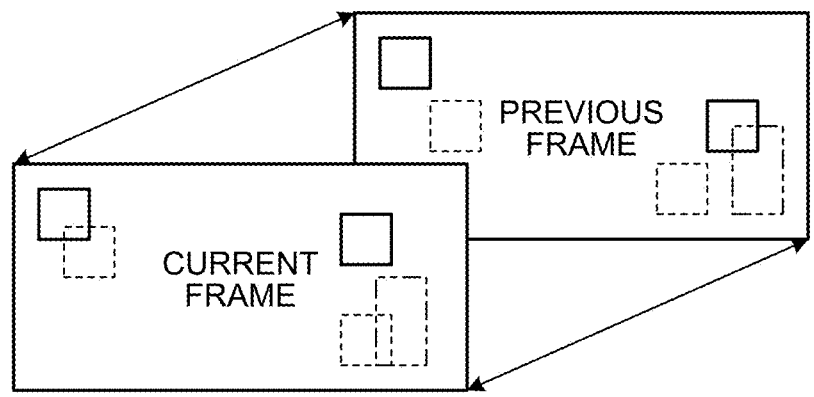
FIGS. 18A to 18C are (first to third) processing explanatory diagrams of an inter-frame overlap determination unit.
Figure 18B:
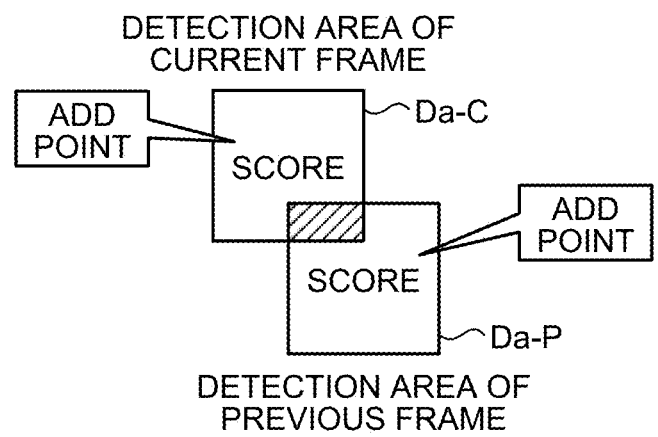
Figure 18C:
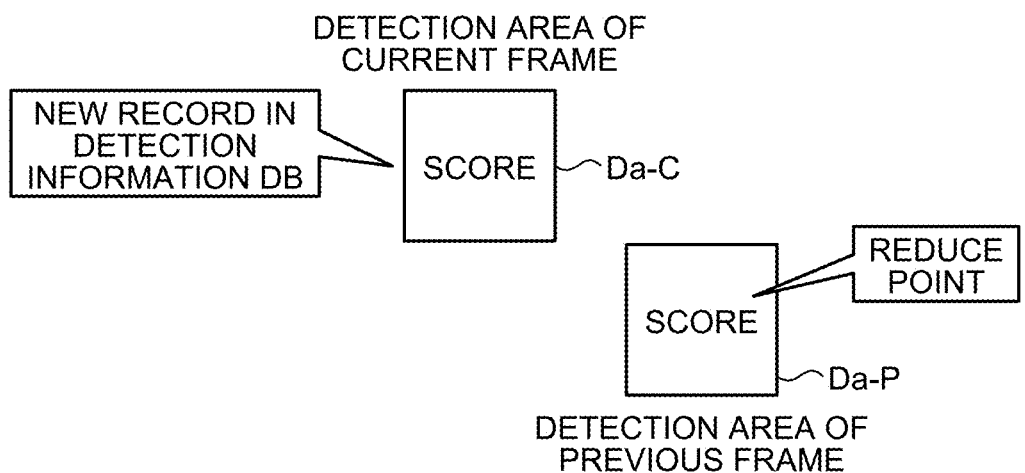

Next, the processing executed by the inter-frame overlap determination unit 51*d*, the attachment determination unit 51*e*, and the removal necessity determination unit 51*f* will be described in details with reference to FIGS. 18A to 18E. FIGS. 18A to 18C are (first to third) explanatory diagrams illustrating the processing of the inter-frame overlap determination unit 51*d*.

Figure 18D:
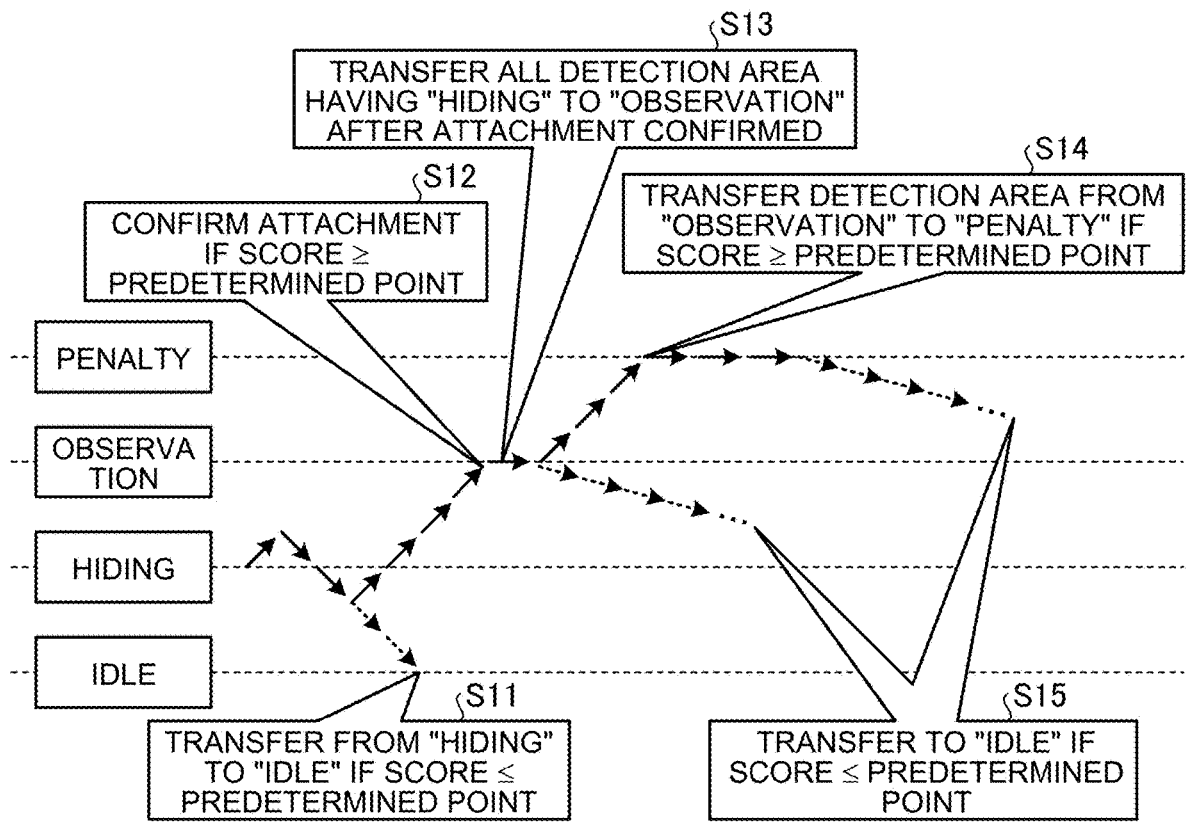
FIG. 18D is a processing explanatory diagram of an inter-frame overlap determination unit and an attachment determination unit.
Figure 18E:
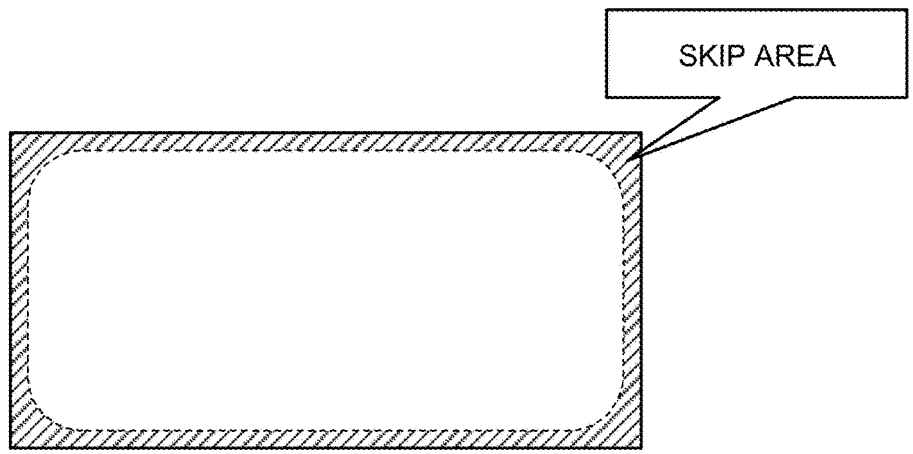
FIG. 18E is a processing explanatory diagram of a removal necessity determination unit.

FIG. 18D is an explanatory diagram illustrating the processing of the inter-frame overlap determination unit 51*d* and the attachment determination unit 51*e*. In addition, FIG. 18E is an explanatory diagram illustrating the processing of the removal necessity determination unit 51*f*.

As described above, the inter-frame overlap determination unit 51*d* determines whether or not there is an overlap with each detection area Da where extraction has been completed for the previous frame for all of the processing results of the inter-algorithm overlap determination unit 51*c* regarding the current frame as illustrated in FIG. 18A.

Specifically, as illustrated in FIG. 18B, it is determined whether or not there is an overlap between all of the detection areas Da-C of the current frame and all of the detection areas Da-P of the previous frame. Note that a solution of the overlap may be similar to that of the inter-algorithm overlap determination unit 51*c*.

As illustrated in FIG. 18B, if it is determined that there is an overlap between the detection area Da-C of the current frame and the detection area Da-P of the previous frame, the inter-frame overlap determination unit 51*d* adds a point to each score of the detection areas Da-C and Da-P.

As a result, the inter-frame overlap determination unit 51*d* can indicate an attachable matter existing in substantially the same area in the lens 2*a*, for example, between distant frames.

Meanwhile, in a case where there is no overlap between the detection area Da-P of the previous frame and the detection area Da-C of the current frame as illustrated in FIG. 18C, the inter-frame overlap determination unit 51*d* reduces the score.

The inter-frame overlap determination unit 51*d* determines that the detection area Da-C of the current frame having no overlap with any one of the detection area Da-P of the previous frame is a new detection area Da and newly registers it on the detection information DB 52*a*.

As illustrated in FIG. 18D, the newly registered detection area Da is given a predetermined score and has a "HIDING" state. In addition, the inter-frame overlap determination unit 51*d* and the attachment determination unit 51*e* transfer the state of the detection area Da depending on the score of the detection area Da that changes through the "adding point" or "reducing point" described above from such a "HIDING" state.

For example, in a case where the score of the detection area Da having the "HIDING" state becomes equal to or lower than a predetermined point as illustrated in FIG. 18D, the inter-frame overlap determination unit 51*d* transfers the state of this detection area Da from "HIDING" to "IDLE" (Step S11). As a result, it is possible to prevent an erroneous response in which a removal process is performed, for example, for an attachable matter such as raindrops not necessary to remove because they flow down, move, and the like.

In a case where the score of the detection area Da having the "HIDING" state becomes equal to or higher than a predetermined point, the attachment determination unit 51*e* confirms attachment of the attachable matter for this area (attachment confirmation) (Step S12).

After the attachment confirmation, the attachment determination unit 51*e* transfers all the detection area Da having the "HIDING" state to the "OBSERVATION" state (Step S13). This is because, in a case where a removal process is performed in response to attachment confirmation of a single detection area Da, it is estimated that an attachable matter is removed from other detection areas Da having the "HIDING" state that are not determined as attachment confirmation in a normal case.

Note that, in a case where the score of the detection area Da having the "OBSERVATION" state through the removal process becomes equal to or higher than a predetermined point, the inter-frame overlap determination unit 51*d* transfers the detection area Da to the "PENALTY" state (Step S14). As a result, it is possible to recognize a removal failure or error detection in which an attachable matter is continuously detected even after the removal process.

In a case where the score of the detection area Da having the "OBSERVATION" state or the "PENALTY" state becomes equal to lower than a predetermined point, the inter-frame overlap determination unit 51*d* transfers the detection area Da to the "IDLE" state (Step S15).

Note that, in FIG. 18D, a response speed until attachment confirmation may be controlled by adjusting a slope of the arrow indicating "adding point" or "reducing point." For example, it is possible to increase the response speed taken from detection of an attachable matter to the removal process by steeply changing the slope of the arrow by increasing the added point and the reduced point.

The removal process may not be performed even for a detection area Da subjected to the attachment confirmation. For example, as illustrated in FIG. 18E, the removal necessity determination unit 51*f* determines that execution of the removal process is not necessary if the detection area Da subjected to the attachment confirmation exists in a skip area substantially extending along the outer circumference of the screen.

In this manner, it is possible to reduce a processing load of the entire system by skipping the removal process for an attachable matter attached to an image area less influencing visibility of a passenger or a driving operation.

Figure 19:
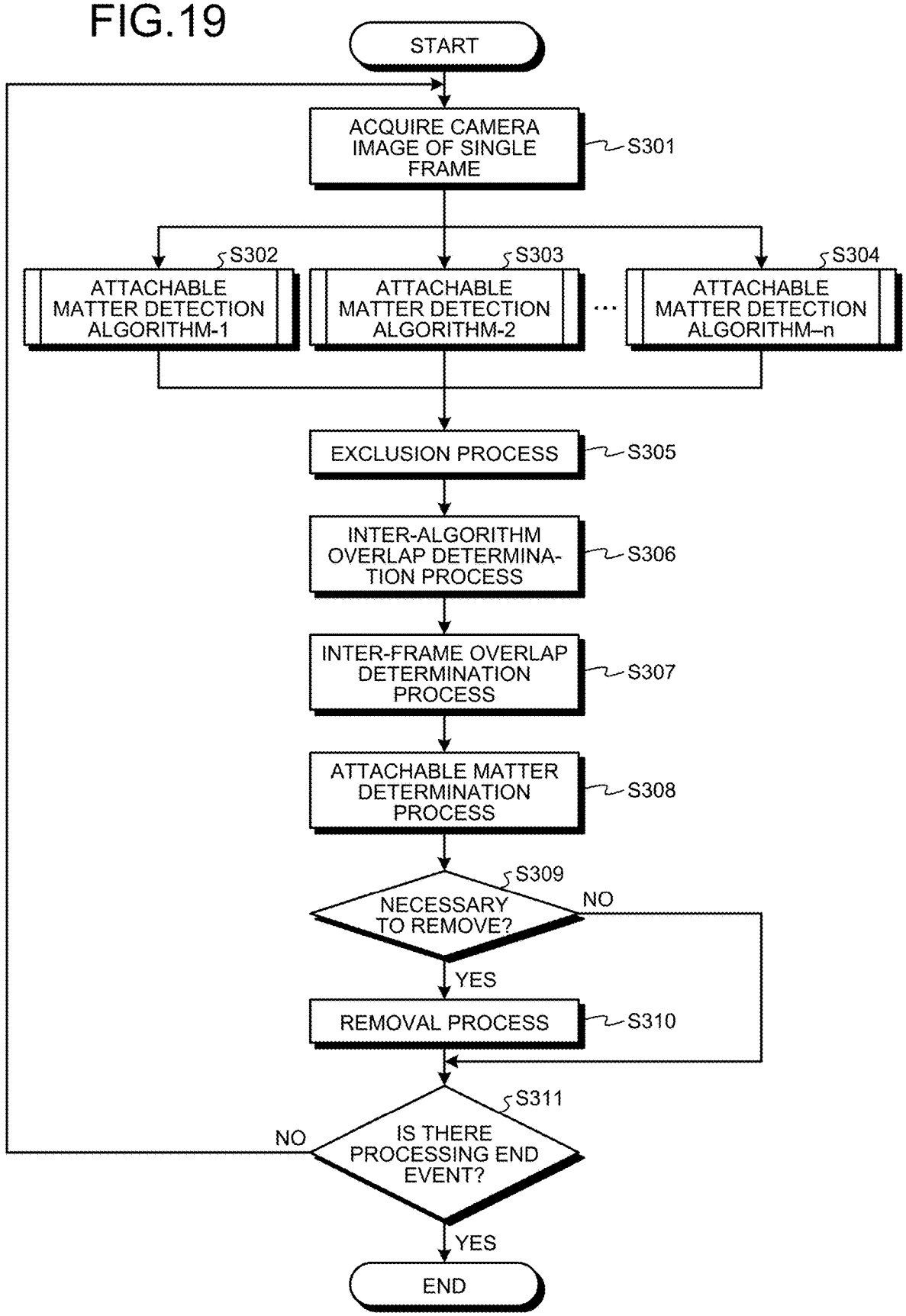
FIG. 19 is a flowchart illustrating a processing sequence executed by an attachable matter removal system according to the third embodiment.

Next, a processing sequence executed by the attachable matter removal system 1 according to this embodiment will be described with reference to FIG. 19. FIG. 19 is a flowchart illustrating a processing sequence executed by the attachable matter removal system 1 according to the third embodiment.

First, each of a plurality of attachable matter detectors 51*a* acquires a camera image of a single frame (Step S301). In addition, for example, the attachable matter detector 51*a*-1 extracts a detection area Da-1 using an attachable matter detection algorithm-1 (Step S302).

For example, the attachable matter detector 51*a*-2 extracts a detection area Da-2 using the attachable matter detection algorithm-2 (Step S303). In addition, for example, the attachable matter detector 51*a*-*n* extracts a detection area Da-*n* using the attachable matter detection algorithm-*n* (Step S304).

The exclusion unit 51*b* performs an exclusion process for each of detection areas Da extracted and notification of which is provided by the attachable matter detector 51*a* (Step S305). That is, the exclusion unit 51*b* determines whether or not the attachable matter estimated to exist in the detection area Da is truly an attachable matter. If this is not an attachable matter, the exclusion unit 51*b* excludes the corresponding detection area Da from the processing target of the rear stage.

Note that, for example, this exclusion process itself may be omitted. As a result, it is possible to reduce a processing load of the entire system.

Subsequently, the inter-algorithm overlap determination unit 51*c* performs an inter-algorithm overlap determination process (Step S306). That is, the inter-algorithm overlap determination unit 51*c* determines whether or not there is an overlap of the detection area Da between a plurality of frames in the current frame and updates the score of the detection area Da depending on the determination result.

The inter-frame overlap determination unit 51*d* performs an inter-frame overlap determination process (Step S307). That is, the inter-frame overlap determination unit 51*d* determines whether or not there is an overlap for all of the processing results of the inter-algorithm overlap determination unit 51*c* with each detection area Da from which extraction has been completed in the previous frame and updates the score and the state of the detection area Da depending on the determination result.

The attachment determination unit 51*e* performs an attachment determination process (Step S308). That is, the attachment determination unit 51*e* determines attachment confirmation of an attachable matter depending on the score and the state of the detection area Da of the detection information DB 52*a* updated by the inter-frame overlap determination unit 51*d*.

If the attachment determination unit 51*e* determines "attachment confirmation," the removal necessity determination unit 51*f* determines whether or not it is necessary to actually remove an attachable matter using the attachable matter remover 3 (Step S309).

Here, if it is determined that it is necessary to remove an attachable matter (Step S309, Yes), the instruction unit 51*g* outputs an instruction signal to the attachable matter remover 3 to allow the attachable matter remover 3 to perform a removal process (Step S310). Meanwhile, if it is determined that it is not necessary to remove an attachable matter (Step S309, No), the instruction unit 51*g* does not execute the removal process.

The control unit 51 determines whether or not there is a processing end event (Step S311). The processing end event corresponds to, for example, IG OFF, ACC OFF, and the like. Here, if it is determined that there is no processing end event (Step S311, No), the process is repeated from Step S301. Otherwise, if it is determined that there is a processing end event (Step S311, Yes), the attachable matter removal system 1 terminates the processing.

According to the third embodiment described above, for example, a case where the attachable matter detection apparatus 10 of the second embodiment executes one of the attachable matter detection algorithms-1, -2, . . . , n depending on any one of a plurality of attachable matter detectors 51*a* has been described by way of example. However, an example of the attachable matter detection algorithm is not limited to those of the second embodiment.

In this regard, in the following description, attachable matter detection apparatuses 10A, 10B, and 10C according to the fourth to sixth embodiments for executing individual attachable matter detection algorithms will be described. Note that, in the following description, a case where a water droplet as the attachable matter is attached to the lens 2*a* will be described by way of example.

Figure 20:
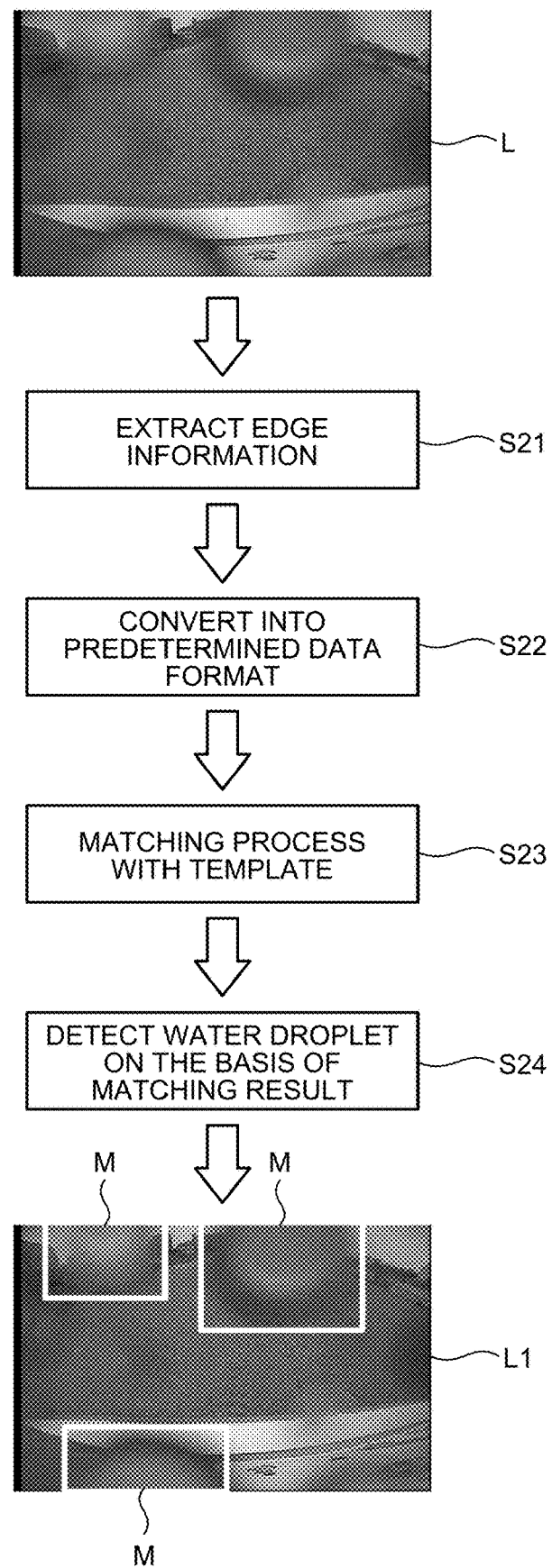
FIG. 20 is a diagram illustrating an overview of an attachable matter detection method according to fourth to sixth embodiments.

First, before describing the fourth to sixth embodiments, an overview of the attachable matter detection method according to the fourth to sixth embodiments will be described with reference to FIG. 20. FIG. 20 is a diagram illustrating an overview of the attachable matter detection method according to the fourth to sixth embodiments.

As illustrated in FIG. 20, in the attachable matter detection method according to the fourth to sixth embodiments, first, edge information is extracted from the camera image L (Step S21). Here, the edge information refers to, for example, a gradient of the luminance in the horizontal (X-axis) and vertical (Y-axis) directions of the drawings in each pixel of the camera image L.

Then, in the attachable matter detection method according to the fourth to sixth embodiments, each pixel of the camera image L is converted into a predetermined data format on the basis of this edge information (Step S22). Here, in the attachable matter detection method according to the fourth to sixth embodiments, by converting each pixel into a predetermined data format on the basis of the edge information, it is possible to improve detection accuracy of water droplets.

Specifically, each pixel is binarized on the basis of the edge intensity of each pixel in the camera image L. As a result, it is possible to prevent influence from luminance unevenness of the water droplet appearing in the camera image L. That is, it is possible to accurately detect a water droplet that reflects light. This will be described in details as a fourth embodiment with reference to FIGS. 21 to 27.

In the attachable matter detection method according to the fourth to sixth embodiment, each pixel is converted into a predetermined data format by using parameters whose edge directions opposite to the edge direction of each pixel in the camera image L have a 1's complement relationship.

As a result, it is possible to make clear a difference of the edge direction of each pixel. For this reason, it is possible to improve recognition accuracy in the matching process. This will be described in details as a fifth embodiment with reference to FIGS. 28 to 33.

In the attachable matter detection method according to the fourth to sixth embodiments, each pixel is encoded by allocating corresponding codes to the edge directions of each pixel in the camera image L.

In this case, a matching process using a normalized expression with a code string indicating water droplets is performed. As a result, in the camera image L, for example, it is possible to extract, for example, code strings of each side of the rectangle contained in the water droplet.

By detecting a water droplet attached to the camera 2 by combining the extracted code strings, it is possible to detect an irregular shape water droplet such as a water droplet that has been cut off from the camera image L. This will be described in details as a sixth embodiment with reference to FIGS. 34 to 39.

In the attachable matter detection method according to the fourth to sixth embodiments, a matching process is performed between each converted pixel and a template representing a water droplet (Step S23), and on the basis of the matching result, a water droplet attached to the camera 2 is detected (Step S24). Note that, in the camera image L1 illustrated in the same drawing, a mark M is indicated in a portion where a water droplet is detected by the attachable matter detection method.

In this manner, in the attachable matter detection method according to the fourth to sixth embodiments, each pixel of the camera image L is converted into a predetermined data format on the basis of edge information, and a water droplet attached to the camera 2 is detected through a matching process using such a data format.

Therefore, using the attachable matter detection method according to the fourth to sixth embodiments, it is possible to improve detection accuracy of a water droplet.

Note that, in the attachable matter detection method according to the fourth to sixth embodiments, a template indicating partial shapes of different parts of a water droplet is used depending on a scanning position of the matching process. This will be described below in more details with reference to FIGS. 23 and 24.

Fourth Embodiment

Figure 21:
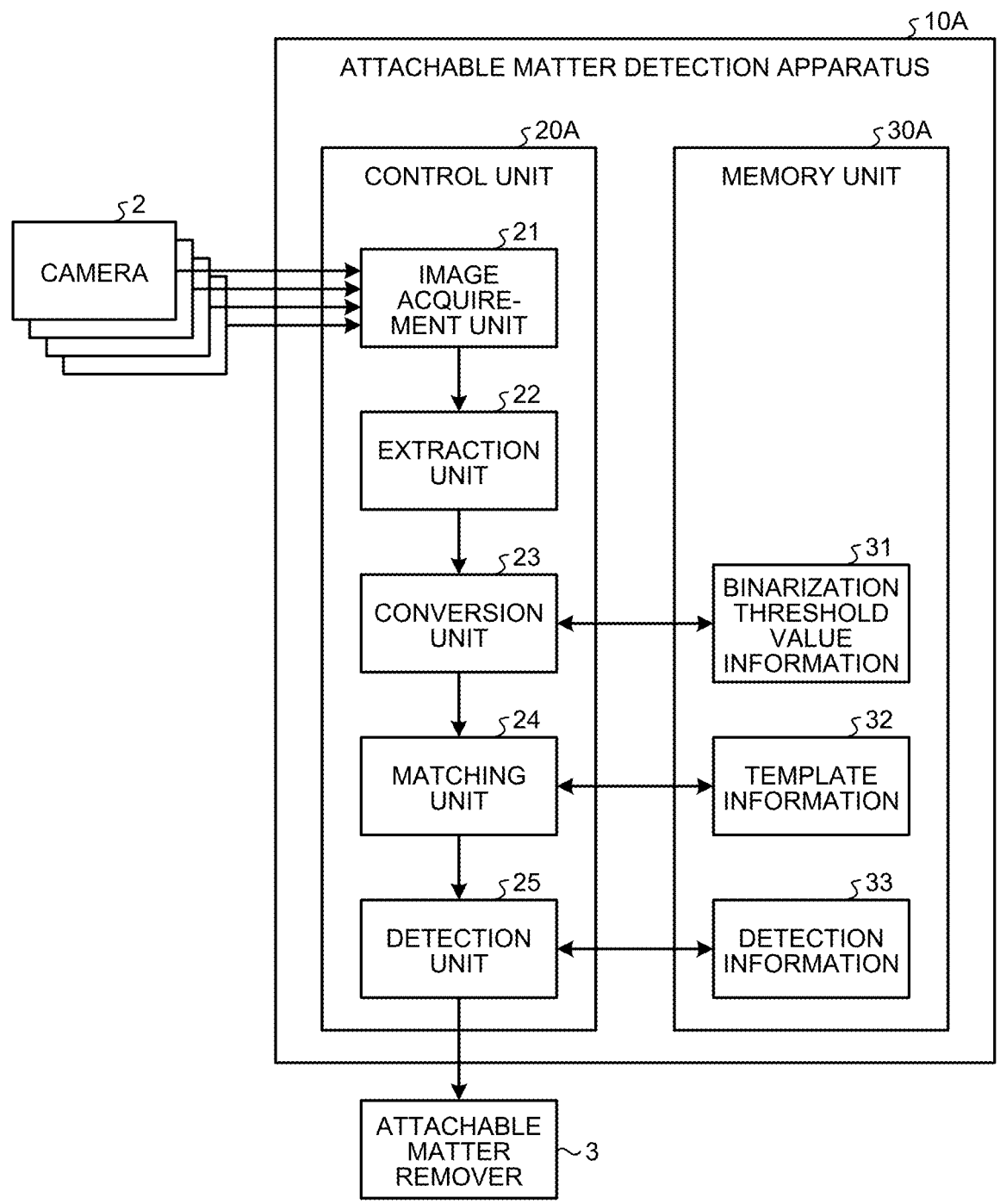
FIG. 21 is a block diagram illustrating an attachable matter detection apparatus according to the fourth embodiment.

Next, a configuration of an attachable matter detection apparatus 10A according to a fourth embodiment will be described. FIG. 21 is a block diagram illustrating an attachable matter detection apparatus 10A according to the fourth embodiment. Note that, in FIG. 21, the camera 2 and the attachable matter remover 3 described above are also illustrated. Note that the attachable matter detection apparatus 10A may also be provided in each camera 2.

Although, in the aforementioned example, the attachable matter remover 3 injects the compressed air and the washing liquid toward the lens 2a of the camera 2 (refer to FIG. 1B), the present application is not limited thereto. Instead, at least any one of the compressed air and the washing liquid may be injected. In addition, the attachable matter remover 3 may be configured to wipe out the lens 2a with a wiper.

The attachable matter detection apparatus 10A according to the fourth embodiment has a control unit 20A and a memory unit 30A. The control unit 20A includes an image acquirement unit 21, an extraction unit 22, a conversion unit 23, a matching unit 24, and a detection unit 25. In addition, the memory unit 30A stores binarization threshold value information 31, template information 32, and detection information 33.

The control unit 20A includes, for example, a central processing unit (CPU), a read-only memory (ROM), a random access memory (RAM), a hard disk drive (HDD), a computer having input/output ports, or various circuits.

The CPU of the computer serves as the image acquirement unit 21, the extraction unit 22, the conversion unit 23, the matching unit 24, and the detection unit 25 of the control unit 20A, for example, by reading and executing a program stored in the ROM.

At least any one or all of the image acquirement unit 21, the extraction unit 22, the conversion unit 23, the matching unit 24, and the detection unit 25 of the control unit 20A may be configured of hardware such as an application specific integrated circuit (ASIC) or a field programmable gate array (FPGA).

The memory unit 30A corresponds to, for example, RAM or HDD. The RAM or HDD may store the binarization threshold value information 31, the template information 32, the detection information 33, or information on various programs.

Note that the attachable matter detection apparatus 10A may acquire the programs or information described above via computers connected via a wired or wireless network or a portable recording medium.

The image acquirement unit 21 acquires a camera image from the camera 2 and converts the camera image into a grayscale image through grayscale conversion. In addition, the image acquirement unit 21 outputs the grayscale image to the extraction unit 22.

Note that the grayscale conversion refers to a process of expressing each pixel of the camera image in each gray scale from white to black depending on luminance. Note that the grayscale conversion process may also be omitted.

The extraction unit 22 applies a Sobel filter to the grayscale image input from the image acquirement unit 21 to extract edge information of each pixel in the grayscale image. Here, the edge information refers to the edge intensity in the X-axis and Y-axis directions of each pixel.

The extraction unit 22 outputs the extracted edge information to the conversion unit 23 in associating with the grayscale image. Note that the extraction unit 22 may use another edge extraction method such as a Laplacian filter in place of the Sobel filter.

The conversion unit 23 binarizes the grayscale image on the basis of the edge information of each pixel input from the extraction unit 22. Specifically, first, the conversion unit 23 calculates a value obtained by squaring each of the edge intensities of the X-axis and Y-axis directions as the edge information and adding them as an edge amount of each pixel.

Subsequently, the conversion unit 23 binarizes the grayscale image by setting a pixel having a calculated edge amount equal to or larger than a binarization threshold value THa described below to "1," and setting a pixel having a calculated edge amount equal to or smaller than the binarization threshold value THa to "0."

In this manner, the conversion unit 23 can cancel influence of noise by binarizing each pixel on the basis of the edge amount. For this reason, it is possible to improve detection accuracy of water droplets. In addition, through the binarization, all edges of a water droplet are set to be equal. For this reason, it is possible to suppress a processing load caused by the matching unit 24.

Note that, although binarization is performed on the basis of the edge amount in the following description, there is a matching relationship between the edge intensity and the edge amount. For this reason, binarization based on the edge amount has the same meaning as binarization based on the edge intensity.

The conversion unit 23 outputs the image obtained by binarizing each pixel (hereinafter, referred to as a binarization image) to the matching unit 24. Here, in the attachable matter detection apparatus 10A according to the fourth embodiment, the binarization threshold value THa is set dynamically depending on the surrounding environment of the camera 2. This will be described below in more details with reference to FIG. 22.

Note that the conversion unit 23 may binarize the grayscale image on the basis of characters such as "1" or "0" or other letters or symbols in addition to "black" and "white."

The matching unit 24 calculates similarity between the binarization image and the template through a matching process between the binarization image input from the conversion unit 23 and the template representing characteristics of a water droplet. In addition, the matching unit 24 outputs the calculated similarity value to the detection unit 25 in association with each pixel of the binarization image.

Note that the process of the matching unit 24 will be described below in more details with reference to FIG. 25. In addition, the template is stored in the memory unit 30A as template information 32. The template will be described below in more details with reference to FIG. 23.

The detection unit 25 detects a water droplet attached to the camera 2 on the basis of the similarity input from the matching unit 24. In addition, if a water droplet is detected, the detection unit 25 notifies the attachable matter remover 3 or a vehicle control apparatus (not illustrated) that performs automatic driving of the vehicle C of the fact.

As a result, for example, the attachable matter remover 3 removes the water droplet attached to the camera 2. In addition, the vehicle control apparatus, for example, recognizes a white lane by avoiding such an attached area. Note that the detection process of the detection unit 25 will be described below in more details with reference to FIGS. 26A to 26D.

Figure 22:
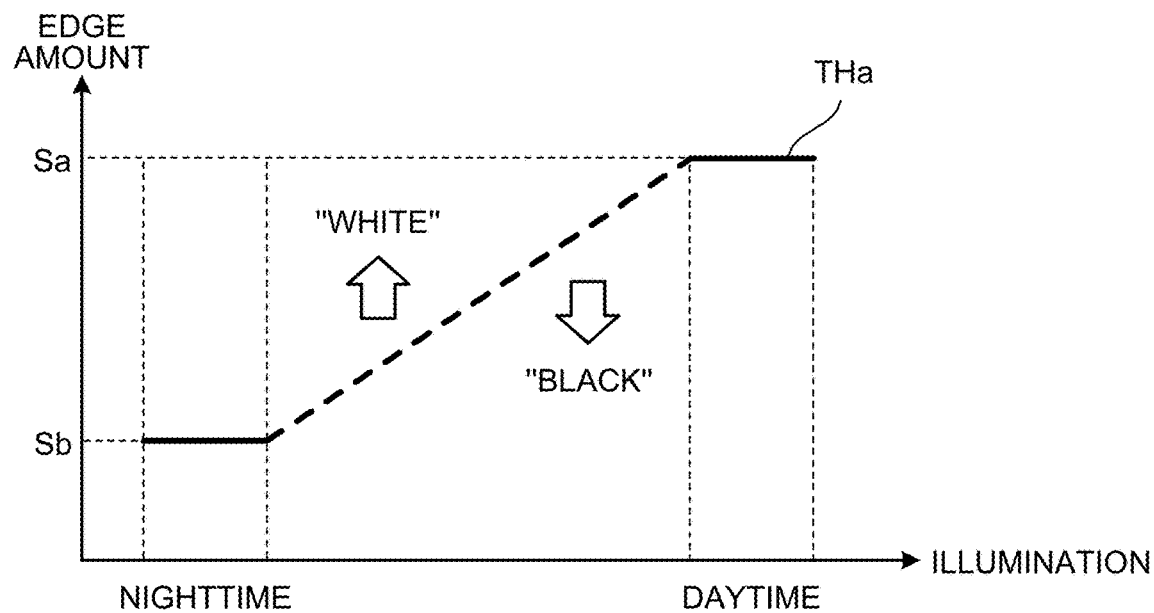
FIG. 22 is a diagram illustrating a binarization threshold value.

Next, a method of setting the binarization threshold value THa using the conversion unit 23 will be described with reference to FIG. 22. FIG. 22 is a diagram illustrating a binarization threshold value THa. Note that the ordinate of FIG. 22 refers to the edge amount described above, and the abscissa refers to the surrounding illumination.

As illustrated in FIG. 22, the binarization threshold value THa is set dynamically, for example, depending on the illumination as the surrounding environment. Specifically, the binarization threshold value THa is set to be higher, for example, as the surrounding illumination increases by setting the edge amount Sa as an upper limit, and setting the edge amount Sb as a lower limit.

If a pixel has an edge amount larger than the binarization threshold value THa, the pixel is set as "white" in the binarization image. If a pixel has an edge amount equal to or smaller than the binarization threshold value THa, the pixel is set as "black" in the binarization image.

Here, light from a surrounding light source may be reflected on a water droplet. In this case, an edge amount of the pixel representing the edge of the water droplet increases. Here, if the surrounding illumination is high, that is, if the surroundings are bright, the grayscale image includes background structures, white lanes on the road, and the like in addition to the water droplet.

For this reason, by setting the binarization threshold value THa to a high value, only pixels indicating the edge of the water droplet are set to "white." In other words, edges of an unnecessary object are effectively removed by setting the binarization threshold value THa to a high value.

Meanwhile, if the illumination is low, that is, if the surroundings are dark, an unnecessary object is difficult to appear in the grayscale image. In addition, if light is reflected on a water droplet, the edge amount of the pixel indicating the edge of the water droplet easily increases compared to the pixel indicating the edge of the unnecessary object.

Depending on the intensity of the light source, the edge amount of the water droplet may not exceed the edge amount Sa in some cases. In this case, if the binarization threshold value THa in the case of dark surroundings is set to be equal to the binarization threshold value THa in the case of a high illumination, the edge amount of the water droplet may become lower than the binarization threshold value THa, which is not desirable.

From this fact, when the surroundings are dark, by setting the binarization threshold value THa to be lower than that of a case where the illumination is high, only the pixel indicating the edge of the water droplet where light is reflected is set to "white." In other words, in a dark place, it is possible to effectively extract the edge of the water droplet regardless of the intensity of the light source.

In this manner, in the attachable matter detection apparatus 10A according to the fourth embodiment, by setting the binarization threshold value THa depending on the surrounding situation, it is possible to effectively extract only the edge of the water droplet.

As a result, it is possible to accurately detect a water droplet that reflects light in the nighttime during which detection was difficult in the related art or detect a water droplet when there is a strong light source in the daytime. Note that, as illustrated in FIG. 22, the conversion unit 23 sets the binarization threshold value THa, for example, to the edge amount Sa and the edge amount Sb in the daytime and the nighttime, respectively.

As a method of discriminating between daytime and nighttime, for example, a method of discriminating between daytime and nighttime depending on a time zone or a method of discriminating between daytime and nighttime in conjunction with a headlight of the vehicle C may be employed.

For example, when the headlight is ON, the conversion unit 23 may set the binarization threshold value THa to the edge amount Sb. In addition, when the headlight is OFF, the conversion unit 23 may set the binarization threshold value THa to the edge amount Sa.

For example, when the vehicle C has an illumination sensor, the conversion unit 23 may set the binarization threshold value THa on the basis of a sensor value of the illumination sensor.

In this case, for example, the conversion unit 23 may sequentially set the binarization threshold value THa depending on the illumination as indicated by the dotted line in FIG. 22. In addition, the binarization threshold value THa may be changed in response to a user manipulation on a manipulation unit (not illustrated).

Although a case where the binarization threshold value THa is changed depending on the illumination as the surrounding environment here, the present application is not limited thereto. That is, the binarization threshold value THa may be changed on the basis of positional information as the surrounding environment.

For example, the conversion unit 23 may acquire positional information from a navigation device and set the binarization threshold value THa to a high value, for example, in a case where the vehicle C is placed indoors, such as a multi-grade parking lot.

Figure 23:
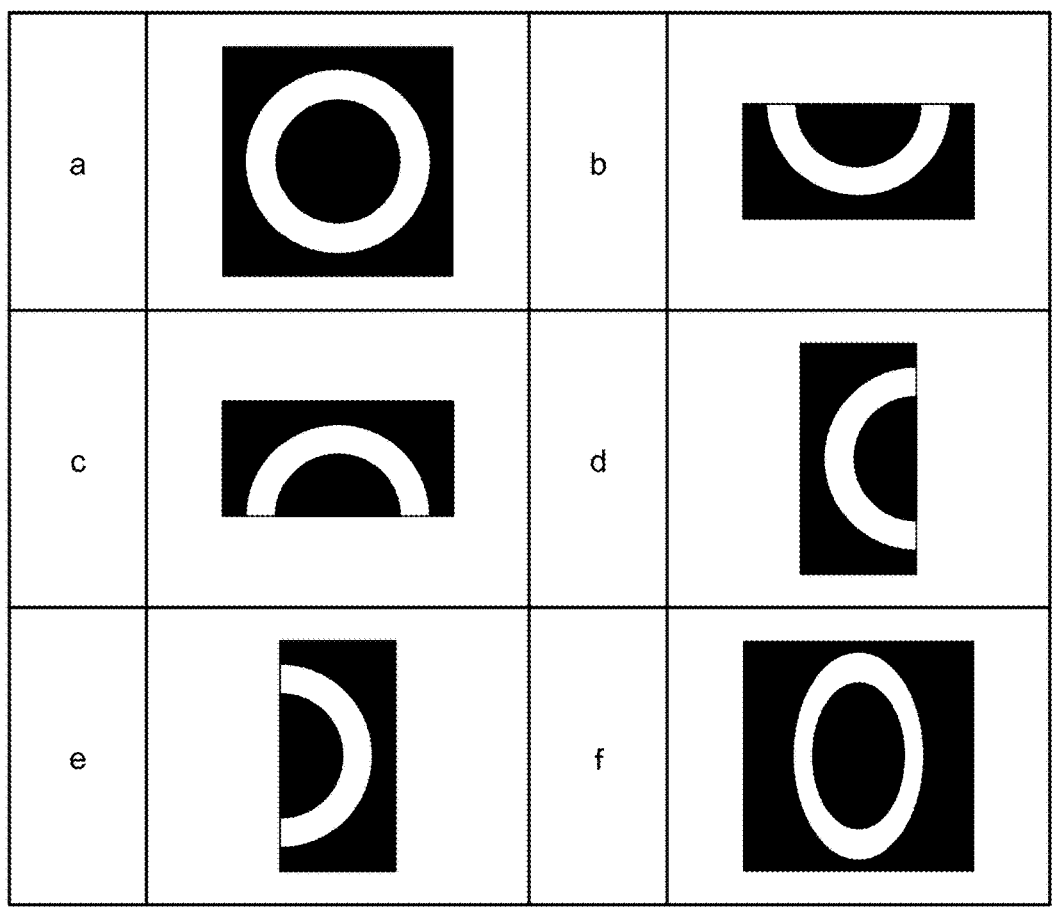
FIG. 23 is a diagram illustrating an exemplary template according to the fourth embodiment.

Next, a template according to the fourth embodiment will be described with reference to FIG. 23. FIG. 23 is a diagram illustrating an exemplary template according to the fourth embodiment. As illustrated in FIG. 23, in the attachable matter detection apparatus 10A according to the fourth embodiment, a template having a white contour of a water droplet on a black background is employed.

As illustrated in FIG. 23, the attachable matter detection apparatus 10A according to the fourth embodiment has a plurality of templates indicating characteristics of the contour of the water droplet. Specifically, the template has a contour of a water droplet having a substantially perfect circular shape as illustrated in (a) of FIG. 23 or has a partial shape of the water droplet having a substantially semi-arc shape as illustrated in (b) to (e) of FIG. 23.

As illustrated in (f) of FIG. 23, the template may have a substantially elliptical shape without limiting to a substantially perfect circular shape or a substantially semicircular shape. This is because, if a convex lens such as a fisheye lens is employed in the camera 2, water droplets attached to the convex lens tend to have an elliptical shape.

In this manner, in the attachable matter detection apparatus 10A according to the fourth embodiment, it is possible to improve detection accuracy of water droplets by performing a matching process using a plurality of templates. In addition, by using the template having partial shapes of water droplets as illustrated in (b) to (e) of FIG. 23, it is possible to detect a water droplet even when this water droplet can be removed from the image.

In the attachable matter detection apparatus 10A according to the fourth embodiment, an area for performing the matching process is set for each type of the template (refer to (a) to (f) of FIG. 23). This will be described below in more details with reference to FIG. 24.

Note that the template of FIG. 23 is just for exemplary purposes and is not limited to that illustrated. For example, an optimum template may be obtained on the basis of simulation or statistics in consideration of a shape of the camera 2, dripping of water droplets, and the like.

The attachable matter detection apparatus 10A according to the fourth embodiment has a plurality of templates having different scales as illustrated in (a) to (f) of FIG. 23. As a result, it is possible to accurately detect water droplets having different sizes. Note that the matching unit 24 may perform a matching process from templates having different sizes depending on the surrounding environment of the camera 2.

For example, in heavy rain, since large rain drops are easily attached to the camera 2, the matching unit 24 starts the matching process from a large template for large water droplets and performs the matching process by gradually reducing the size of the template.

In light rain, since small rain drops are easily attached to the camera 2, the matching unit 24 starts the matching process from a small template and performs the matching process by gradually enlarging the size of the template.

As a result, it is possible to effectively detect a water droplet depending on a surrounding situation of the vehicle C. In addition, in the attachable matter detection apparatus 10A according to the fourth embodiment, different detection threshold values are set depending on the size of the template. This will be described below in more details with reference to FIG. 26A.

Figure 24:
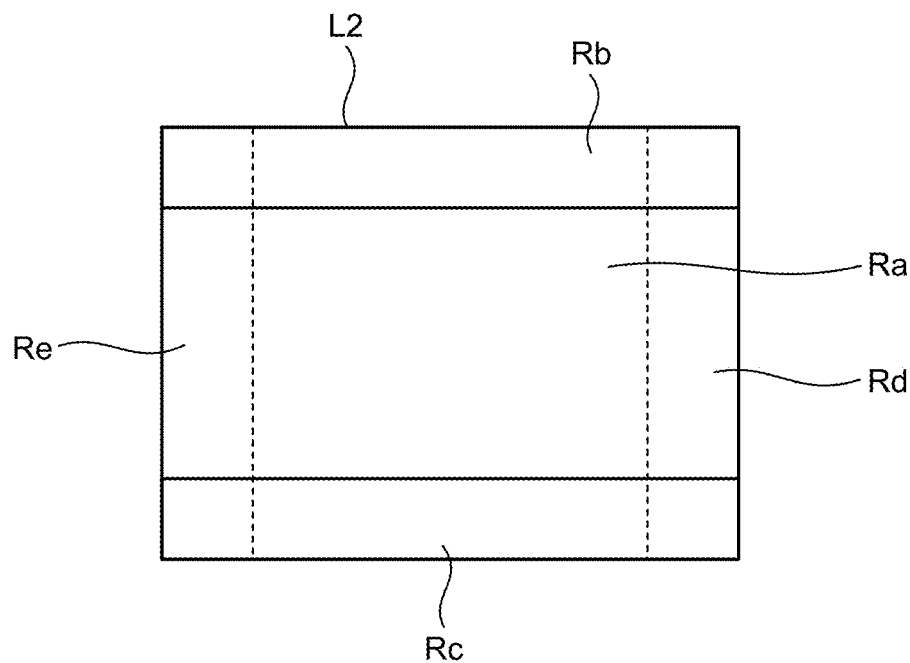
FIG. 24 is a diagram illustrating a template scanning position.

Next, a relationship between the template and the scanning position will be described with reference to FIG. 24. FIG. 24 is a diagram illustrating a relationship between the template and the scanning position. It is assumed that the regions Ra to Re of FIG. 24 correspond to the templates of (a) to (e) of FIG. 23, respectively.

Specifically, the matching unit 24 is used when the region Ra positioned in the center of the binarization image L2 is scanned using the template having a substantially perfect circular shape illustrated in (a) of FIG. 23. In addition, the template having an arc shape facing downward in (b) of FIG. 23 is used when the region Rb positioned in the upper side of the binarization image L2 is scanned.

The template having an arc shape facing upward in (c) of FIG. 23 is used when the region Rc positioned in the lower side of the binarization image L2 is scanned. Similarly, the templates having arc shapes facing leftward and rightward in (d) and (e) of FIG. 23 are used when the regions Rd and Re positioned in the left and right sides of the binarization image L2 are scanned.

In this manner, the matching unit 24 may perform the matching process using different templates depending on the scanning position of the binarization image L2. As a result, it is possible to effectively detect a water droplet having a shape that can be easily attached to each region of the binarization image L2.

Note that the matching unit 24 may use all types of templates to perform scanning for the entire area of the binarization image L2. In this case, it is possible to suppress a failure to detect a water droplet.

In a case where the camera 2 has a wide-angle lens, a water droplet is distorted as close to the edge of the camera image. For this reason, a template having a characteristic of a distorted water droplet contour as close to the edge may be employed.

Next, a template and a matching process using the matching unit 24 will be described with reference to FIG. 25. FIG. 25 is a diagram illustrating an exemplary matching process.

Figure 25:
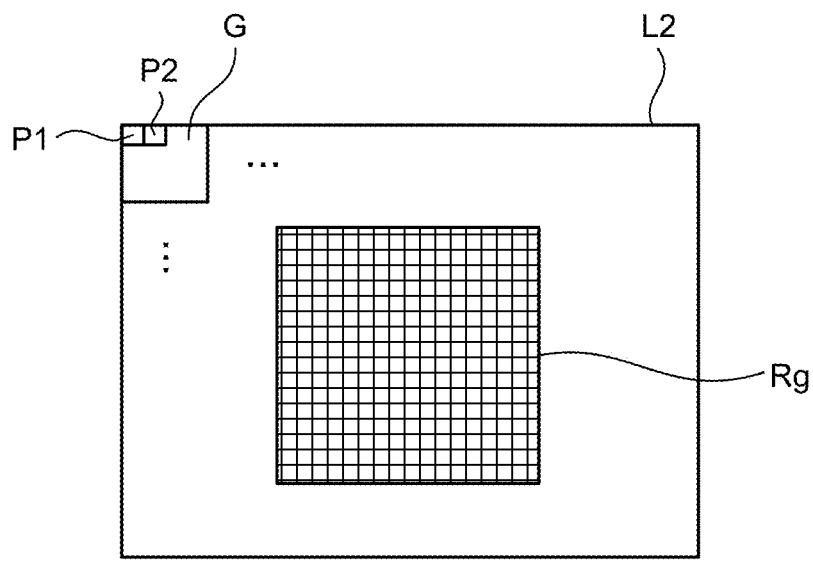
FIG. 25 is a diagram illustrating an exemplary matching process of a matching unit.

As illustrated in FIG. 25, first, the matching unit 24 places, for example, the upper left side of the template G in the upper left pixel P1 of the binarization image L2.

Subsequently, the matching unit 24 calculates similarity between the binarization image L2 and the template G in this position. Note that a calculation method of this similarity will be described in the fifth embodiment, and thus, will not be described here.

Subsequently, the matching unit 24 stores the calculated similarity value, for example, in the pixel P1 positioned in the upper left side of the template G. Then, the matching unit 24 shifts the template G to the right by a single pixel and calculates the similarity. The calculated similarity value is stored in the pixel P2.

The matching unit 24 repeats calculation of the similarity in this manner to the right end. If the calculation of similarity is completed to the right end, the calculation process is repeated by shifting the template G downward by a single pixel, so that the similarity calculation is performed for overall pixels. As a result, the matching unit 24 obtains the similarity values for overall pixels.

Similarly, the matching unit 24 also calculates the similarity for templates having different types or sizes. In addition, the matching unit 24 outputs the calculated similarity values to the detection unit 25 in association with coordinates of the pixels.

Here, the matching unit 24 does not necessarily calculate the similarity values for overall pixels. For example, the similarity calculation process may be simplified by calculating the similarity at a predetermined interval. As a result, it is possible to reduce a processing load caused by the matching unit 24.

For example, as in the region Rg positioned in the center of the binarization image L2 of FIG. 25, the similarity value may be calculated from a region having a higher priority in water droplet detection. As a result, it is possible to quickly detect attached water droplets in a high priority region.

In this case, the matching unit 24 may not calculate the similarity for a region having a low priority such as an upper area of the binarization image L2. As a result, it is possible to further reduce the processing load caused by the matching unit 24.

For example, the matching unit 24 may calculate similarity for overall pixels of a region having a high priority, and may simplify the similarity calculation process for regions having a low priority.

That is, water droplets may be detected with high accuracy in a high priority region and may be detected with rough accuracy in a low priority region. As a result, it is possible to suppress a failure to detect a water droplet in the high priority region while suppressing the processing load.

Next, a determination process using the detection unit 25 will be described with reference to FIGS. 26A to 26D. FIGS. 26A to 26D are (first to fourth) diagrams illustrating a determination process using the detection unit 25.

Figure 26A:
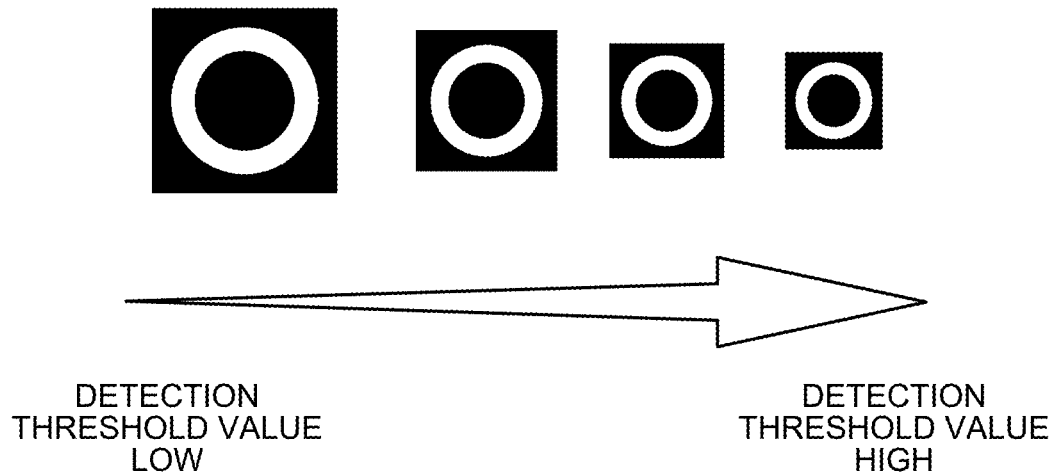
FIGS. 26A to 26D are (first to fourth) diagrams illustrating a detection process of a detection unit.

First, a relationship between the template and the detection threshold value will be described with reference to FIG. 26A. As illustrated in FIG. 26A, the detection unit 25 prepares different detection threshold values depending on the size of the template.

Note that the detection threshold value is used by the detection unit 25 to compare with the similarity value input from the matching unit 24. In addition, the detection unit 25 determines that a water droplet is attached if the similarity value is equal to or higher than the detection threshold value.

As illustrated in FIG. 26A, in the attachable matter detection apparatus 10A according to the fourth embodiment, the detection threshold value is set to be lower as the template is larger. Meanwhile, the detection threshold value is set to higher as the template is smaller.

This is because an unnecessary edge other than a water droplet can be easily detected as an erroneous edge of the water droplet as the template is smaller. That is, by setting the detection threshold value depending on the size of the template, it is possible to suppress erroneous detection of a water droplet.

Note that, although FIG. 26A illustrates a case where the template has a substantially perfect circular shape corresponding to (a) of FIG. 23, this similarly applies to other templates illustrated in (b) to (f) of FIG. 23. In addition, different detection threshold values may be provided depending on the type of the template. Alternatively, the same detection threshold value may be employed for overall templates.

Next, a case where the detection unit 25 provides different detection threshold values for each region of the binarization image L2 will be described with reference to FIG. 26B. As described above, a priority for detecting a water droplet is differently set depending on a region of the binarization image L2.

In this regard, in the attachable matter detection apparatus 10A according to the fourth embodiment, different detection threshold values may be provided depending on the region of the binarization image L2. Specifically, for example, for a region R1 where a position close to the vehicle C appears, the water droplet detection priority is set to higher, and the detection threshold value is set to be lower, compare to other regions. As a result, it is possible to suppress a failure to detect a water droplet in the high priority region R1.

Meanwhile, for a region Rh where a position far from the vehicle C appears, the water droplet detection priority is set to be low, and the detection threshold value is set to be high. In addition, for a region Rm located between the regions R1 and Rh, for example, the detection threshold value is set to a median value between those of the regions R1 and Rh.

In this manner, by setting different detection threshold values depending on the region of the binarization image L2, it is possible to securely detect a water droplet in the high priority region R1 while reducing erroneous detection of a water droplet in the low priority region Rh.

Figure 26B:
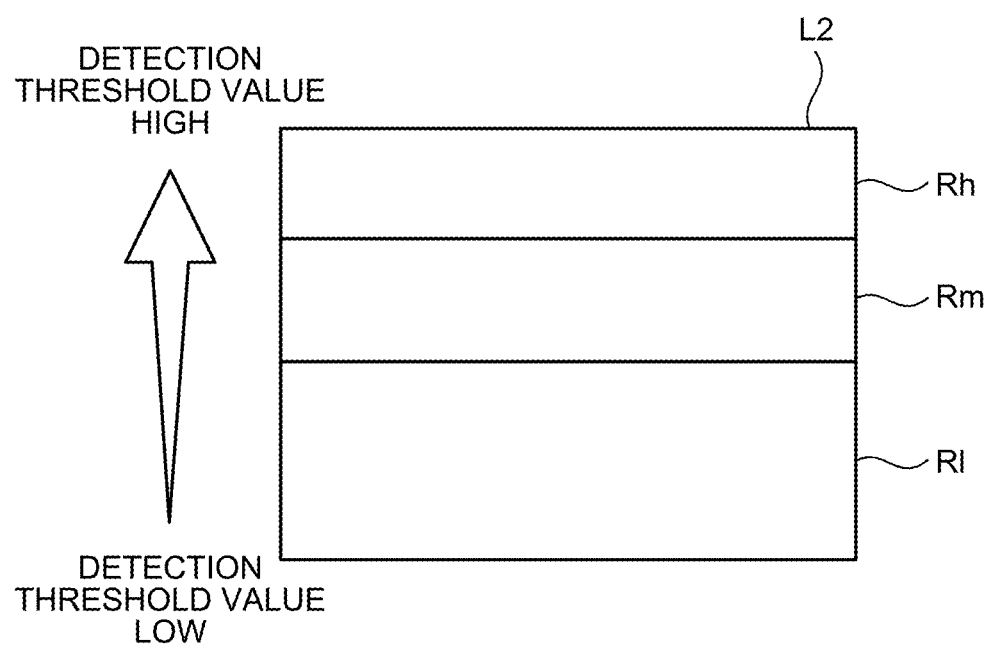

Note that, although a case where the binarization image L2 is divided into three regions has been described in FIG. 26B, the binarization image L2 may be divided into two regions, or four or more regions. In addition, the detection threshold value may be set by dividing the binarization image L2 in a horizontal direction, in a slope direction, or in a concentric circular shape.

The priority of each region described above is just for exemplary purposes, and the priority may be changed depending on a purpose of water droplet detection. In addition, the detection unit 25 may set different detection threshold values, for example, between daytime and nighttime.

Next, a case where the detection unit 25 detects a water droplet on the basis of the binarization images L2 of a plurality of frames will be described with reference to FIG. 26C. Here, for example, a scene appearing when the detection unit 25 completes the detection process described above with reference FIGS. 26A and 26B is illustrated.

Figure 26C:
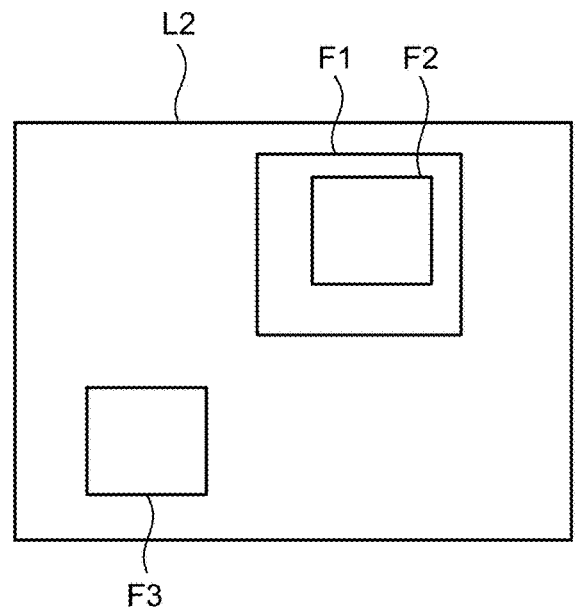

FIG. 26C illustrates a case where similarity values with the templates corresponding to the sizes of each frame in the region where frames F1 to F3 exist are higher than the detection threshold value.

Here, as in the frames F1 and F2, in a case where there is a region where the similarity with a template having a different size is higher, and the frame F2 exists in a region surrounded by the frame F1, the detection unit 25 determines that a water droplet is attached to such a region. This is because, in a case where the similarity is high in a single template, the similarity tends to increase in other templates having a similar size.

For example, since the aforementioned condition is not satisfied in a case where only a single frame exists in the neighboring region as in the frame F3, the detection unit 25 determines that a water droplet is not attached to the region of such a frame F3. As described above, in a case where the similarity is high in a single template, the similarity tends to increase in other templates having a similar size. Therefore, if the similarity is high in only a single template, and the similarity is not high in other templates (having a similar size), it can be determined that the similarity in a single template incidentally increases due to influence of noise or the like.

That is, the detection unit 25 determines that a water droplet is attached for the region where the similarities with a plurality of templates having different sizes are high. In this manner, by detecting a water droplet on the basis of the similarity with a plurality of templates, the attachable matter detection apparatus 10A can improve reliability of water droplet detection accuracy while reducing erroneous detection of a water droplet.

Note that, in this case, for example, the detection unit 25 may determine that a water droplet is attached when the frames F1 and F2 are overlapped at least partially. In addition, the detection unit 25 may determine that a water droplet is attached, for example, when a plurality of frames exist in a close position.

Figure 26D:
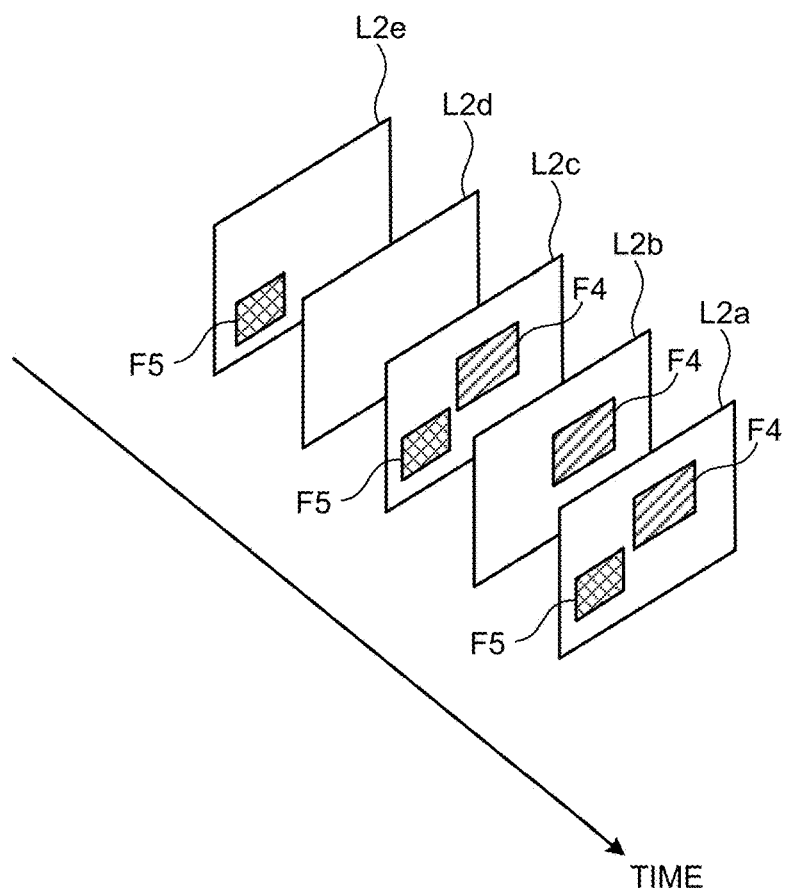

Next, a case where the detection unit 25 detects a water droplet on the basis of a plurality binarization images L2 will be described with reference to FIG. 26D. In FIG. 26D, it is assumed that the newer binarization image L2 is arranged in the closer side on the paper plane. That is, the binarization images L2 are newer in order from the binarization image L2e to the binarization image L2a.

Similarly to FIG. 26C, in the frames F4 and F5 illustrated in FIG. 26D, it is assumed that the similarity with the template corresponding to the size of the frame is high in the region of these frames.

As illustrated in FIG. 26D, the frame F4 exists in the binarization image L2a, the binarization image L2b, and the binarization image L2c, and the frame F5 exists in the binarization image L2a, the binarization image L2c, and the binarization image L2e.

In this case, for example, in a case where the frame exists in the same position across three continuous frames, the detection unit 25 determines that a water droplet is attached to such a region. In the example of FIG. 26D, since the frame F4 is detected continuously across three frames, the detection unit 25 determines that a water droplet is attached to the region of the frame F4.

Note that the detection unit 25 may determine that a water droplet is attached to the region of the frame F5, for example, if a frame is detected three times across five frames as in the frame F5.

In this manner, since the detection unit 25 detects attachment of a water droplet using a plurality of frames, it is possible to improve detection accuracy while suppressing erroneous detection of a water droplet. Note that the position or size of the frame F4 or F5 does not necessarily strictly match between frames, and a predetermined margin is allowed.

In FIG. 26D, a water droplet is detected in a case where the detection unit 25 detects the same frame continuously across three frames. However, the present application is not limited thereto. A water droplet may be detected in a case where the same frame is continuously detected across two or less frames, or four or more frames.

Note that the detection unit 25 may change the number of frames used in water droplet detection depending on the priority of the region described above or a purpose of water droplet detection. For example, it may be possible to set a large number of frames in a region where detection accuracy is prioritized, and reduce the number of frames in a region where a detection speed is prioritized.

Next, a processing sequence executed by the attachable matter detection apparatus 10A according to the fourth embodiment will be described with reference to FIG. 27. FIG. 27 is a flowchart illustrating a processing sequence executed by the attachable matter detection apparatus 10A according to the fourth embodiment. Note that the following processing is repeatedly executed by the control unit 20A.

As illustrated in FIG. 27, first, the image acquirement unit 21 acquires a camera image from the camera 2 and performs grayscale conversion for this camera image (Step S401). Subsequently, the extraction unit 22 extracts edge information of each pixel from the grayscale image (Step S402).

Then, as illustrated in FIG. 22, the conversion unit 23 sets the binarization threshold value THa (Step S403) and binarizes the grayscale image (Step S404).

Subsequently, as illustrated in FIG. 25, the matching unit 24 performs a matching process using the binarization image binarized by the conversion unit 23 (Step S405). In addition, as illustrated in FIGS. 26A to 26D, the detection unit 25 detects a water droplet attached to the camera 2 (Step S406).

As described above, the attachable matter detection apparatus 10A according to the fourth embodiment can detect a water droplet with high accuracy in both nighttime and daytime by performing binarization on the basis of the edge amount of each pixel.

Meanwhile, the conversion process of the conversion unit 23 described above is not limited to the binarization. In this regard, next, a case where each pixel is converted into parameters depending on the edge direction will be described as a fifth embodiment.

Fifth Embodiment

Figure 28:
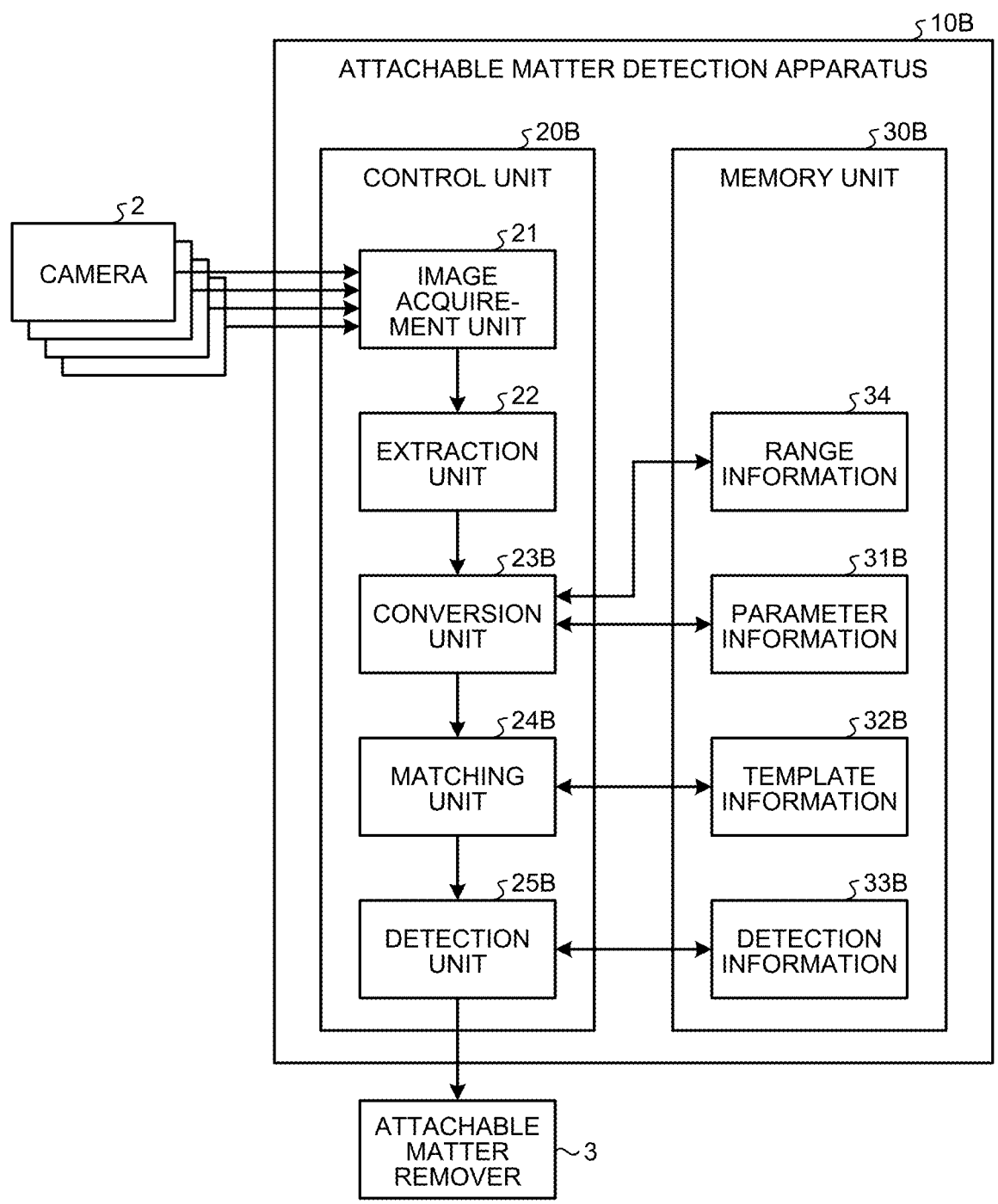
FIG. 28 is a block diagram illustrating an attachable matter detection apparatus according to the fifth embodiment.

First, a configuration of the attachable matter detection apparatus 10B according to the fifth embodiment will be described with reference to FIG. 28. FIG. 28 is a block diagram illustrating an attachable matter detection apparatus 10B according to the fifth embodiment. Note that, in the following description, like reference numerals denote like elements as in the aforementioned embodiments, and they will not be described repeatedly.

As illustrated in FIG. 28, the attachable matter detection apparatus 10B according to the fifth embodiment includes a control unit 20B and a memory unit 30B. The control unit 20B has a conversion unit 23B, a matching unit 24B, and a detection unit 25B in place of the conversion unit 23, the matching unit 24, and the detection unit 25 illustrated in FIG. 21.

The memory unit 30B stores range information 34, parameter information 31B, template information 32B, and detection information 33B. Here, the conversion unit 23B will be described first, and the image acquirement unit 21 and the extraction unit 22 will not be described.

The conversion unit 23B calculates edge directions of each pixel on the basis of the edge information of each pixel input from the extraction unit 22 and allocates three-dimensional parameters to these edge directions to parameterize each pixel. This will be described below in more details with reference to FIGS. 30A and 30B.

Before calculating the edge direction, the conversion unit 23B calculates the aforementioned edge amount and performs filtering for the calculated edge amount. This will be described below in more details with reference to FIG. 29.

The matching unit 24B performs a matching process between the parameterized grayscale image input from the conversion unit 23B and the template representing characteristics of a water droplet. This matching process has been described above in conjunction with FIG. 25 and will not be described repeatedly here.

Here, the matching unit 24B calculates similarity on the basis of a zero-mean normalized cross-correlation. In this zero-mean normalized cross-correlation, the similarity takes a value from "−1" to "+1."

Note that the matching unit 24B may calculate the similarity on the basis of other calculation methods such as a sum of absolute difference (SAD) method or a sum of squared difference (SSD) method.

The detection unit 25B detects a water droplet attached to the camera 2 on the basis of the similarity input from the matching unit 24B. Note that the detection process of the detection unit 25B will be described below in more details with reference to FIG. 33.

Figure 29:
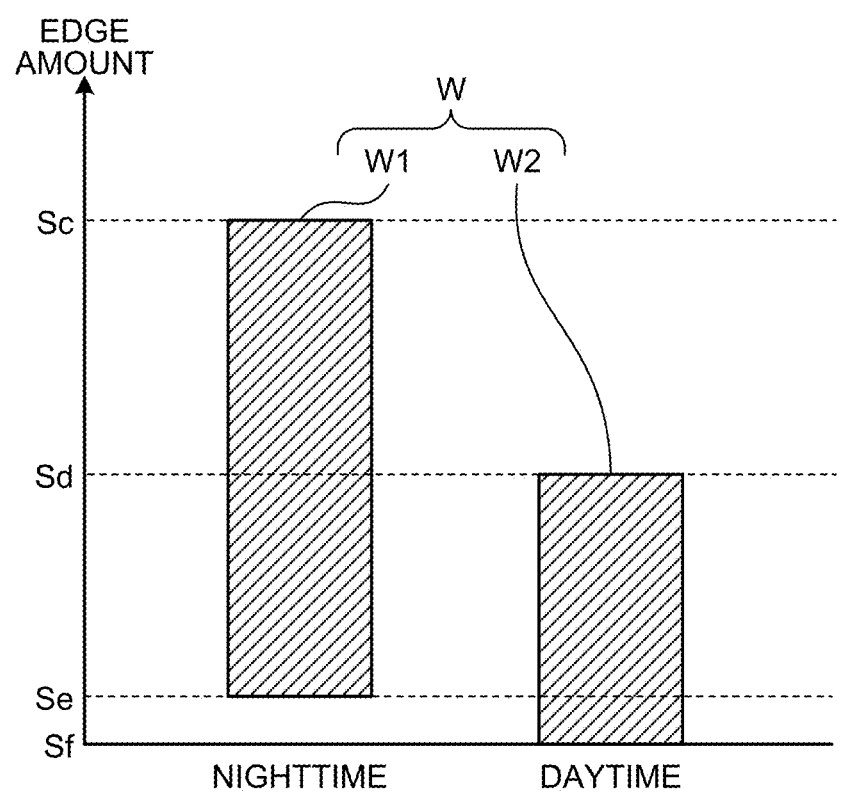
FIG. 29 is a diagram illustrating an extraction range.

Next, a filtering process using the conversion unit 23B will be described in details with reference to FIG. 29. FIG. 29 is a diagram illustrating an extraction range W. Note that the ordinate of FIG. 29 refers to the edge amount. In addition, in FIG. 29, the extraction range W is hatched.

As illustrated in FIG. 29, in the attachable matter detection apparatus 10B according to the fifth embodiment, for example, different extraction ranges W are set between nighttime and daytime. Specifically, in the nighttime, a range from the edge amount Sc to the edge amount Se is set as an extraction range W1.

In daytime, a range from the edge amount Sd smaller than the edge amount Sc to the edge amount Sf is set as an extraction range W2 in order to effectively extract only edges of a water droplet regardless of the surrounding brightness as described above.

By performing filtering as described above, it is possible to remove an unnecessary edge other than a water droplet. As a result, it is possible to improve water droplet detection accuracy.

Note that an optimum value of the extraction range W1 or W2 may be derived using simulation or statistics. In addition, the conversion unit 23B may set the extraction range W by feeding back the water droplet detection result of the detection unit 25B.

For example, in a case where the detection unit 25B does not detect a water droplet, there is a possibility that the extraction range W may not be set appropriately. For this reason, the conversion unit 23B may extract each pixel again by changing the extraction range W. As a result, it is possible to suppress a failure to detect a water droplet. Therefore, it is possible to improve water droplet detection accuracy.

Statistic values such as a distribution or an average of the edge amounts in each pixel for each of nighttime and daytime are stored in the memory unit 30B. In addition, the conversion unit 23B may set the extraction range W by discriminating between nighttime and daytime by comparing the statistic values with the extracted edge amounts.

As a result, it is possible to appropriately set the extraction range W depending on the surrounding situation. Note that these statistic values may be derived by the control unit 20B if the control unit 20B has a learning capability.

Figure 30A:
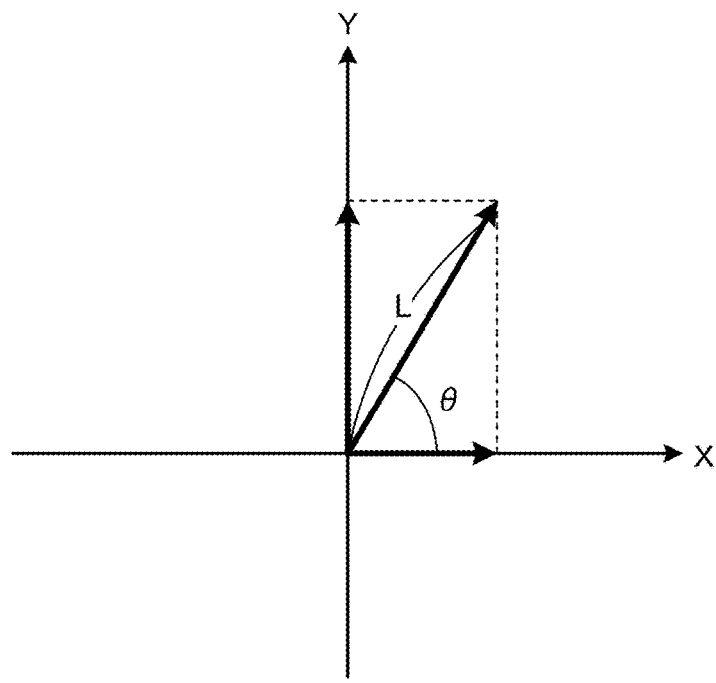
FIG. 30A is a diagram illustrating a vector calculation method.
Figure 30B:
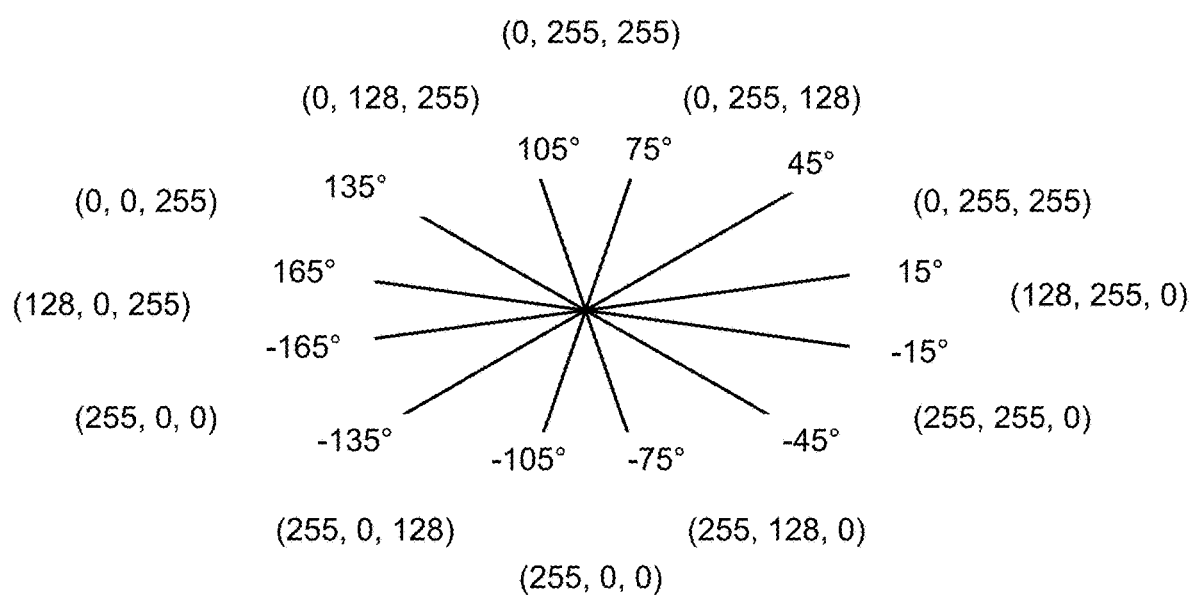
FIG. 30B is a diagram illustrating exemplary parameter information.

Next, a processing of the conversion unit 23B will be described with reference to FIGS. 30A and 30B. FIG. 30A is a diagram illustrating an edge vector. FIG. 30B is a diagram illustrating an example of the parameter information 31B.

Note that FIG. 30A illustrates the edge intensity in the X-axis and Y-axis directions. As described above, the conversion unit 23B calculates a vector of each pixel on the basis of the edge intensities of the X-axis direction and the Y-axis direction input from the extraction unit 22.

Specifically, the vector of each pixel is calculated using a trigonometric function based on the edge intensities in the X axis direction and the Y axis direction. Hereinafter, an angle θ between the vector calculated from FIG. 30A and the X-axis on the positive direction side will be referred to as an edge direction, and the length L of the vector will be referred to as an edge intensity of each pixel. Note that this edge intensity is used in the sixth embodiment.

Note that the conversion unit 23B may not necessarily calculate the edge direction for overall pixels. Instead, the processing may be simplified by calculating the edge direction for each pixel at a predetermined interval in a low priority region.

Subsequently, the conversion unit 23B parameterizes the calculated edge direction using the parameter information 31B of FIG. 30B. Here, a case where the conversion unit 23B parameterizes the edge direction using a color vector of a twelve-color wheel will be described.

Here, the color vector is a vector defined depending on R, G, and B color elements and has a three component parameters including R, G, and B.

Note that, in the twelve-color wheel, if red, green and blue colors are expressed in decimal numbers, each parameter is expressed in three values including "0," "128 or 127," and "255." Here, in the twelve-color wheel, each value of R, G, and B having a complementary color relationship has a 1's complement relationship in a binary notation such as a hexadecimal notation.

That is, in the conversion unit 23B according to the fifth embodiment, each pixel is converted using parameters whose each value of R, G, and B between opposite angle ranges satisfies the 1's complement relationship. Note that these parameters do not necessarily strictly satisfy the 1's complement relationship, and it is assumed that a predetermined margin is allowed.

Specifically, the conversion unit 23B allocates parameters of R, G, and B of the angle range corresponding to the calculated edge direction to the pixel. For example, in a case where the edge direction has an angle range of 75° to 105°, an RGB parameter (0, 255, 255) corresponding to light blue is allocated to the parameter of this edge direction.

In a case where the edge direction exists in an angle range of −75° to −105° opposite to this angle range, an RGB parameter (255, 0, 0) corresponding to red, which is a complementary color of light blue, is allocated.

The conversion unit 23B uses an RGB parameter (255, 255, 255) corresponding to white for the pixel whose edge amount is out of the extraction range W.

In this manner, in the attachable matter detection apparatus 10B according to the fifth embodiment, each pixel is converted using parameters having a 1's complement relationship between the opposite edge directions. As a result, it is possible to clearly distinguish a difference between opposite edge directions.

Using the color vector of the twelve-color wheel, it is possible to clearly distinguish the difference between angle ranges corresponding to the edge direction. For this reason, it is possible to improve recognition accuracy of the matching unit 24B.

In the attachable matter detection apparatus 10B according to the fifth embodiment, the same parameter is allocated as long as the edge direction is close regardless of the edge intensity. Therefore, it is possible to detect even a water droplet having a blurred edge, that is, a water droplet having a weak edge intensity with accuracy equal to that of a water droplet having a strong edge intensity.

As a result, in the attachable matter detection apparatus 10B according to the fifth embodiment, it is possible to detect even a water droplet having a weak edge intensity, which has been difficult to detect in the related art, that is, a water droplet blurred in the camera image with high accuracy.

The table used as a reference by the conversion unit 23B is not limited to that illustrated in FIG. 30B. For example, the angle range may be divided more minutely into twenty four colors instead of twelve colors. Alternatively, the angle range may be divided in a larger size such as nine colors.

Without limiting to the RGB parameter, other parameters in which opposite edge directions satisfy the 1's complement relationship may also be employed. For example, a matrix may be employed as the parameter.

Figure 31:
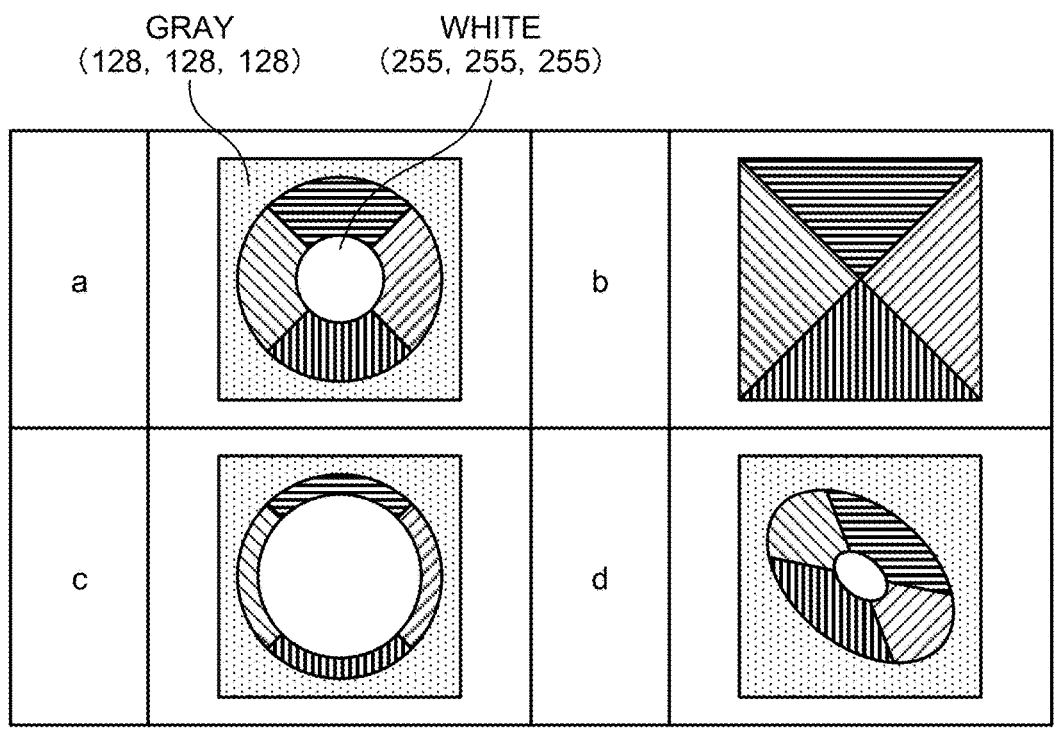
FIG. 31 is a diagram illustrating an exemplary template according to the fifth embodiment.

Next, a template according to the fifth embodiment will be described with reference to FIG. 31. FIG. 31 is a schematic diagram illustrating the template according to the fifth embodiment. Note that, in FIG. 31, the template is simplified for convenient description purposes.

As illustrated in FIG. 31, in the template according to the fifth embodiment, a circle simulating a water droplet is divided into a plurality of fan-shaped regions. In addition, parameters corresponding to the aforementioned angle range set such that values of opposite regions with respect to the center of the circle have a 1's complement relationship are allocated to each fan-shaped region.

As illustrated in (a) of FIG. 31, an RGB parameter representing white and gray is allocated to regions other than the region representing characteristics of a water droplet. Specifically, an RGB parameter (255, 255, 255) corresponding to white is allocated to the center of the template, and an RGB parameter (128, 128, 128) corresponding to gray is allocated to an outer side of a water droplet.

Note that parameters of the center region and the outer region of the water droplet are just exemplary, and a parameter corresponding to another color may also be allocated.

As illustrated in (b) of FIG. 31, a template in which each parameter is allocated in a radial shape from the center across the entire region may be employed. This template is effective to detect a water droplet that has a thin thickness and appears blurred on the camera image.

As illustrated in (c) of FIG. 31, the white region in the center of the template may be enlarged. In a case where such a template is employed, it is possible to effectively detect a water droplet having a bright edge. In addition, as illustrated in (d) of FIG. 31, the shape representing the water droplet may have an elliptical shape.

In this manner, in the attachable matter detection apparatus 10B according to the fifth embodiment, for a grayscale image in which opposite edge directions are converted to have parameters having the 1's complement relationship, a template representing a water droplet using such a parameter is employed.

Therefore, a difference between edge directions in each pixel and each template becomes clear, and it is possible to improve recognition accuracy of the matching unit 24B.

As described above in conjunction with (b) to (e) of FIG. 23, the attachable matter detection apparatus 10B according to the fifth embodiment may use a semicircular template. In this case, as described above in conjunction with FIG. 24, it may be possible to perform a matching process that illustrates a water droplet having a partial shape corresponding to the scanning position.

Note that, in the attachable matter detection apparatus 10B according to the fifth embodiment, the matching process is performed using a template representing characteristics of a water droplet in a case where the luminance increases from the end to the center, that is, the edge direction is directed from the end to the center.

However, without limiting thereto, a template representing characteristics of a water droplet in a case where the luminance increases from the center to the end, that is, the edge direction is directed from the center to the end may also be employed.

Figure 32:
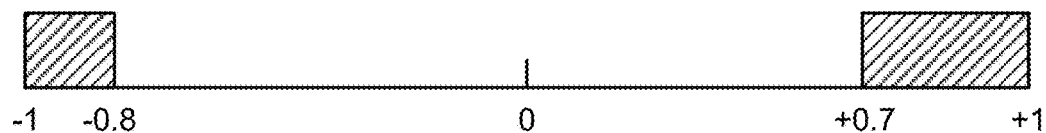
FIG. 32 is a diagram illustrating a detection threshold value according to the fifth embodiment.

Next, a detection process of the detection unit 25B will be described with reference to FIG. 32. FIG. 32 is a diagram illustrating a specific example of the detection threshold value. Note that, in FIG. 32, the abscissa refers to the similarity value.

As described above, in the attachable matter detection apparatus 10B according to the fifth embodiment, the similarity with the template is calculated as a value from "−1" to "+1." Here, in a case where the similarity is close to "+1," this means that the image is similar to the template, that is, the camera image is similar to a water droplet in which the luminance increases from the end to the center.

In a case where the similarity is close to "−1," this means that the camera image is similar to a so-called negative/positive inversion of the template. That is, according to this embodiment, the template represents a water droplet in which the luminance increases from the center to the end.

For this reason, as illustrated in FIG. 32, according to the fifth embodiment, the detection threshold value is provided in both the positive and negative sides of the similarity. Specifically, as illustrated in FIG. 32, for example, a positive detection threshold value is set to "+0.7," and the negative detection threshold value is set to "−0.8."

The detection unit 25B determines that a water droplet is attached to the camera 2 in a case where the similarity value input from the matching unit 24B is equal to or higher than a positive detection threshold value, that is, equal to or higher than "+0.7," or equal to or lower than a negative detection threshold value, that is, equal to or lower than "−0.8."

In this manner, in the attachable matter detection apparatus 10B according to the fifth embodiment, the similarity value has positive and negative detection threshold values. As a result, it is possible to detect both a water droplet having a luminance increasing from the center to the end and a water droplet having a luminance increasing from the end to the center through the matching process using a single type of the template.

In other words, it is possible to detect various water droplets while maintaining a processing load. Note that the detection unit 25B may detect a water droplet by using the processing described above in conjunction with FIGS. 26A to 26D together.

In the attachable matter detection apparatus 10B according to the fifth embodiment, the positive detection threshold value has an absolute value smaller than that of the negative detection threshold value as described above. This is because the negative similarity tends to produce a lot of error detections of water droplets, compared to the positive similarity.

Each detection threshold value illustrated in FIG. 32 is just exemplary, and the present application is not limited thereto. For example, the absolute values of the positive and negative detection threshold values may be equal to each other. Alternatively, the absolute value of the positive detection threshold value may be larger than the absolute value of the negative detection threshold value.

Figure 33:
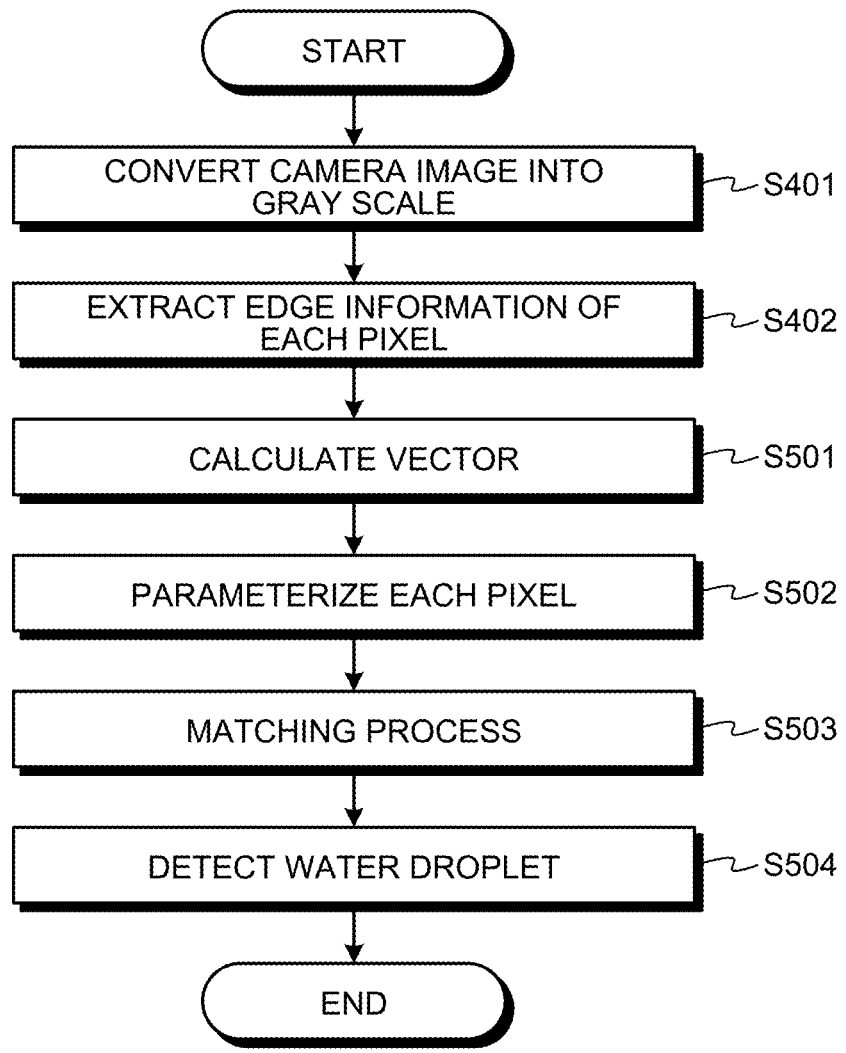
FIG. 33 is a flowchart illustrating a processing sequence executed by an attachable matter detection apparatus according to the fifth embodiment.

Next, a processing sequence executed by the attachable matter detection apparatus 10B according to the fifth embodiment will be described with reference to FIG. 33. FIG. 33 is a flowchart illustrating a processing sequence executed by the attachable matter detection apparatus 10B according to the fifth embodiment.

Here, Steps S401 and S402 will not be described because they have been described in the fourth embodiment. The description will be given starting from Step S501 in FIG. 33.

The conversion unit 23B calculates a vector of an edge of each pixel on the basis of the edge information input from the extraction unit 22 (Step S501) and parameterizes each pixel on the basis of the edge direction as described in conjunction with FIG. 30B (Step S502).

Subsequently, the matching unit 24B performs the matching process between the parameterized grayscale image and the template (Step S503). In addition, the detection unit 25B detects a water droplet on the basis of the detection threshold value of FIG. 32 (Step S504).

As described above, the attachable matter detection apparatus 10B according to the fifth embodiment can detect a water droplet with high accuracy by using parameters of each R, G, and B of the twelve-color wheel corresponding to the edge direction of each pixel.

The attachable matter detection apparatus 10B according to the fifth embodiment can detect both a water droplet having a bright center and a water droplet having a bright end through a single matching process.

Sixth Embodiment

Next, an attachable matter detection apparatus 10C according to a sixth embodiment will be described with reference to FIGS. 34 to 39. In the attachable matter detection apparatus 10C according to the sixth embodiment, each pixel is converted into codes depending on the edge direction of each pixel, and a matching process is performed using normalized expression.

Figure 34:
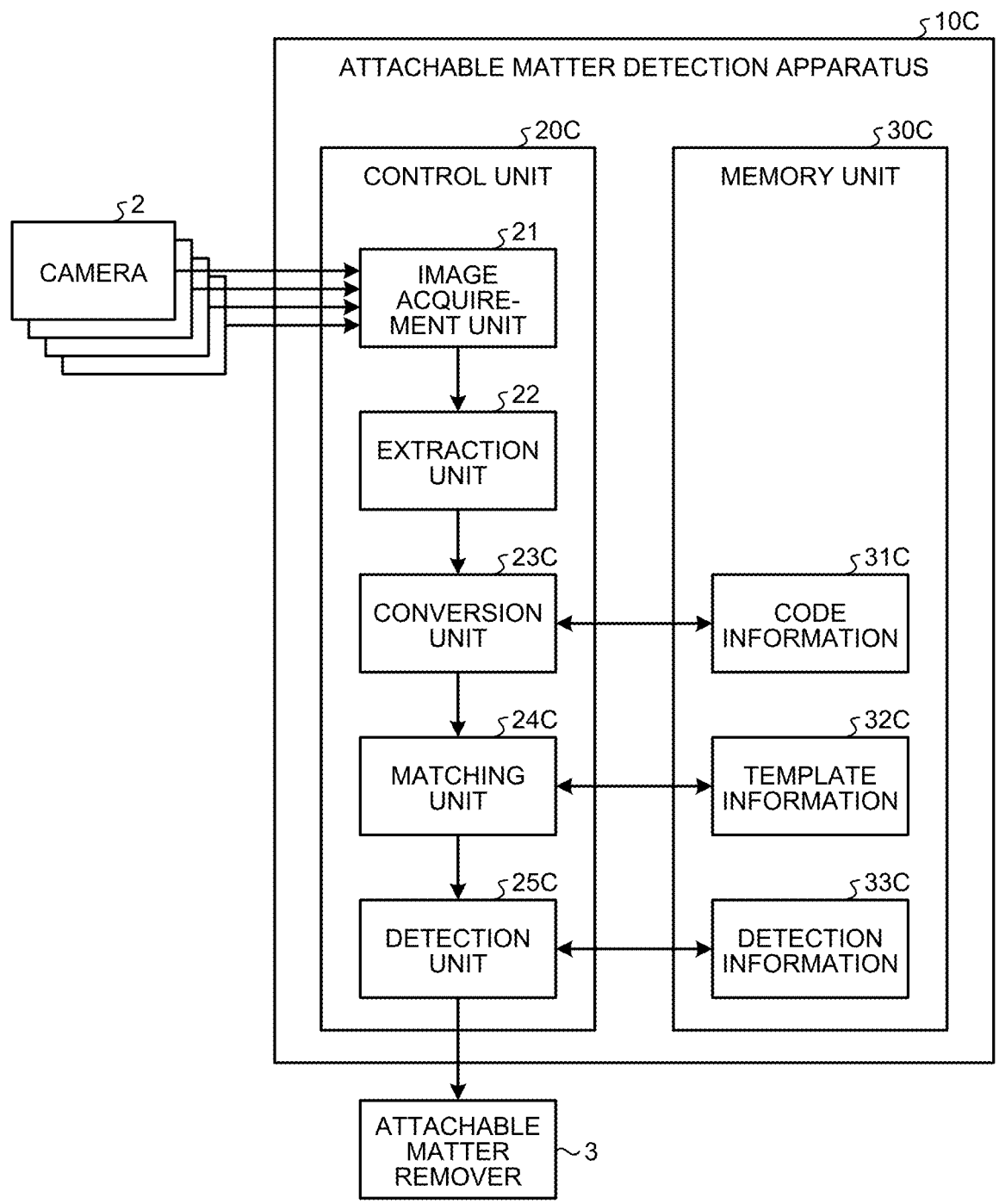
FIG. 34 is a block diagram illustrating an attachable matter detection apparatus according to the sixth embodiment.

First, a configuration of the attachable matter detection apparatus 10C according to the sixth embodiment will be described with reference to FIG. 34. FIG. 34 is a block diagram illustrating an attachable matter detection apparatus 10C according to the sixth embodiment.

As illustrated in FIG. 34, the attachable matter detection apparatus 10C according to the sixth embodiment includes a control unit 20C and a memory unit 30C. The control unit 20C has a conversion unit 23C, a matching unit 24C, and a detection unit 25C in place of the conversion unit 23, the matching unit 24, and the detection unit 25 illustrated in FIG. 21. In addition, the memory unit 30C stores code information 31C, template information 32C, and detection information 33C.

Note that the image acquisition unit 21 and the extraction unit 22 will not be described here because they have been described in conjunction with FIGS. 2 and 28. The description will be made starting from the conversion unit 23C.

The conversion unit 23C calculates a vector of the edge of each pixel on the basis of the edge intensities of the X-axis and Y-axis directions of each pixel input from the extraction unit 22 and encodes each edge direction. This vector calculation method has been described in conjunction with FIG. 30A, and will not be described here.

The conversion unit 23C outputs a grayscale image obtained by encoding each pixel to the matching unit 24C. Here, in the attachable matter detection apparatus 10C according to the sixth embodiment, for example, a representative value of the edges of a plurality of pixels is obtained, and this representative value is encoded. This will be described below in more details with reference to FIGS. 35A and 35B.

The matching unit 24C performs a matching process using normalized expressions of the encoded grayscale image input from the conversion unit 23C and a code pattern representing characteristics of a water droplet. Here, the normalized expression refers to a single code expressing a set of code strings.

Since the matching unit 24C performs the matching process using the normalized expression, a cumbersome process such as the aforementioned similarity calculation is not necessary. For this reason, it is possible to detect a water droplet while suppressing a processing load.

Note that the code pattern representing characteristics of a water droplet is stored in the template information 32C. In addition, this code pattern will be described below in more details with reference to FIG. 36A. Furthermore, the processing of the matching unit 24C will be described below in more details with reference to FIG. 36B.

The detection unit 25C detects a water droplet attached to the camera 2 on the basis of the code pattern extracted by the matching unit 24C. Note that the extraction process of the detection unit 25C will be described below with reference to FIGS. 37 and 38.

Figure 35A:
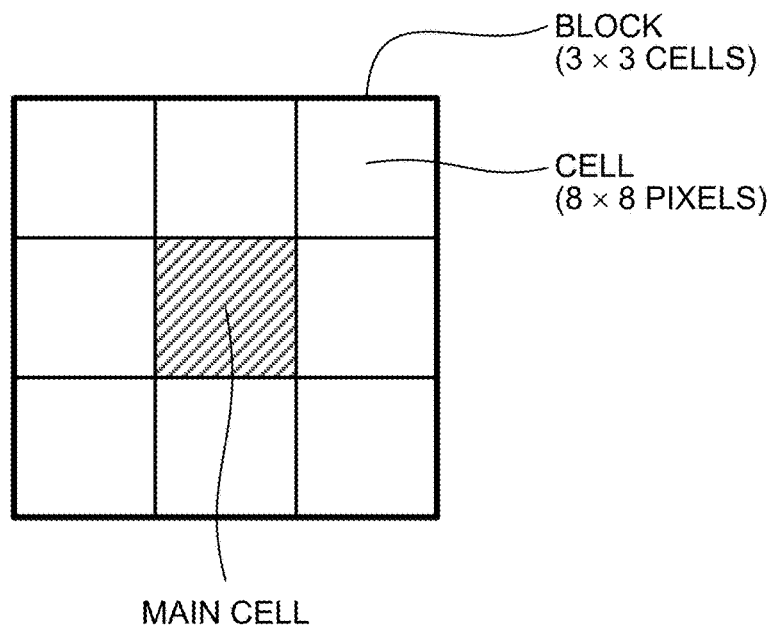
FIGS. 35A and 35B are (first and second) diagrams for describing a method of calculating a representative value.
Figure 35B:
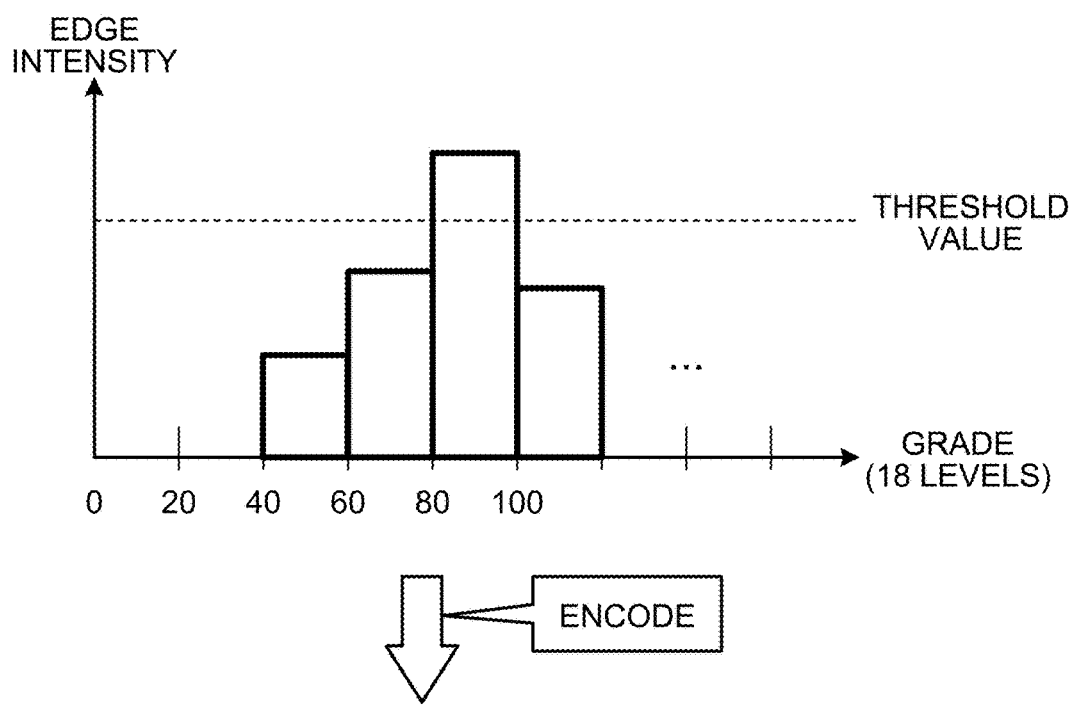

Next, the encoding of the conversion unit 23C will be described with reference to FIGS. 35A and 35B. FIGS. 35A and 35B are diagrams illustrating the processing of the conversion unit 23C.

First, a pixel used to calculate the representative value will be described with reference to FIG. 35A. Here, 8×8 pixels will be referred to as a cell, and 3×3 cells will be referred to as a block. In addition, the center cell of the block will be referred to as a main cell.

The conversion unit 23C creates a histogram representing the edge direction and the edge intensity of each pixel for each block. Such a histogram will be described with reference to FIG. 35B. Here, the conversion unit 23C derives the edge direction of the center coordinates of the main cell from the histogram of the block.

If a representative value of the main cell of a single block is derived, the conversion unit 23C shifts the block by a single cell and creates a histogram. Then, a representative value of the main cell of this block is calculated.

That is, in the attachable matter detection apparatus 10C according to the sixth embodiment, it is possible to reduce the data amount by calculating representative values for each of a plurality of pixels. For this reason, it is possible to simplify the matching process of the matching unit 24C. Note that, since 8×8 cells are employed in the example of FIGS. 35A and 35B, the data amount is reduced to 1/64.

Note that the numbers of pixels in the block and the cell of FIG. 35A are just exemplary, and may be set arbitrarily. In this case, the number of pixels in each cell may be changed depending on the size of the water droplet to be detected.

For example, in a case where it is desired to detect a small water droplet, the number of pixels in the cell is set to be small. In a case where it is desired to detect a large water droplet, the number of pixels in the cell is set to be large. As a result, it is possible to effectively detect a water droplet having a desired size.

The conversion unit 23C may simply create the histogram for each cell and calculate the representative value of each cell on the basis of this histogram. Note that the conversion unit 23C may encode overall pixels without calculating the representative value.

Next, the histogram will be described with reference to FIG. 35B. Note that, in FIG. 35B, the ordinate refers to the edge intensity, and the abscissa refers to the grade of the edge direction. As illustrated in FIG. 35B, in the attachable matter detection apparatus 10C according to the sixth embodiment, for example, the histogram is created by allocating the edge direction to each grade of 18 levels set to an angle of 20°.

Specifically, the conversion unit 23C creates the histogram of the block by adding the edge intensity of each pixel of the block to the grade corresponding to the edge direction. Subsequently, the conversion unit 23C obtains a grade in which a sum of the edge intensity is maximized from the created histogram.

In the example of FIG. 35B, a case where the grade of an angle of 80 to 100° has a maximum value is illustrated. In this case, the conversion unit 23C sets a grade as the representative value if the sum of the edge intensity is equal to or larger than the threshold value in this grade.

In the example of FIG. 35B, the sum of the edge intensity exceeds the threshold value in the grade of "80 to 100°." Therefore, the aforementioned condition is satisfied. For this reason, the grade of the main cell in this block is set to "80 to 100°."

Subsequently, the conversion unit 23C converts the main cell into a code allocated depending on the grade. Here, each of eighteen types of codes "0 to 9" and "A" to "H" is allocated to each grade. Note that "0 to 9" and "A to H" are codes allocated to each grade obtained by dividing from "0°" to "360°" in the unit of 20°. In addition, in a case where the representative value does not exceed the threshold value, that is, to a cell having a low edge intensity, a code "Z" is allocated.

In this manner, the conversion unit 23C performs encoding for overall cells. As a result, in the encoded grayscale image, the codes are arranged in a grid shape. Note that the conversion unit 23C may calculate the representative value using a statistic calculation method other than the aforementioned calculation of the representative value.

In FIG. 35B, a case where the edge direction is classified into eighteen grades has been described. However, without limiting thereto, the number of grades may increase or decrease from eighteen grades. FIG. 35B illustrates a case where the codes include "A" to "H" and "Z." However, the codes may include other characters such as Hiragana or numerical values, symbols, and the like.

For example, in a case where a plurality of grades exceeding the threshold value exist in a single block, the conversion unit 23C may output the codes corresponding to the grades to the matching unit 24C in association with the grayscale image.

In other words, the conversion unit 23C may associate information on a plurality of edge directions with the grayscale image. In this case, the data amount for detecting a water droplet increases. Therefore, it is possible to detect a water droplet more accurately.

Figures 36A, 36B:
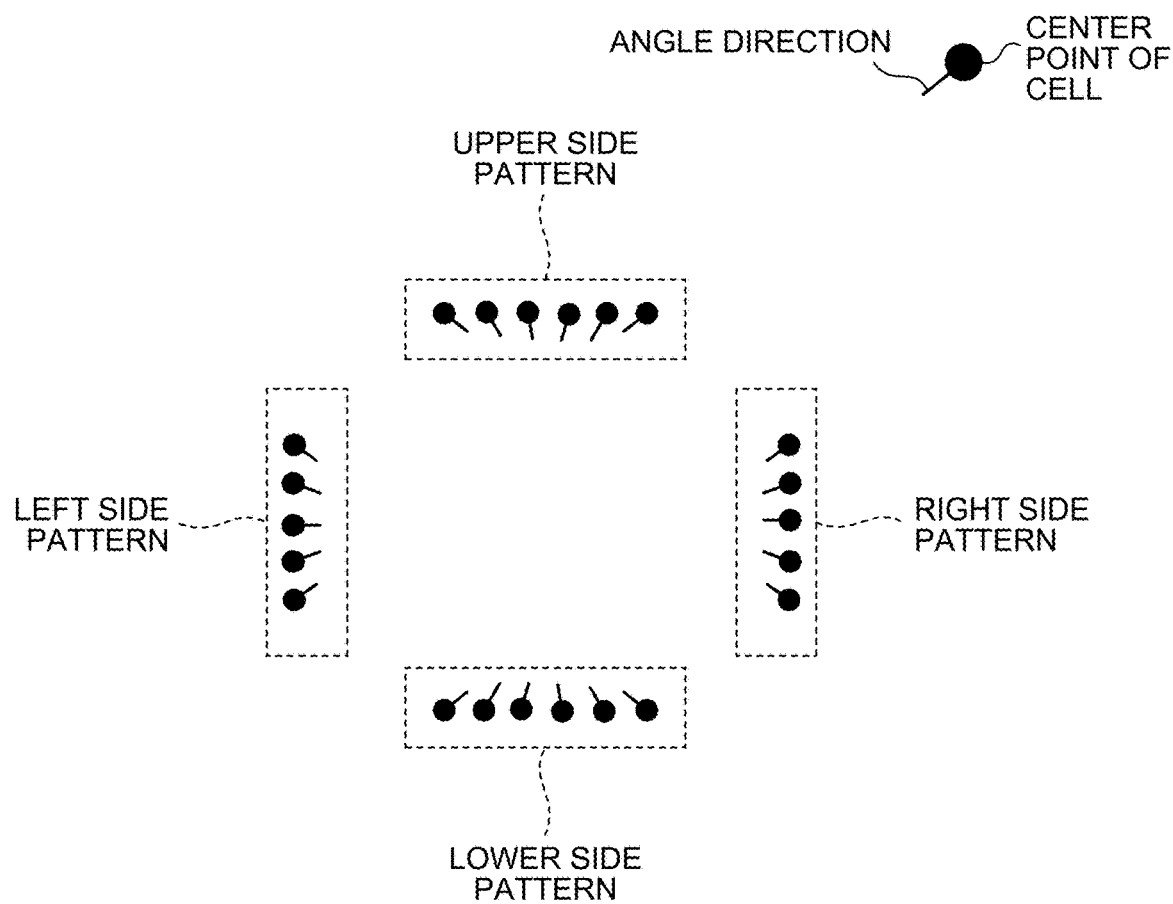
FIG. 36A is a diagram illustrating an exemplary template according to the sixth embodiment.
FIG. 36B is a diagram illustrating an exemplary matching process of the matching unit according to the sixth embodiment.

Next, the processing of the matching unit 24C according to the sixth embodiment will be described with reference to FIGS. 36A and 36B. FIG. 36A is a schematic diagram illustrating an exemplary template according to the sixth embodiment. FIG. 36B is a diagram illustrating an exemplary matching process using the matching unit 24C.

Note that, in FIG. 36A, in order to facilitate visual recognition, a template is schematically illustrated using actual edge directions instead of the aforementioned codes. As illustrated in FIG. 36A, in the attachable matter detection apparatus 10C according to the sixth embodiment, the template has a code pattern as a code string representing characteristics of a water droplet. Specifically, the template includes, for example, an upper side pattern, a lower side pattern, a left side pattern, and a right side pattern.

Here, each side pattern illustrated in FIG. 36A indicates each side of a rectangular that internally or externally envelops a water droplet. In addition, in FIG. 36A, a case where each edge direction of each side pattern is directed to the center is illustrated. In this case, the luminance of the water droplet increases from the end to the center. That is, the center is bright, and the end is dark as a characteristic of the water droplet.

Note that, in the attachable matter detection apparatus 10C according to the sixth embodiment, the luminance of the water droplet increases from the center to the end. That is, each side pattern may represent a characteristic of a water droplet in which the center is dark, and the end is bright. As a result, it is possible to detect various water droplets.

Note that, although four patterns including upper, lower, left, and right side patterns are exemplified in FIG. 36A, a pattern having a slope direction may also be employed. As a result, it is possible to improve the water droplet detection accuracy.

The code string indicating the characteristics of the water droplet may be, for example, an array of codes arranged in an arc shape. In addition, the matching unit 24C may restrict the region for performing the normalized expression depending on each side pattern.

A matching process of the matching unit 24C will be described with reference to FIG. 36B. Note that, here, for convenient description purposes, the upper side pattern of FIG. 36A is indicated by the codes A to F. In addition, in (a) and (b) of FIG. 36B, a part of the grayscale image encoded by the conversion unit 23C is schematically illustrated.

As illustrated in (a) of FIG. 36B, if the code patterns are aligned sequentially in order of A to F, the matching unit 24C determines that this code pattern matches the upper side pattern.

Specifically, as illustrated in (a) of FIG. 36B, for example, if an array in which "A" is repeated three times, "B," "C," "D," and "E" are repeated twice, and "F" is repeated three times satisfies an arrangement sequence of each code of the upper side pattern, the matching unit 24C extracts this array as the upper side pattern.

This is because the repetition frequency of the code is different depending on the size of the water droplet. That is, as the size of the water droplet increases, the length of each code string increases. In this manner, by allowing repetition of the codes, it is possible to extract a code string indicating a plurality of water droplets having different sizes through a single matching process.

Therefore, it is possible to detect a water droplet while reducing a processing load. Note that a plurality of patterns of the code strings having different lengths depending on the size of the water droplet may be prepared for each side, and the matching unit 24C may extract the code strings using all of the patterns.

Since the water droplet typically has a spherical shape, the repetition frequency of each code becomes linearly symmetric with respect to the center. For this reason, the matching unit 24C excludes a code string having imbalance from the extracted code strings.

Specifically, as illustrated in (b) of FIG. 36B, the matching unit 24C carefully investigates balance between "A" and "F" located in both ends. Here, in FIG. 36B, "A" is repeated three times, and "F" is repeated ten times.

In this case, in a case where the number of "A" and the number of "F" are different twice or more, the matching unit 24C excludes this code string pattern even it satisfies the arrangement sequence. As a result, it is possible to prevent erroneous extraction of an unnecessary code pattern other than a water droplet and suppress erroneous detection of a water droplet.

For example, in a case where the extracted code string is longer than a threshold value, the matching unit 24C may exclude this code string from the matching. This is because, if the code string is long, a possibility of the water droplet is low. For this reason, it is possible to suppress erroneous detection of a water droplet. Note that it is assumed that this threshold value is derived as an optimum value through a statistic method or the like in advance.

Figure 37:
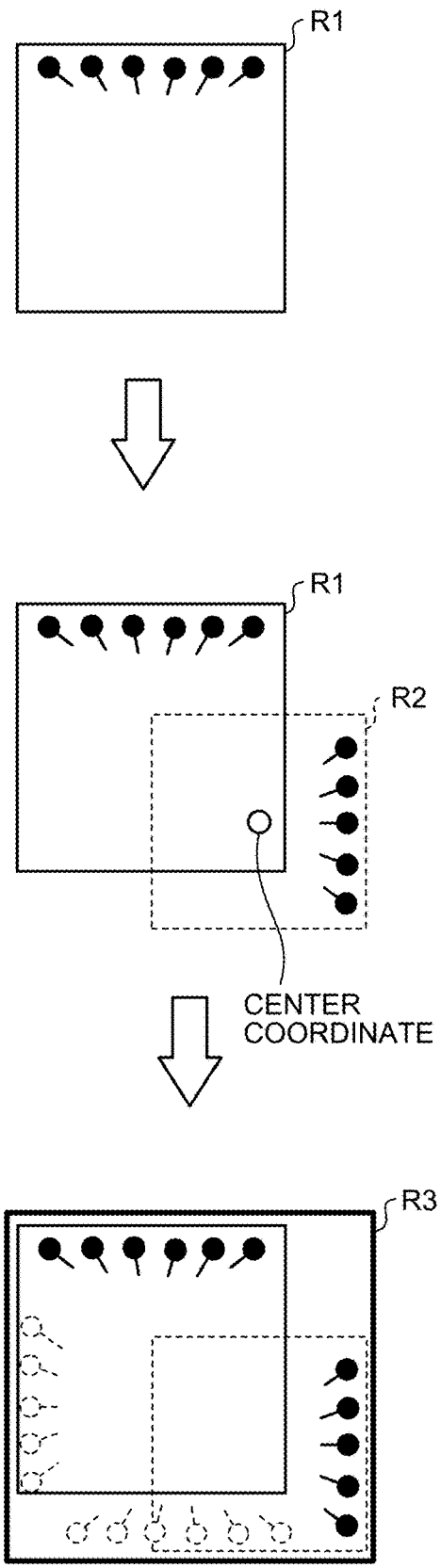
FIG. 37 is a diagram illustrating a detection process using a detection unit according to the sixth embodiment.

Next, a detection process using the detection unit 25C according to the sixth embodiment will be described with reference to FIG. 37. FIG. 37 is a diagram illustrating a detection process using the detection unit 25C according to the sixth embodiment. Note that, similarly to FIG. 36A, FIG. 37 schematically illustrates actual edge directions instead of codes.

Here, a case where an upper side pattern is initially extracted by the matching unit 24C will be described. First, the detection unit 25C sets a substantially rectangular detection region R1 on the basis of a width of the upper side pattern.

Subsequently, it is assumed that the matching unit 24C extracts the right side pattern in a position deviated from the detection region R1. In this case, if a central coordinate of the detection region R2 of the right side pattern is within the detection region R1, the detection unit 25C performs a process of integrating both the detection regions R1 and R2.

Then, for example, in a case where the lower side pattern or the left side pattern is extracted from the integrated detection region R3, the detection unit 25C detects a water droplet in the integrated detection region R3. In other words, the detection unit 25C detects a water droplet by setting a detection condition in which a pattern indicating each side having different three or more directions is extracted in the detection region R3 (hereinafter, referred to as a directional condition).

Note that, instead of this directional condition, the detection unit 25C may set a water droplet detection condition (hereinafter, referred to as a frequency condition), for example, in which a pattern indicating each side is extracted frequently by a predetermined number or more (for example, four times including upper, lower, left, and right sides) in the integrated detection region R3.

In this manner, by setting the directional condition including three or more directions or the frequency condition as the detection condition, a water droplet is detected even when all of the upper, lower, left, and right sides are not extracted. That is, it is possible to detect, for example, a semicircular water droplet removed from the camera image.

Note that the directional condition may be changed, for example, depending on a region for detecting a water droplet. For example, in a center region of the camera image, the directional condition is set in four directions. As a result, it is possible to improve the water droplet detection accuracy.

The directional condition is set to "twice" in the regions of four corners of the camera image. As a result, it is possible to detect a partially cut fan-shaped water droplet appearing in four corners of the camera image.

Note that, although a case where the detection regions are integrated when the central coordinate of the detection region R2 is settled in the detection region R1 of the upper side pattern has been described has been described in FIG. 37, the present application is not limited thereto. That is, if at least parts of the detection regions R1 and R2 are overlapped, both detection regions may be integrated.

The integrated detection region R3 may be a logical product between the detection regions R1 and R2 or may be a logical sum of the detection regions. In addition, although the detection regions R1 and R2 have a rectangular shape in FIG. 37, the detection region may have any other shape such as a circular shape without limiting thereto.

Note that, as described above in conjunction with FIG. 26D, the detection unit 25C may detect a water droplet on the basis of a detection result from a plurality of frames.

Next, an exclusion process of the detection condition using the detection unit 25C will be described with reference to FIG. 38. FIG. 38 is a diagram illustrating a condition for excluding a pattern on the basis of the detection condition. In FIG. 38, a part of the grayscale image is enlarged, and the edge directions are schematically illustrated.

Note that, in FIG. 38, the length a1 is set to, for example, 1.5 times the length a2. That is, the length a2 is a two thirds (⅔) of the length a1. Here, the left side pattern tends to be easily extracted, for example, from the left two-thirds region of the grayscale image (the left region with respect to the dotted line in FIG. 38) even when a water droplet is not attached to the camera 2.

For this reason, in a case where a plurality of left side patterns are extracted, and a pattern representing other sides is not extracted in this region, the detection unit 25C exceptionally excludes the pattern from the detection target even when the aforementioned frequency condition is satisfied.

As a result, it is possible to suppress erroneous detection of a water droplet. Note that, although the left side pattern has been exemplified here, this similarly applies to other side patterns.

Next, a processing sequence executed by the attachable matter detection apparatus 10C according to the sixth embodiment will be described with reference to FIG. 39. FIG. 39 is a flowchart illustrating a processing sequence executed by the attachable matter detection apparatus 10C according to the sixth embodiment. Here, since Steps S401 and S402 have already been described, the description will be made from Step S601 in FIG. 39.

First, the conversion unit 23C calculates a representative value by creating a histogram on the basis of edge information extracted by the extraction unit 22 as illustrated in FIGS. 35A and 35B (Step S601). Then, the conversion unit 23C performs an encoding process for encoding a representative value of each cell (Step S602).

Subsequently, the matching unit 24C performs a matching process for the encoded grayscale image using a normalized expression (Step S603). In addition, the detection unit 25C detects a water droplet as illustrated in FIG. 37 (Step S604).

As described above, in the attachable matter detection apparatus 10C according to the sixth embodiment, each pixel is encoded, and the matching process is performed using the normalized expression. As a result, it is possible to simplify the matching process. That is, it is possible to detect a water droplet with high accuracy while suppressing a processing load.

In the attachable matter detection apparatus 10C according to the sixth embodiment, it is possible to improve detection accuracy of water droplets having different sizes or a water droplet partly cut from the camera image by using the normalized expression in the matching process.

Note that, the attachable matter detection apparatuses 10A, 10B, and 10C according to the fourth to sixth embodiments may be appropriately combined. For example, the method of calculating the representative value of FIG. 35A may be employed in the fourth and fifth embodiments.

In the attachable matter detection apparatuses 10A, 10B, and 10C according to the fourth to sixth embodiments, a frame interval for obtaining a camera image from the camera 2 may be changed depending on the purpose of detecting the water droplet. For example, it is necessary to detect a water droplet as soon as possible in a case where the camera image is presented to a driver during a backward movement of the vehicle C.

For this reason, in such as case, all of the frames photographed by the camera 2 are acquired, and a water droplet is detected from all of these frames. Meanwhile, for example, in a case where the detection purpose is the sensing in automatic parking and the like, the camera image may be acquired, for example, at every several frames.

In this case, the cameras 2 that acquires camera images may be changed on a frame-by-frame basis, such as rear camera 2-2→front camera 2-1→right-side camera 2-3→left-side camera 2-4.

In the attachable matter detection apparatuses 10A, 10B, and 10C according to the fourth to sixth embodiments, the water droplet detection process may be performed by changing a resolution of the camera image. For example, in a case where water droplet detection is performed by lowering a resolution, it is possible to reduce a processing load of the detection process. Note that the resolution may be changed depending on a purpose of the water droplet detection.

In the fourth to sixth embodiments, a case where the attachable matter detection apparatuses 10A, 10B, and 10C extract a gradient of the luminance in each pixel of the camera image L as the edge information has been described. However, the present application is not limited thereto.

The attachable matter detection apparatuses 10A, 10B, and 10C may extract a gradient of saturation in each pixel of the camera image L as edge information and detect a water droplet attached to the camera 2 on the basis of such edge information. In this case, the attachable matter detection apparatuses 10A, 10B, and 10C can accurately detect a muddy water droplet mixed with mud, sand, and the like attached to the camera 2.

Specifically, for example, assuming that the HSV color space is employed, the extraction unit 22 of the attachable matter detection apparatuses 10A, 10B, and 10C may extract the saturation on the basis of a formula "saturation (S)=(Imax−Imin)/Imax," where "Imax" denotes a maximum value of R, G, and B of each pixel of the camera image L, and "Imin" denotes a minimum value.

Assuming that the HSL color space is employed, the extraction unit 22 may extract the saturation on the basis of a formula "saturation (S)=(Imax−Imin)/(Imax+Imin) if L≤0.5" or "saturation (S)=(Imax−Imin)/(2−Imax−Imin) if L>0.5" and a formula "brightness (L)=(Imax+Imin)/2."

Subsequently, the conversion unit 23 according to the fourth embodiment calculates a value obtained by squaring the saturations in X-axis and Y-axis directions and adding them as a saturation-based edge amount of each pixel. In addition, the conversion unit 23 may binarize each pixel of the camera image L by comparing this edge amount and the binarization threshold value THa as illustrated in FIG. 22. Note that this binarization threshold value THa optimized for the saturation may be employed.

Then, the attachable matter detection apparatus 10A performs the processing already described above using the matching unit 24 and the detection unit 25 so that it is possible to accurately detect a muddy water droplet attached to the camera 2.

The conversion unit 23B according to the fifth embodiment may calculate the edge directions based on the saturation of each pixel and parameterize each pixel by allocating three-dimensional parameters of FIGS. 30A and 30B in the edge directions.

Subsequently, the matching unit 24B performs a matching process using the template of FIG. 31. In the case of a muddy water droplet, the saturation increases toward the center. For this reason, the detection unit 25B can detect a muddy water droplet only when the value of the zero-mean normalized cross-correlation calculated by the matching unit 24B exceeds the positive detection threshold value of FIG. 32.

That is, the attachable matter detection apparatus 10B according to the fifth embodiment can suppress erroneous detection of a muddy water droplet by setting only the positive detection threshold value when the muddy water droplet is detected.

The conversion unit 23C according to the sixth embodiment encodes each pixel of the camera image L with respect to the direction of the saturation gradient as illustrated in FIGS. 35A and 35B. In addition, the matching unit 24C extracts a code string representing a water droplet through a matching process using the normalized expression.

The detection unit 25C detects a muddy water droplet attached to the camera 2 on the basis of a code string extracted by the matching unit 24C. In this case, as described above, the saturation increases toward the center in the case of the muddy water droplet.

For this reason, the detection unit 25C can accurately detect a muddy water droplet by detecting a code string pattern having the saturation increasing toward the center on the basis of the code string extracted by the matching unit 24C.

In this manner, the attachable matter detection apparatuses 10A, 10B, and 10C can accurately detect a muddy water droplet by using the saturation instead of the luminance of each pixel as the edge information. Note that the attachable matter detection apparatuses 10A, 10B, and 10C may simultaneously detect, for example, both a water droplet having the luminance increasing toward the center and a muddy water droplet having the saturation increasing toward the center through a single matching process.

Although a case where all of the attachable matter detection apparatuses 10, 10A, 10B, and 10C and the attachable matter removal system 1 are applied to an in-vehicle camera 2 has been described in each of aforementioned embodiments, the above-described embodiments may also be applied to other types of cameras such as a monitor/security camera set inside or outside a building or a street.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An attachable matter detection apparatus comprising:
a memory that stores therein condition information; and
a processor operatively connected to the memory, the processor being programmed to:
cause an imaging device, which is mounted on a vehicle, to capture a photographic image of a circumference of the vehicle, the imaging device including an image sensor;
acquire, as a determination target area, a detection area of the photographic image in which an attachable matter to the imaging device is estimated to be present by executing a predetermined detection algorithm on the photographic image captured by the imaging device;
create, for the acquired determination target area, a histogram of an edge intensity, a histogram of luminance, and a histogram of saturation, each of the histograms including a plurality of grades, and each of the grades including a corresponding frequency,
wherein the condition information stored in the memory includes an exclusion condition obtained by combining (i) ratios between the grades of the edge intensity, (ii) ratios between the grades of the luminance, and (iii) ratios between the grades of the saturation, the exclusion condition not being suitable for characteristics of an attachable matter to the imaging device;
compare, with the condition information stored in the memory, a combination of ratios between the grades of the edge intensity, the luminance, and the saturation of the acquired determination target area;
when the combination satisfies the exclusion condition, determine that the attachable matter does not exist on the imaging device corresponding to the determination target area; and
when the combination does not satisfy the exclusion condition, determine that the attachable matter exists on the imaging device corresponding to the determination target area.

2. The attachable matter detection apparatus according to claim 1, wherein
each of the created histograms includes at least three grades including "low," "middle," and "high".

3. The attachable matter detection apparatus according to claim 1, wherein the processor is further programmed to:
determine whether or not the attachable matter exists based on a change amount of at least one of the created histograms between a current frame and a previous frame.

4. The attachable matter detection apparatus according to claim 3, wherein the processor is further programmed to:
acquire each of a plurality of partitioned areas set for the photographic image as the determination target area; and
determine that the attachable matter exists with respect to a partitioned area in which the change amount satisfies a predetermined detection condition.

5. The attachable matter detection apparatus according to claim 4, wherein the detection condition is able to be set for each partitioned area.

6. The attachable matter detection apparatus according to claim 4, wherein the processor is further programmed to:
adjust the detection condition when a predetermined trigger that is suitable for adjustment of the detection condition is generated;
adjust the detection condition to be reinforced when the determination target area is positioned in a lower region of the photographic image.

7. The attachable matter detection apparatus according to claim 1, wherein the processor is further programmed to:
enlarge or reduce a size of the determination target area to match a reference size when the histograms are created.

8. An attachable matter detection method comprising:
causing an imaging device, which is mounted on a vehicle, to capture a photographic image of a circumference of the vehicle, the imaging device including an image sensor;
acquiring, as a determination target area, a detection area of the photographic image in which an attachable matter to the imaging device is estimated to be present by executing a predetermined detection algorithm on the photographic image captured by the imaging device;
creating, for the acquired determination target area, a histogram of an edge intensity, a histogram of luminance, and a histogram of saturation, each of the histograms including a plurality of grades, and each of the grades including a corresponding frequency;
compare, with condition information stored in a memory, a combination of ratios between the grades of the edge intensity, the luminance, and the saturation of the acquired determination target area, wherein the condition information stored in the memory includes an exclusion condition obtained by combining (i) ratios between the grades of the edge intensity, (ii) ratios between the grades of the luminance, and (iii) ratios between the grades of the saturation, the exclusion condition not being suitable for characteristics of an attachable matter to the imaging device;
when the combination satisfies the exclusion condition, determining that the attachable matter does not exist on the imaging device corresponding to the determination target area; and
when the combination does not satisfy the exclusion condition, determining that the attachable matter exists on the imaging device corresponding to the determination target area.

* * * * *